United States Patent
Kim et al.

(10) Patent No.: US 11,544,954 B2
(45) Date of Patent: Jan. 3, 2023

(54) DEVICE AND METHOD FOR BONDING SENSOR TO DISPLAY PANEL

(71) Applicant: Samsung Display Co., Ltd., Yongin-si (KR)

(72) Inventors: Seongmin Kim, Osan-si (KR); Muhyun Kim, Seoul (KR); Sohyun Kim, Cheonan-si (KR); Sanghoon Park, Yongin-si (KR); Yanghan Son, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 401 days.

(21) Appl. No.: 16/788,818

(22) Filed: Feb. 12, 2020

(65) Prior Publication Data

US 2020/0257876 A1    Aug. 13, 2020

(30) Foreign Application Priority Data

Feb. 13, 2019  (KR) .................. 10-2019-0016704

(51) Int. Cl.
*G06V 40/13*    (2022.01)
*G06F 3/041*    (2006.01)
*G05D 3/12*    (2006.01)

(52) U.S. Cl.
CPC .............. *G06V 40/13* (2022.01); *G05D 3/12* (2013.01); *G06F 3/0412* (2013.01); *G06F 2203/04103* (2013.01)

(58) Field of Classification Search
CPC ........ G06F 2203/04103; G06F 3/0412; G06K 9/00013; G06V 40/13; G05D 3/12
USPC ........................................................ 156/60
See application file for complete search history.

(56) References Cited

U.S. PATENT DOCUMENTS

| | | | | |
|---|---|---|---|---|
| 11,263,429 B2* | 3/2022 | Lee | ...................... | H01L 27/3272 |
| 11,308,311 B2* | 4/2022 | Sandhan | ............ | G06V 40/1318 |
| 11,314,978 B2* | 4/2022 | Kim | ....................... | G06F 3/0421 |
| 11,322,557 B2* | 5/2022 | Ryu | ..................... | H01L 51/5284 |
| 2007/0170949 A1* | 7/2007 | Pak | ......................... | G09G 3/006 |
| | | | | 324/760.01 |

(Continued)

FOREIGN PATENT DOCUMENTS

| KR | 10-1116321 | 3/2012 |
|---|---|---|
| KR | 2014-0146442 | 12/2014 |
| KR | 2016-0130925 | 11/2016 |

*Primary Examiner* — Atul Trivedi
(74) *Attorney, Agent, or Firm* — H.C. Park & Associates, PLC

(57) ABSTRACT

A device for bonding a fingerprint sensor to a display panel including a picker for securing a rear surface of a fingerprint sensing unit with a first planar surface having a (1-1)-th inclination, a stage for securing a front surface of the display panel with a second planar surface having a (2-1)-th inclination, distance measuring units for measuring distances to first points on a front surface of the fingerprint sensing unit and to second points on a rear surface of the display panel, a controller outputting a control signal that adjusts an inclination of the first planar surface or the second planar surface, an inclination adjusting unit for adjusting an inclination of the first and planar surfaces, and a vertical driving unit for moving at least one of the first and second planar surfaces along a first direction to bond the fingerprint sensing unit to the display panel.

20 Claims, 44 Drawing Sheets

(56) References Cited

U.S. PATENT DOCUMENTS

| | | | |
|---|---|---|---|
| 2014/0293169 A1* | 10/2014 | Uken | B60R 1/12 |
| | | | 349/12 |
| 2016/0286210 A1* | 9/2016 | Border | G02B 7/08 |
| 2017/0025091 A1* | 1/2017 | Haddick | G09G 5/02 |
| 2017/0055906 A1* | 3/2017 | Bremer | A61B 5/1459 |
| 2017/0068342 A1* | 3/2017 | Zimmerman | G06F 3/04162 |
| 2017/0205958 A1* | 7/2017 | Kurasawa | G06F 3/0446 |
| 2017/0213065 A1* | 7/2017 | Kurasawa | G06V 40/1306 |
| 2017/0300736 A1 | 10/2017 | Song et al. | |
| 2017/0372114 A1* | 12/2017 | Cho | G06F 3/0412 |
| 2018/0035101 A1* | 2/2018 | Osterhout | G02B 27/0172 |
| 2018/0060642 A1* | 3/2018 | Kim | G06V 40/1318 |
| 2018/0150163 A1* | 5/2018 | Lee | G06F 3/0412 |
| 2018/0150165 A1* | 5/2018 | Kim | G06V 40/1318 |
| 2018/0173923 A1* | 6/2018 | Lee | G06F 3/044 |
| 2019/0025588 A1* | 1/2019 | Osterhout | H04N 13/383 |
| 2019/0025589 A1* | 1/2019 | Haddick | G06F 3/013 |
| 2019/0025590 A1* | 1/2019 | Haddick | G02B 5/3025 |
| 2019/0034688 A1* | 1/2019 | Lee | H01L 51/5281 |
| 2020/0257876 A1* | 8/2020 | Kim | G05D 3/12 |
| 2021/0167487 A1* | 6/2021 | Varma | H01Q 25/005 |
| 2021/0168230 A1* | 6/2021 | Baker | G06F 1/1637 |
| 2021/0168231 A1* | 6/2021 | Baker | G06F 1/1637 |
| 2022/0129657 A1* | 4/2022 | Lim | G06V 40/13 |

* cited by examiner

DEVICE AND METHOD FOR BONDING SENSOR TO DISPLAY PANEL

CROSS-REFERENCE TO RELATED APPLICATION

This application claims priority from and the benefit of Korean Patent Application No. 10-2019-0016704, filed on Feb. 13, 2019, which is hereby incorporated by reference for all purposes as if fully set forth herein.

BACKGROUND

Field

Exemplary embodiments of the present invention relate generally to a bonding device and a bonding method, and more specifically, to a device and a method for bonding a sensor to a display panel.

Discussion of the Background

As interests in display devices have increased and demands for the usage of portable information media have increased, research on display devices have been focused for commercialization.

Recently, display devices are provided with a fingerprint sensor for recognizing the fingerprint of a user. A front surface of the fingerprint sensor may be bonded to a rear surface of the display panel of the display device, and the fingerprint sensor may recognize the fingerprint of a user contacting the front surface of the display panel on which the image is displayed. In this case, the parallelism between the rear surface of the display panel and the front surface of the fingerprint sensor may affect the performance of the fingerprint sensor.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

The above information disclosed in this Background section is only for understanding of the background of the inventive concepts, and, therefore, it may contain information that does not constitute prior art.

SUMMARY

Devices constructed according to exemplary embodiments of the invention are capable of improving parallelism between a rear surface of a display panel and a front surface of a fingerprint sensor.

Additional features of the inventive concepts will be set forth in the description which follows, and in part will be apparent from the description, or may be learned by practice of the inventive concepts.

A device for bonding a fingerprint sensor to a display panel according to an exemplary embodiment includes: a picker for securing a rear surface of a fingerprint sensing unit of the fingerprint sensor and including a first planar surface having a (1-1)-th inclination; a stage for securing a front surface of the display panel and including a second planar surface having a (2-1)-th inclination; a first distance measuring unit for measuring a first distance to a plurality of first points located at a front surface of the fingerprint sensing unit; a second distance measuring unit for measuring a second distance to a plurality of second points located at a rear surface of the display panel; a controller for outputting a control signal that includes at least one of a first control signal for adjusting, based on the first distance and the second distance, an inclination of the first planar surface of the picker from the (1-1)-th inclination to a (1-2)-th inclination and a second control signal for adjusting, based on the first distance and the second distance, an inclination of the second planar surface of the stage from the (2-1)-th inclination to a (2-2)-th inclination; an inclination adjusting unit including at least one of a first inclination adjusting unit for adjusting an inclination of the first planar surface according to the first control signal, and a second inclination adjusting unit for adjusting an inclination of the second planar surface based on the second control signal; and a vertical driving unit for moving at least one of the first planar surface and the second planar surface along a first direction to bond the front surface of the fingerprint sensing unit and the rear surface of the display panel to each other.

The device may further include an adhesive injector for applying an adhesive that includes a curable resin over at least one of the front surface of the fingerprint sensing unit and the rear surface of the display panel.

The device may further include a horizontal driving unit for moving the first planar surface of the picker in a direction perpendicular to the first direction; and a camera unit for imaging the front surface of the fingerprint sensing unit and the rear surface of the display panel, in which the controller may analyzes the image captured by the camera unit to generate a third control signal, and the horizontal driving unit may receive the third control signal and cause the front surface of the fingerprint sensing unit and a sensing area of the display panel to overlap each other in the first direction.

The first planar surface having the (1-1)-th inclination and the second planar surface having the (2-1)-th inclination may be parallel to each other.

The plurality of first points may include a (1-1)-th point, a (1-2)-th point, a (1-3)-th point, and a (1-4)-th point, the (1-1)-th point, the (1-2)-th point, the (1-3)-th point, and the (1-4)-th point may correspond to vertices of a first quadrangle, the (1-1)-th point and the (1-3)-th point may be located on a (1-1)-th diagonal line of the first quadrangle, the (1-2)-th point and the (1-4)-th point may be located on a (1-2)-th diagonal line of the first quadrangle, the plurality of second points may include a (2-1)-th point, a (2-2)-th point, a (2-3)-th point, and a (2-4)-th point, the (2-1)-th point, the (2-2)-th point, the (2-3)-th point, and the (2-4)-th point may correspond to vertices of a second quadrangle, the (2-1)-th point and the (2-3)-th point may be located on a (2-1)-th diagonal line of the second quadrangle, the (2-2)-th point and the (2-4)-th point may be located on a (2-2)-th diagonal line of the second quadrangle, the controller may determine at least one of the (1-2)-th inclination and the (2-2)-th inclination that allows the (1-1)-th diagonal line, the (1-2)-th diagonal line, the (2-1)-th diagonal line, and the (2-2)-th diagonal line to be parallel to one plane, based on a (1-1)-th distance, a (1-2)-th distance, a (1-3)-th distance, and a (1-4)-th distance to the (1-1)-th point, the (1-2)-th point, the (1-3)-th point, and the (1-4)-th point, respectively, and a (2-1)-th distance, a (2-2)-th distance, a (2-3)-th distance, and a (2-4)-th distance to the (2-1)-th point, the (2-2)-th point, the (2-3)-th point, and the (2-4)-th point, respectively.

The (1-1)-th point, the (1-2)-th point, the (1-3)-th point, and the (1-4)-th point may overlap the (2-1)-th point, the (2-2)-th point, the (2-3)-th point, and the (2-4)-th point, respectively, in the first direction, in which the controller may determine: a first gap between the (1-1)-th point and the (2-1)-th point; a second gap between the (1-2)-th point and the (2-2)-th point; a third gap between the (1-3)-th point and the (2-3)-th point; and a fourth gap between the (1-4)-th point and the (2-4)-th point, based on the (1-1)-th distance, the (1-2)-th distance, the (1-3)-th distance, and the (1-4)-th distance to the (1-1)-th point, the (1-2)-th point, the (1-3)-th point, and the (1-4)-th point, respectively, and the (2-1)-th distance, the (2-2)-th distance, the (2-3)-th distance, and the (2-4)-th distance to the (2-1)-th point, the (2-2)-th point, the (2-3)-th point, and the (2-4)-th point, respectively.

The controller may determine at least one of the (1-2)-th inclination and the (2-2)-th inclination that allows the first gap and the third gap to be substantially equal to each other and the second gap and the fourth gap to be substantially equal to each other, based on a difference between the first gap, the second gap, the third gap, and the fourth gap.

The controller may determine an inclination of a first planar surface that defines a flatness of the front surface of the fingerprint sensing unit, based on the first distance, determine an inclination of a second planar surface that defines a flatness of the rear surface of the display panel, based on the second distance, and determine at least one of the (1-2)-th inclination and the (2-2)-th inclination that allows the first planar surface and the second planar surface to be parallel to each other, based on the inclination of the first planar surface and the inclination of the second planar surface.

The first planar surface that defines the flatness of the front surface of the fingerprint sensing unit may include a (1-1)-th plane and a (1-2)-th plane that has a minimum separation distance therebetween among first sets of two parallel planes on which the plurality of first points of the front surface of the fingerprint sensing unit are located, and the second planar surface that defines the flatness of the rear surface of the display panel may include a (2-1)-th plane and a (2-2)-th plane that has a minimum separation distance therebetween among second sets of two parallel planes on which plurality of second points of the front surface of the fingerprint sensing unit are located.

The controller may determine a moving distance in the first direction of the at least one of the first planar surface and the second planar surface, based on the first distance, the second distance, and a predetermined distance between the rear surface of the display panel and the front surface of the fingerprint sensing unit after bonding, and the vertical driving unit may move the at least one of the first planar surface and the second planar surface by the moving distance.

A device for bonding a fingerprint sensor to a display panel according to another exemplary embodiment includes: a picker for securing a rear surface of a fingerprint sensing unit of the fingerprint sensor and including a first planar surface having a (1-1)-th inclination; a stage for securing a front surface of the display panel and including a second planar surface having a (2-1)-th inclination; a first distance measuring unit for measuring a first distance to a plurality of first points located at a front surface of the fingerprint sensing unit; a controller for outputting a control signal that includes at least one of a first control signal for adjusting, based on the first distance, an inclination of the first planar surface of the picker from the (1-1)-th inclination to a (1-2)-th inclination and a second control signal for adjusting, based on the first distance, an inclination of the second planar surface of the stage from the (2-1)-th inclination to a (2-2)-th inclination; an inclination adjusting unit including at least one of a first inclination adjusting unit for adjusting an inclination of the first planar surface according to the first control signal and a second inclination adjusting unit for adjusting an inclination of the second planar surface according to the second control signal; and a vertical driving unit for moving at least one of the first planar surface and the second planar surface along a first direction to bond the front surface of the fingerprint sensing unit and the rear surface of the display panel to each other.

The controller may determine at least one of the (1-2)-th inclination and the (2-2)-th inclination that allows parallelism of the front surface of the fingerprint sensing unit to be substantially minimum with respect to the second planar surface.

The controller may determine an inclination of the first planar surface that defines a flatness of the front surface of the fingerprint sensing unit, based on the first distance, and determine at least one of the (1-2)-th inclination and the (2-2)-th inclination that allows the first planar surface and the second planar surface to be parallel to each other, based on the inclination of the first planar surface and the (2-1)-th inclination of the second planar surface.

A device for bonding a first component to a second component according to still another exemplary embodiment includes: a picker for securing a rear surface of the first component and including a first planar surface having a (1-1)-th inclination; a stage for securing a front surface of the second component and including a second planar surface having a (2-1)-th inclination; a first distance measuring unit for measuring a first distance to a plurality of first points located at a front surface of the first component; a second distance measuring unit for measuring a second distance to a plurality of second points located at a rear surface of the second component; a controller for outputting a control signal that includes at least one of a first control signal for adjusting, based on the first distance and the second distance, an inclination of the first planar surface of the picker from the (1-1)-th inclination to a (1-2)-th inclination and a second control signal for adjusting, based on the first distance and the second distance, in inclination of the second planar surface of the stage from the (2-1)-th inclination to a (2-2)-th inclination; an inclination adjusting unit including at least one of a first inclination adjusting unit adjusting an inclination of the first planar surface based on the first control signal and a second inclination adjusting unit adjusting an inclination of the second planar surface based on the second control signal; and a vertical driving unit for moving at least one of the first planar surface and the second planar surface along a first direction to bond the front surface of the first component and the rear surface of the second component to each other.

A picker for bonding a fingerprint sensor to a display panel, in which the fingerprint sensor includes: a fingerprint sensing unit having a front surface to be bonded to the display panel and a rear surface opposite to the front surface; and a flexible printed circuit board bonded to the rear surface of the fingerprint sensing unit, the picker according to still another exemplary embodiment includes: a head portion for supporting the fingerprint sensor. The head portion includes: a first surface contacting the rear surface of the fingerprint sensing unit; a second surface contacting the flexible printed circuit board; and a third surface overlapping the fingerprint sensing unit and the flexible printed circuit board in a plan view, and defining a recessed groove with respect to the first and second surfaces.

The second surface may not overlap the fingerprint sensing unit in a plan view, the third surface may be spaced apart from the fingerprint sensing unit and the flexible printed circuit board, and the third surface may be disposed between the first surface and the second surface.

A step difference between the first surface and the second surface may be substantially equal to or less than a thickness of the flexible printed circuit board.

The second surface may include a material substantially the same as a material forming the first surface, or a material having elasticity.

A method for bonding a fingerprint sensor to a display panel according to an exemplary embodiment includes the steps of: securing a rear surface of a fingerprint sensing unit of the fingerprint sensor to a first planar surface of a picker having a (1-1)-th inclination; securing a front surface of the display panel to a second planar surface of a stage having a (2-1)-th inclination; measuring a first distance to a plurality of first points located at a front surface of the fingerprint sensing unit by a first distance measuring unit; measuring a second distance to a plurality of second points located at a rear surface of the display panel by a second distance measuring unit; outputting, by a controller, a control signal that includes at least one of a first control signal for adjusting, based on the first distance and the second distance, an inclination of the first planar surface of the picker from the (1-1)-th inclination to a (1-2)-th inclination and a second control signal for adjusting, based on the first distance and the second distance, an inclination of the second planar surface of the stage from the (2-1)-th inclination to a (2-2)-th inclination; adjusting an inclination of the first planar surface by a first inclination adjusting unit according to the first control signal, and adjusting an inclination of the second planar surface by a second inclination adjusting unit based on the second control signal; and moving at least one of the first planar surface and the second planar surface along a first direction by a vertical driving unit to bond the front surface of the fingerprint sensing unit and the rear surface of the display panel to each other.

Outputting of the control signal may include: determining an inclination of the first planar surface that defines a flatness of the front surface of the fingerprint sensing unit, based on the first distance; and determining an inclination of the second planar surface that defines a flatness of the rear surface of the display panel, based on the second distance, and the steps may further include: determining at least one of the (1-2)-th inclination and the (2-2)-th inclination that allows the first planar surface and the second planar surface to be parallel to each other, based on the inclination of the first planar surface and the inclination of the second planar surface.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
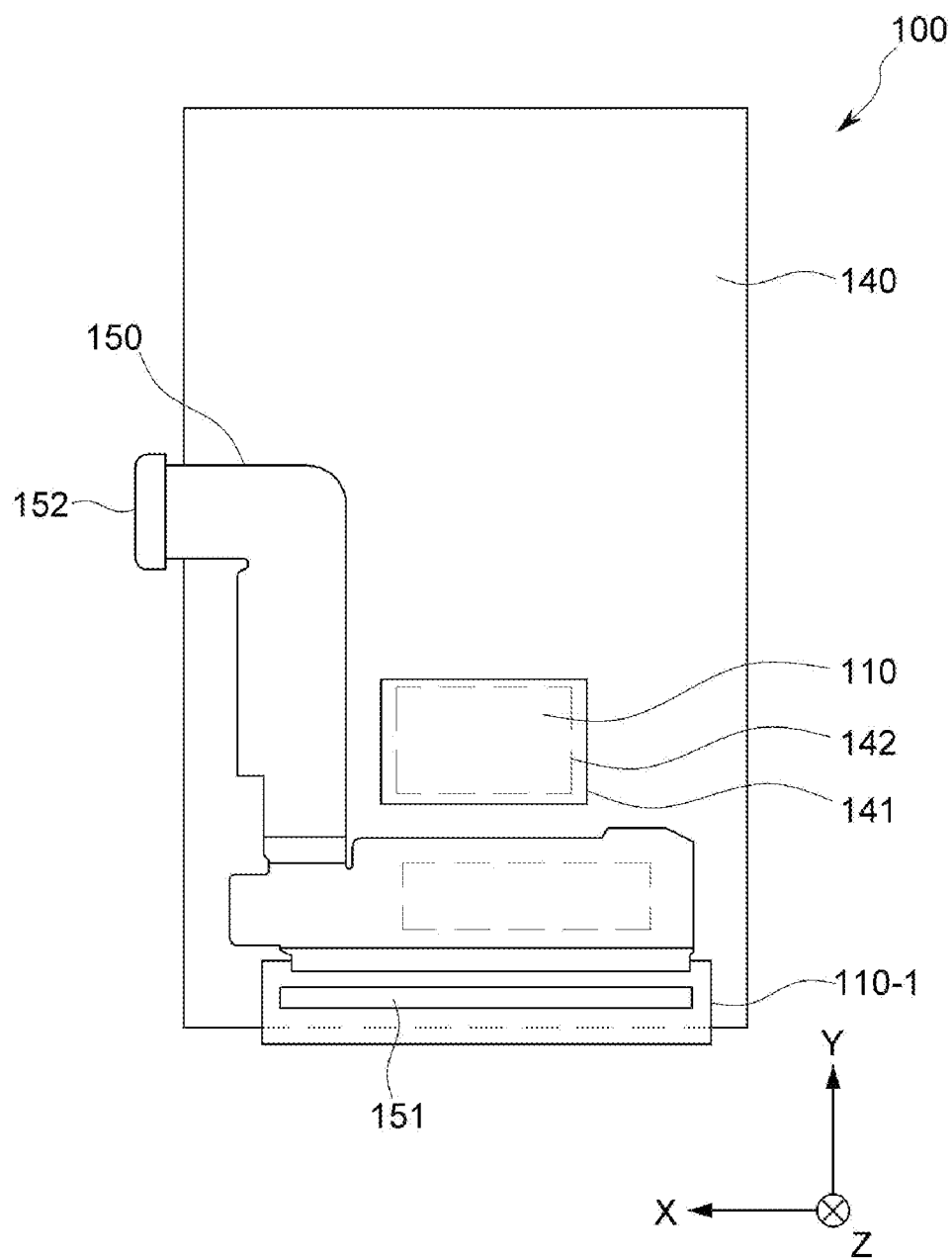
FIG. 1 is a plan view illustrating a display panel according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath"

other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

As used herein, a display device will be described as an organic light emitting diode (OLED) display device. However, the inventive concepts are not limited thereto, and in some exemplary embodiments, and the display device may be a liquid crystal display (LCD) device or a plasma display device.

Hereinafter, exemplary embodiments of the present invention will be described with reference to FIGS. 1 to 45.

Figure 2:
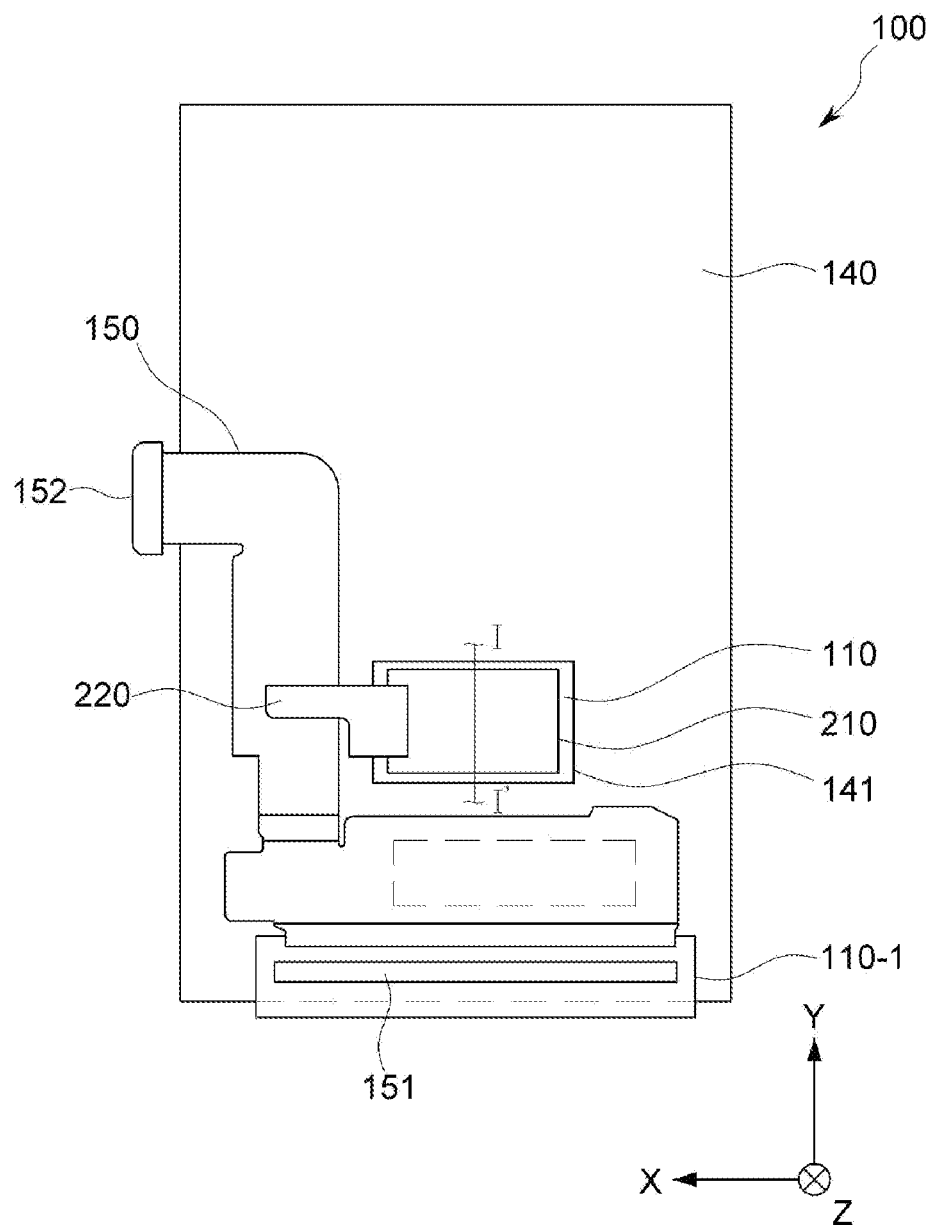
FIG. 2 is a plan view illustrating a display device according to an exemplary embodiment.
Figure 3:
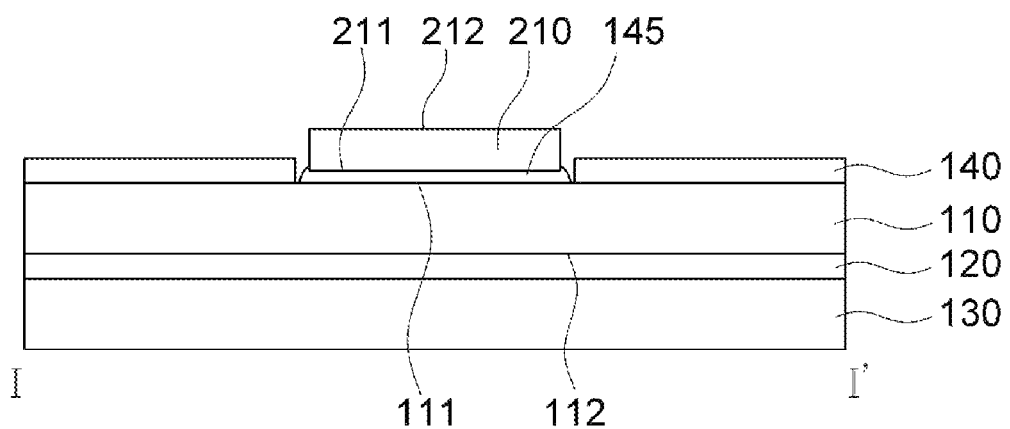
FIG. 3 is a cross-sectional view taken along line I-I' of FIG. 2.
Figure 4:
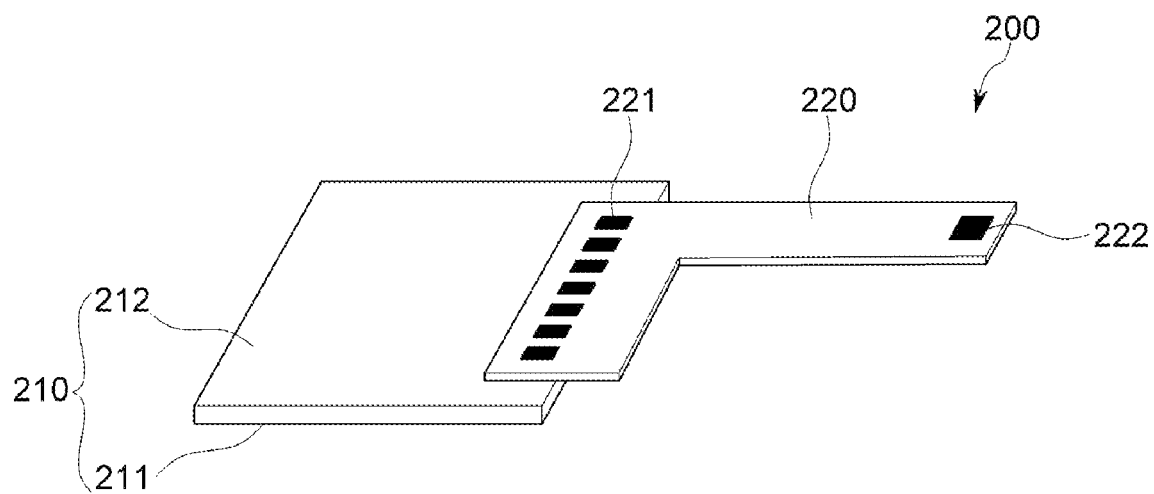
FIG. 4 is a perspective view illustrating a fingerprint sensor according to an exemplary embodiment.

FIG. 1 is a plan view illustrating a display panel according to an exemplary embodiment, FIG. 2 is a plan view illustrating a display device according to an exemplary embodiment, FIG. 3 is a cross-sectional view taken along line I-I' of FIG. 2, and FIG. 4 is a perspective view of a fingerprint sensor according to an exemplary embodiment.

Referring to FIGS. 1 to 4, a display device according to an exemplary embodiment includes a display panel 100 and a fingerprint sensor 200 provided at a rear surface 111 of the display panel 100. The display panel 100 may include a substrate 110, a display unit 120, a window 130, a first flexible printed circuit board 150, and a composite sheet 140. The fingerprint sensor 200 may include a fingerprint sensing unit 210 and a second flexible printed circuit board 220.

The display panel 100 may display, for example, arbitrary time information, text, video, photograph, two-dimensional or three-dimensional image, etc., on the front surface thereof. The type of the display panel 100 is not particularly limited, as long as the display panel 100 may display images. In an exemplary embodiment, the display panel 100 may be an OLED panel. However, the inventive concepts are not limited to a particular type of the display panel 100, and in some exemplary embodiments, the display panel 100 may include other types of a display panel.

The display panel 100 may be provided in various shapes, for example, a quadrangular plate having two pairs of sides parallel to each other. When the display panel 100 has a substantially quadrangular plate shape, any one of the two pairs of sides may be longer than the other pair of sides. Hereinafter, the display panel 100 will be described as having a substantially quadrangular shape with a pair of long sides and a pair of short sides, according to an exemplary embodiment.

However, the inventive concepts are not limited to a particular shape of the display panel 100, and may have various shapes. For example, in some exemplary embodiments, the display panel 100 may have a closed polygon shape including sides of a straight line, a circular shape, an elliptical shape, etc., including sides of a curved line, a semicircle, a semi ellipse, etc., including a straight line and a curved side.

The display panel 100 may be entirely or at least partially flexible. For example, the display panel 100 may have flexibility over the entire area, or may be flexible in areas that correspond to the flexible area.

The display panel 100 may display images toward a front surface. The display panel 100 includes a display area provided with the display unit 120 to display images, and a non-display area located on at least one side of the display area. For example, the non-display area may surround the display area.

The display panel 100 includes a sensing area 142 for sensing a fingerprint. The sensing area 142 corresponds to an area that overlaps the fingerprint sensing unit 210 in a plan view, and has a shape substantially the same as a shape of the fingerprint sensing unit 210. The sensing area 142 may overlap a part of or all of the display area. For example, the sensing area 142 may be surrounded by the display area.

A window 130 is provided on the side of the front surface of the display panel 100. The window 130 may have a plate shape corresponding to the shape of the display panel 100, and covers at least a part of the front surface of the display panel 100. For example, when the display panel 100 has a quadrangular shape, the window 130 may also have a corresponding quadrangular shape. Alternatively, when the display panel 100 has a circular shape, the window 130 may also have a corresponding circular shape. A front surface of the window 130 may correspond to the front surface of the display panel 100.

The window 130 transmits images from the display panel 100 and alleviates an external impact, thereby substantially preventing the display panel 100 from being broken or malfunctioning due to an external impact.

The window 130 may be entirely or at least partially flexible. For example, the window 130 may have flexibility over the entire area, or may be flexible in areas that correspond to the flexible area.

More particularly, the display device includes the substrate 110, the display unit 120 provided on the front surface 112 of the substrate 110, and the fingerprint sensor 200 provided on the rear surface 111 of the substrate 110.

The substrate 110 may include, for example, an insulating material, such as quartz, synthetic quartz, calcium fluoride, F-doped quartz, soda-lime glass, non-alkali glass, and a resin. In addition, the substrate 110 may include a material having flexibility so as to be curved or folded, and may have a single-layer structure or a multi-layer structure.

For example, the substrate 110 may include a material selected from the group consisting of, for example, polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate.

However, the inventive concepts are not limited to the above materials, and in some exemplary embodiments, for example, the substrate 110 may include glass fiber reinforced plastic, for example.

In an exemplary embodiment, the substrate 110 may be a polyimide substrate. The polyimide substrate may include a first polyimide layer, a barrier film layer, and a second polyimide layer, for example. When the polyimide substrate is formed thin and flexible, the polyimide substrate may be formed on a rigid carrier substrate to support formation of a light emitting structure. More particularly, the substrate 110 according to an exemplary embodiment may have a configuration, in which a first polyimide layer, a barrier film layer, and a second polyimide layer are laminated on a carrier substrate. For example, after an insulating layer is disposed on the second polyimide layer, a thin film transistor and a light emitting element, for example, may be formed on the insulating layer. After the formation of such light emitting structure, the carrier substrate may be removed. Since the polyimide substrate is thin and flexible, it may be difficult to directly form the light emitting structure on the polyimide substrate. As such, the light emitting structure may be formed using a rigid carrier substrate, and then the carrier substrate may be removed, so that the polyimide substrate may be used as the substrate 110.

The substrate 110 may have a plate shape having a front surface 112 and a rear surface 111 opposing the front surface 112. The rear surface 111 of the substrate 110 may correspond to the rear surface 111 of the display panel 100.

The display unit 120 may be provided on the front surface 112 of the substrate 110. In an exemplary embodiment, the display unit 120 may overlap a part of or all of the sensing area 142.

The display unit 120 displays images inputted by a user or information provided to the user. The display unit 120 may include a plurality of pixels disposed on the front surface 112 of the substrate 110, and at least one conductive line electrically connected to the pixels. The substrate 110 may include a flexible material so that at least a part (for example, a bending portion 110-1) thereof may be bent in a backward direction. The conductive line may include at least one gate line or at least one data line. In an exemplary embodiment, a plurality of gate lines and a plurality of data lines may be arranged in a matrix, and the plurality of pixels may be aligned adjacent to and electrically connected to points where the lines intersect each other.

The first flexible printed circuit board 150 may include a wiring structure that electrically connects a main circuit board to the display panel 100. The first flexible printed circuit board 150 according to an exemplary embodiment may be a flexible printed circuit board having flexibility. However, the inventive concepts are not limited thereto, and in some exemplary embodiments, the first flexible printed circuit board 150 may be a rigid printed circuit board 150. The first flexible printed circuit board 150 may be electrically connected to the main circuit board through a connector 152.

The first flexible printed circuit board 150 may include a driver IC 151, such as a driving integrated circuit (IC) for providing a driving signal and an image signal to the display panel 100 or a timing controller (T-con) for controlling the driving signal and the image signal. The driver IC 151 may include a gate driver IC for sequentially selecting a gate signal line of the display panel 100 and applying a scan signal (or the driving signal) thereto, and a data driver IC (or a source driver IC) for applying the image signal to a data signal line of the display panel 100. According to an exemplary embodiment, when the gate driver IC selects the gate signal line and applies the scan signal to change a corresponding pixel PX to an active state, the data driver IC may apply the image signal to the corresponding pixel through the data signal line. The timing controller may control a transmission time of the signal transmitted to the driver IC 151 to substantially prevent a display time difference that may occur during the process of outputting to the display panel 100.

The composite sheet 140 is attached on the rear surface 111 of the substrate 110 through an adhesive layer. The composite sheet 140 has an opening 141 for exposing the rear surface 111 of the substrate 110 in the sensing area 142. The opening 141 may have a shape substantially the same as a shape of the sensing area 142 or a shape of the fingerprint sensing unit 210. The opening 141 may be larger than the sensing area 142 or the fingerprint sensing unit 210 by a predetermined margin. The composite sheet 140 may include a heat radiation sheet for dissipating heat generated in the display unit 120, a black sheet for blocking light generated in the display unit 120, a pattern film for preventing unevenness of the substrate 110, and a conductive film for preventing damage to the display panel 100 due to static electricity.

The fingerprint sensor 200 is a sensing element for recognizing the user's fingerprint and may be disposed on the rear surface 111 of the substrate 110. The fingerprint sensor 200 includes the fingerprint sensing unit 210 having a flat plate shape, and the second flexible printed circuit board 220. According to an exemplary embodiment, the fingerprint sensing unit 210 may be provided only in the sensing area 142 of the rear surface 111 of the substrate 110.

In an exemplary embodiment, the fingerprint sensing unit 210 may have a size and shape suitable to recognize the fingerprint of a user. Hereinafter, the fingerprint sensing unit 210 will be described as having a substantially quadrangular shape. However, the inventive concepts are not limited to a particular shape of the fingerprint sensing unit 210, and in some exemplary embodiments, the fingerprint sensing unit 210 may have, substantially a circular, elliptical, semicircular, or polygonal shape.

The fingerprint sensing unit 210 may be connected to the first flexible printed circuit board 150 through the second flexible printed circuit board 220. The second flexible printed circuit board 220 includes a pad portion 221 connected to the fingerprint sensing unit 210 and a connector 222 connected to the first flexible printed circuit board 150. The second flexible printed circuit board 220 may include, for example, a separate wiring, a flexible printed circuit board, a tape carrier package, a connector, and a chip on film.

The fingerprint sensor 200 may be an optical sensor or an ultrasonic sensor. However, the inventive concepts are not limited thereto, and in some exemplary embodiments, the fingerprint sensor 200 may include various other types of fingerprint sensors. For example, the fingerprint sensor 200 may be a capacitive type, a heat sensing type, or a non-contact type.

The adhesive layer 145 bonds the fingerprint sensing unit 210 and the substrate 110 to each other. The adhesive layer 145 may include a curable adhesive. The curable adhesive may include at least one of, for example, a resin, an epoxy resin composition, a silicone resin composition, a modified epoxy resin composition, such as a silicone-modified epoxy resin, a modified silicone resin composition, such as an epoxy-modified silicone resin, a polyimide resin composition, a modified polyimide resin composition, polyphthalamide (PPA), a polycarbonate resin, polyphenylene sulfide (PPS), liquid crystal polymer (LCP), an ABS resin, a phenol resin, an acrylic resin, and a PBT resin.

Figure 5:
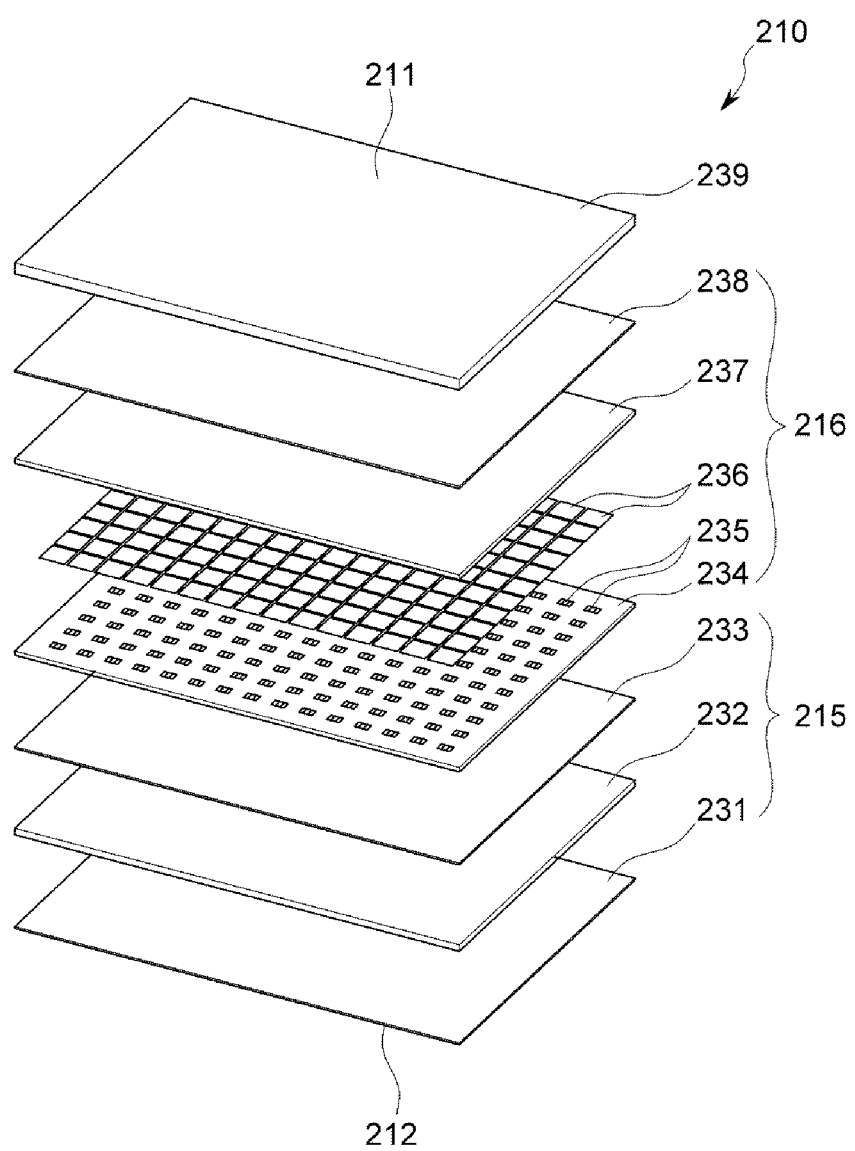
FIG. 5 is an exploded perspective view of a fingerprint sensing unit according to an exemplary embodiment.

FIG. 5 is an exploded perspective view of a fingerprint sensing unit 210 according to an exemplary embodiment.

The fingerprint sensing unit 210 according to an exemplary embodiment includes an ultrasonic transmitter 215 and an ultrasonic receiver 216 disposed below a planarization layer 239. A front surface 211 of the planarization layer 239 may correspond to the front surface 211 of the fingerprint sensing unit 210. The ultrasonic transmitter 215 may include a piezoelectric transmitter layer 232, which is substantially flat and may function as a plane wave generator. The ultrasonic waves may be generated by applying a voltage to a piezoelectric layer, and expanding or contracting the layer according to the applied signal, thus generating a plane wave. A voltage may be applied to the piezoelectric transmitter layer 232, which is flat, through a first transmitter electrode 233 and a second transmitter electrode 231. Ultrasonic waves may be generated by varying a thickness of a layer through a piezoelectric effect. Such ultrasonic waves may move toward a finger (or another object to be detected), and may pass through the planarization layer 239 and the display panel 100. A part of the wave that is not absorbed or transmitted by the object to be detected may be reflected, pass through the planarization layer 239 and the display panel 100 again, and received by at least a portion of the ultrasonic receiver 216. The first and second transmitter electrodes 233 and 231 may be metallized electrodes, for example, metal layers that coat opposite sides of the piezoelectric transmitter layer 232.

The ultrasonic receiver 216 may include an array of sensor pixel circuits 235 and a piezoelectric receiver layer 237 disposed on a substrate 234, which may also be referred to as a backplane. In an exemplary embodiment, each sensor pixel circuit 235 may include one or more additional circuit elements, such as one or more TFT elements, electrical interconnection traces, diodes, and capacitors, for example. Each sensor pixel circuit 235 may be configured to convert a charge generated in the piezoelectric receiver layer 237 adjacent to the pixel circuit 235 into an electrical signal. Each sensor pixel circuit 235 may include a pixel input electrode 236 that electrically couples the piezoelectric receiver layer 237 to the sensor pixel circuit 235.

In an exemplary embodiment, a receiver bias electrode 238 is disposed on one side of the piezoelectric receiver layer 237 adjacent to the planarization layer 239. The receiver bias electrode 238 may be a metallized electrode, and may be grounded or biased to control which signals may be delivered to the array of sensor pixel circuits 235. Ultrasonic energy reflected from the exposed front surface 211 of the planarization layer 239 may be converted into localized charges by the piezoelectric receiver layer 237. These localized charges may be collected by the pixel input electrodes 236 and delivered to the sensor pixel circuits 235 therebelow. The charges may be amplified or buffered by the sensor pixel circuits 235.

The planarization layer 239 may include any suitable material that may be acoustically coupled to the receiver, such as plastic, ceramic, sapphire, metal, and glass. In an exemplary embodiment, the planarization layer 239 may correspond to the display panel 100. In particular, when ultrasonic transmitter 215 is in use, fingerprint detection and imaging may be performed through relatively thick planarization layers 239, which may have a thickness of about 3 mm and greater. However, for implementations of the ultrasonic receiver 216 capable of imaging fingerprints in a force detection mode or a capacitance detection mode, a thinner and relatively more compliant planarization layer 239 may be desirable. In an exemplary embodiment, the planarization layer 239 may include one or more polymers, for example, one or more types of parylene, and may be formed to be substantially thinner. For example, in an exemplary embodiment, the planarization layer 239 may be tens of microns thick, or even less than 10 microns thick.

Piezoelectric materials that may be used to form the piezoelectric receiver layer 237 may include piezoelectric polymers having suitable acoustic properties, such as acoustic impedances in a range from about 2.5 MRayls to about 5 MRayls. More particularly, piezoelectric materials may include ferroelectric polymers, such as polyvinylidene fluoride (PVDF) and polyvinylidene fluoride-trifluoroethylene (PVDF-TrFE) copolymers. Examples of PVDF copolymers may include 60:239 (mol %) PVDF-TrFE, 70:30 PVDF-TrFE, 80:215 PVDF-TrFE and 90:10 PVDR-TrFE. Other examples of applicable piezoelectric materials may include polyvinylidene chloride (PVDC), homopolymers and copolymers, polytetrafluoroethylene (PTFE) homopolymers and copolymers, and diisopropylammonium bromide (DIPAB).

A thickness of each of the piezoelectric transmitter layer 232 and the piezoelectric receiver layer 237 may be selected to be suitable for generating and receiving ultrasonic waves. In an exemplary embodiment, the PVDF planar piezoelectric transmitter layer 232 has a thickness of about 28 µm, and the PVDF-TrFE receiver layer 237 has a thickness of about 12 µm. Exemplary frequencies of ultrasonic waves may range from about 5 MHz to about 30 MHz, with wavelengths of about 1 millimeter or less.

Figure 6:
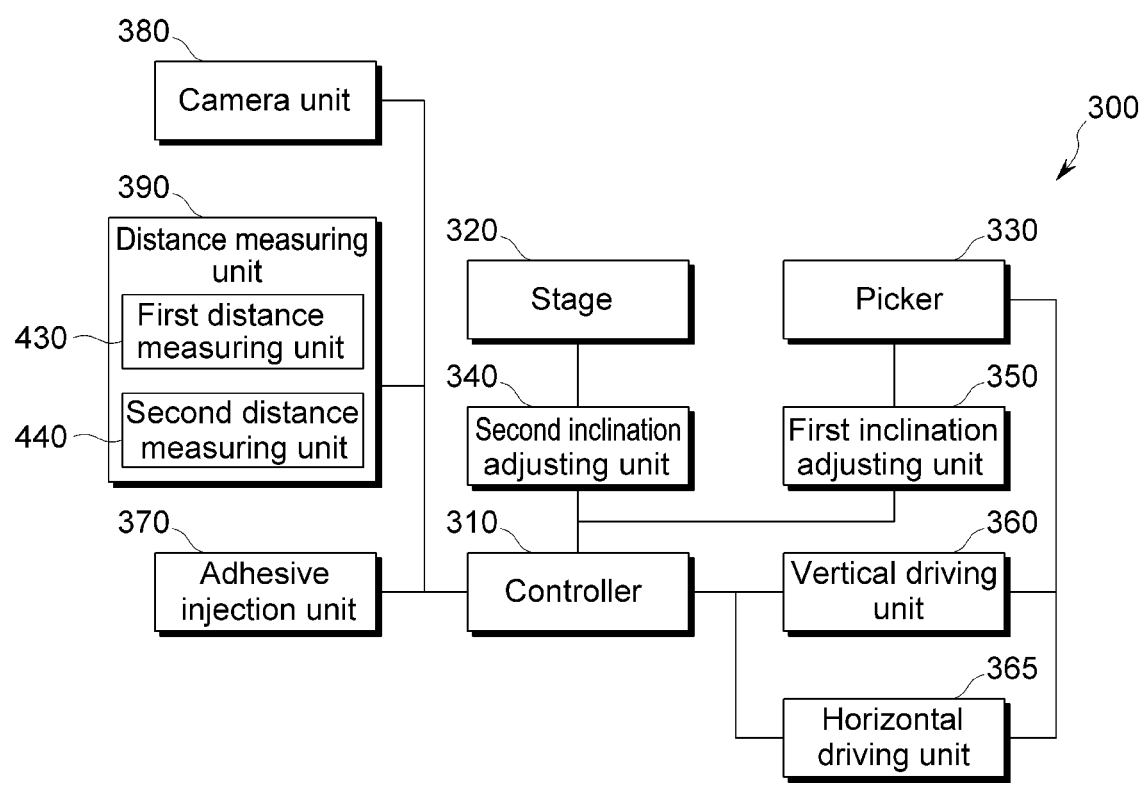
FIG. 6 is a block diagram of a bonding device according to an exemplary embodiment.
Figure 7:
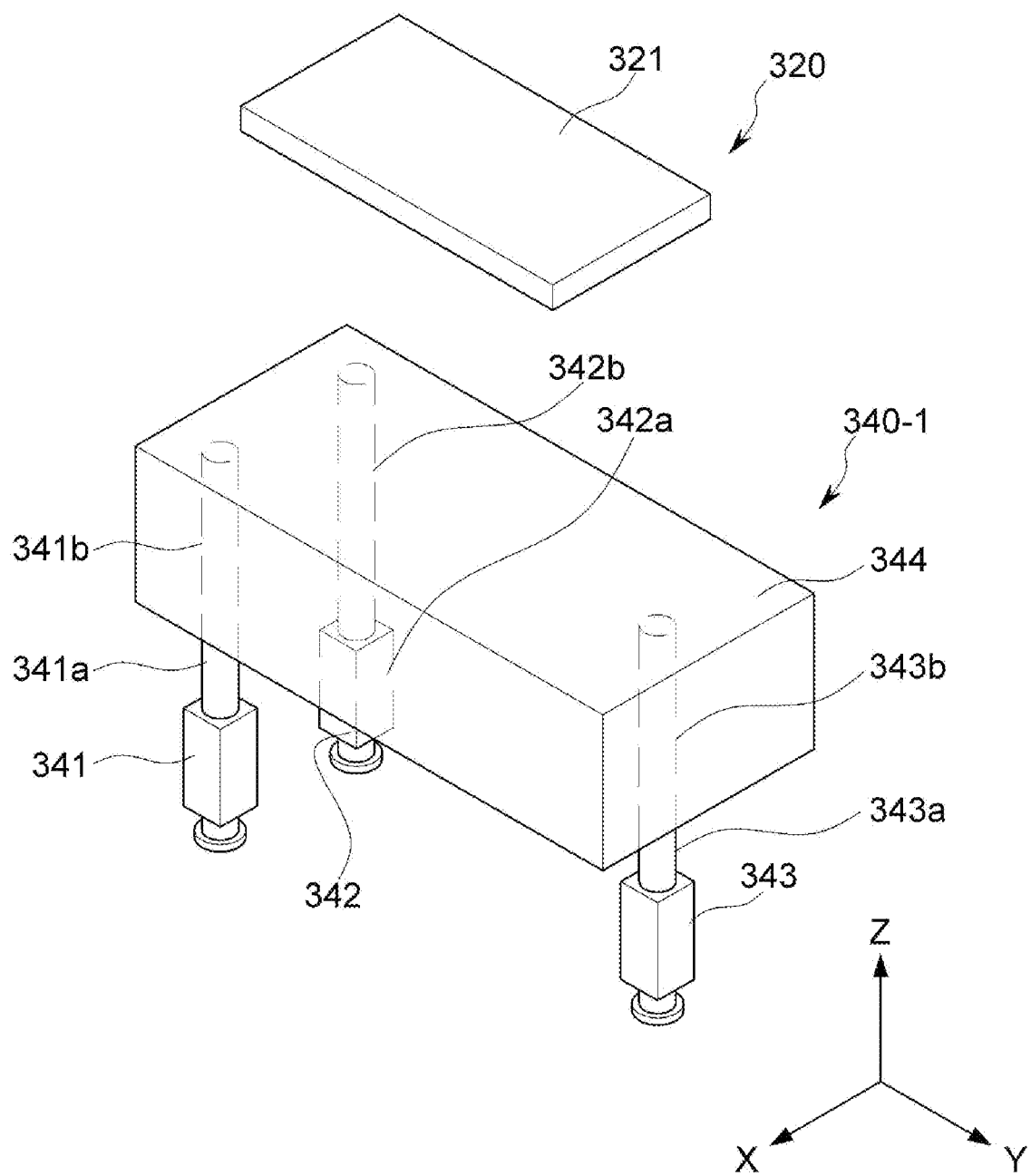
FIG. 7 is a perspective view of a second inclination adjusting unit and a stage according to an exemplary embodiment.
Figure 8:
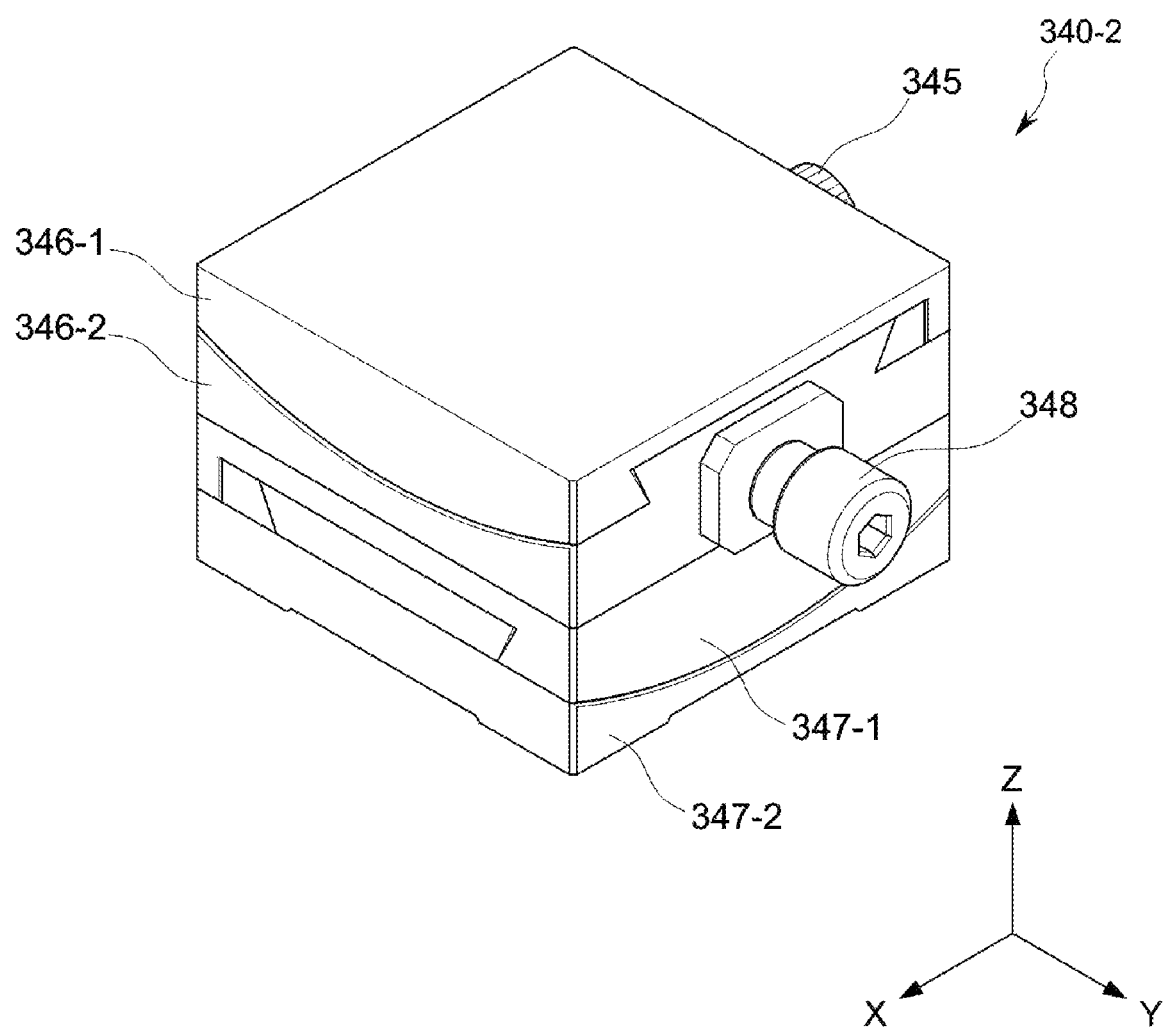
FIG. 8 is a perspective view of a second inclination adjusting unit according to another exemplary embodiment.
Figure 9:
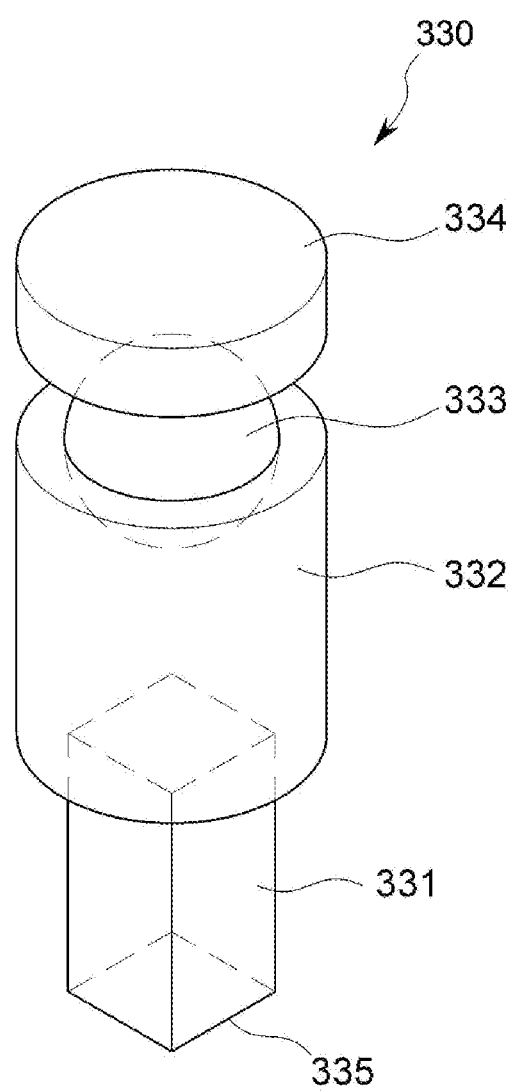
FIG. 9 is a perspective view of a picker according to an exemplary embodiment.
Figure 10A:
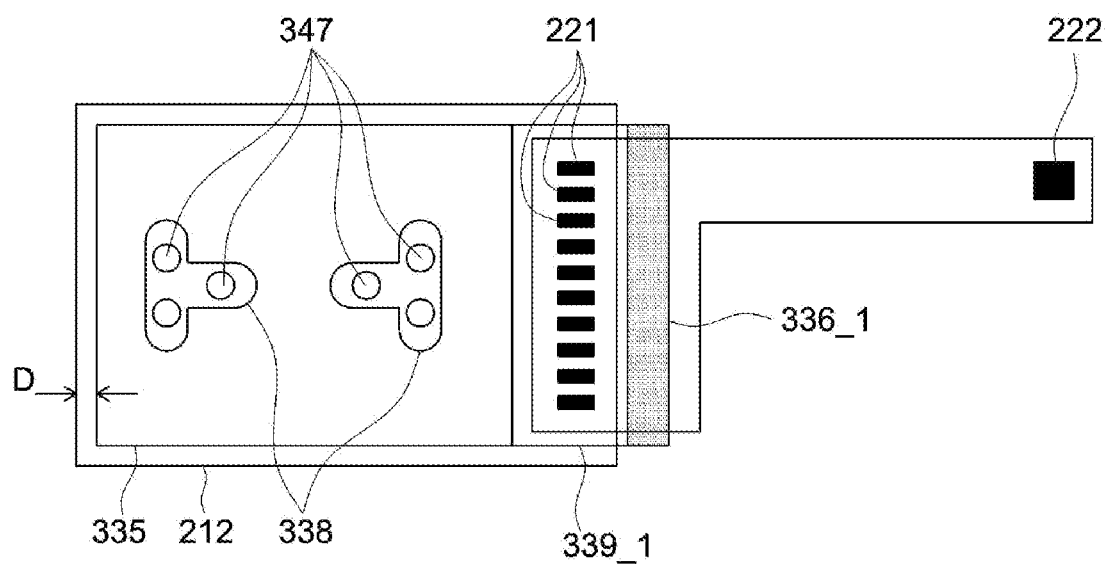
FIGS. 10A and 10B are a plan view and a cross-sectional view of a fingerprint sensor and a picker bonded to each other according to an exemplary embodiment.
Figure 10B:
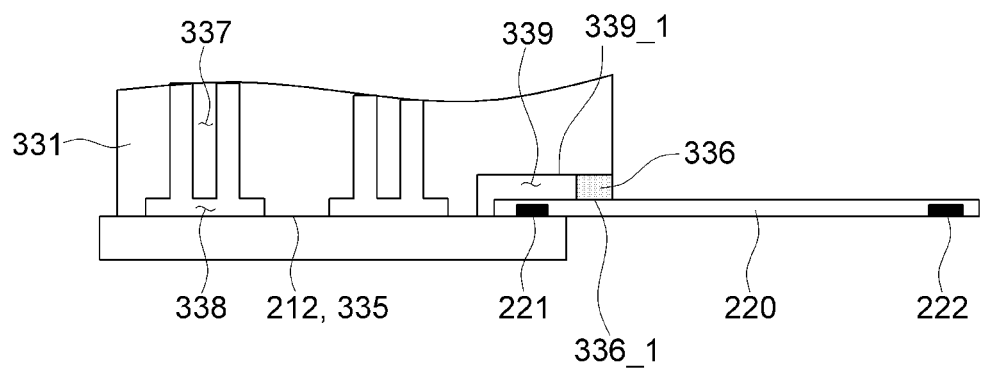
Figure 11:
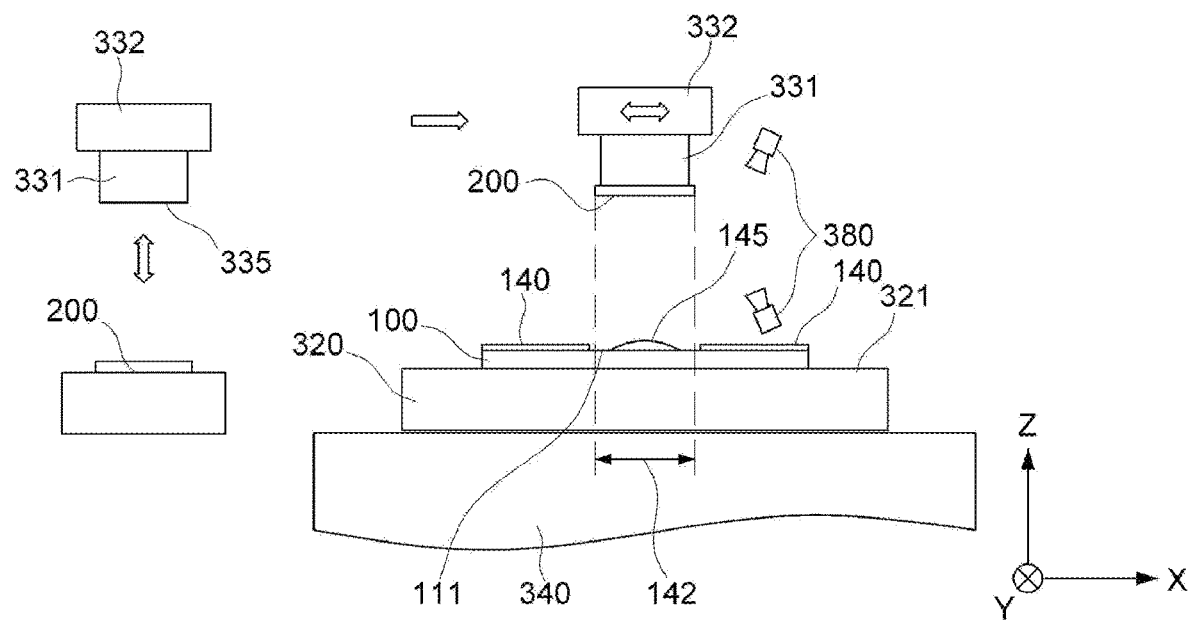
FIG. 11 is a view illustrating vertical movement and horizontal movement of a bonding device according to an exemplary embodiment.

FIG. 6 is a block diagram of a bonding device 300 according to an exemplary embodiment, FIG. 7 is a perspective view of a second inclination adjusting unit 340 and a stage 320 according to an exemplary embodiment, FIG. 8 is a perspective view of a second inclination adjusting unit 340 according to an exemplary embodiment, FIG. 9 is a perspective view of a picker 330 according to an exemplary embodiment, FIGS. 10A and 10B are a plan view and a cross-sectional view illustrating a fingerprint sensor 200 and a picker 330 bonded to each other according to an exemplary embodiment, and FIG. 11 is a view illustrating vertical movement and horizontal movement of a bonding device 300 according to an exemplary embodiment.

Referring to FIGS. 6 and 11, a bonding device 300 according to an exemplary embodiment includes a picker 330 for picking up the fingerprint sensor 200, transferring the fingerprint sensor 200 toward the display panel 100, and then bonding the fingerprint sensor 200 to the rear surface 111 of the display panel 100, more particularly, to the rear surface 111 of the substrate 110; and a stage 320 for supporting the display panel 100 when the fingerprint sensor 200 is pressed to the display panel 100 by the picker 330. The picker 330 may include an adsorption surface 335 or a first planar surface 335 to which the front surface 211 of the fingerprint sensing unit 210 is secured. The stage 320 may include an adsorption surface 321 or a second planar surface 321 to which the rear surface 111 of the display panel 100 is secured.

In addition, the bonding device 300 according to an exemplary embodiment may include a horizontal driving unit 365 for moving the picker 330 in a horizontal direction (e.g., a direction substantially perpendicular to the gravity direction, a direction substantially parallel to an XY plane, an X-axis direction, and a Y-axis direction), and a vertical driving unit 360 for moving the picker 330 in a vertical direction (e.g., a direction substantially perpendicular to the XY plane, and a Z-axis direction), according to a control signal of a controller 310. In addition, the horizontal driving unit 365 may include a driving unit for rotating the adsorption surface 335 of the picker 330 about a vertical direction (e.g., the Z-axis direction). In addition, the bonding device 300 may further include a horizontal driving unit for moving the stage 320 in the horizontal direction (e.g., a direction substantially perpendicular to the XY plane, the X-axis direction, and the Y-axis direction), and a vertical driving unit for moving the stage 320 in the vertical direction (e.g., a direction substantially perpendicular to the XY plane, and the Z-axis direction).

In addition, the bonding device 300 according to an exemplary embodiment may include a camera unit 380 for imaging the adsorption surface 321 of the stage 320 and/or the adsorption surface 335 of the picker 330. The controller 310 analyzes an image captured by the camera unit 380 to calculate a position error of the sensing area 142 of the display panel 100 adsorbed to the adsorption surface 321 of the stage 320, and the fingerprint sensing unit 210. The position error may include an error in the horizontal direction (e.g., the X-axis direction and the Y-axis direction) and a rotation error about the vertical direction (e.g., the Z-axis direction). The controller 310 controls the horizontal driving unit 365 in accordance with the position error calculated from the captured image to horizontally move or rotate the adsorption surface 335 of the picker 330, so that the fingerprint sensing unit 210 is precisely aligned with the sensing area 142 in the vertical direction (e.g., the Z-axis direction).

Referring to FIGS. 7 and 11, the picker 330 adsorbs the fingerprint sensor 200 from a rail in a state where the display panel 100 moves to and waits at a predetermined working position, and transports the fingerprint sensor 200 above the sensing area 142 of the display panel 100 over which the adhesive 145 is applied. In such a state, the picker 330 moves downward and presses the fingerprint sensor 200 to the display panel 100 so that they may be bonded to each other. In this case, the stage 320 positioned under the display panel 100 may support the display panel 100, according to an exemplary embodiment.

The picker 330 includes a head portion 331 that adsorbs and supports the fingerprint sensor 200 during a transfer process or a pressing process of the fingerprint sensor 200. The structure of the head portion 331 will be described below. The picker 330 may include a first inclination adjusting unit 350 that may adjust an inclination of the picker 330, or more precisely, an adsorption surface 335 of the head portion 331.

The stage 320 directly contacts the display panel 100 to support the display panel 100. The second inclination adjusting unit 340 adjusts a horizontal level, i.e., inclination, of the stage 320 while supporting the stage 320 from below the stage 320.

A distance measuring unit 390 measures a distance to a plurality of points located at the adsorption surface 321 of the stage 320, the adsorption surface 335 of the picker 330, the front surface 211 of the fingerprint sensing unit 210, and the rear surface 111 of the display panel 100. The distance measuring unit 390 may include a first distance measuring unit 430 for measuring a distance from a predetermined reference plane to the plurality of points (410 in FIG. 12 and FIG. 13) located at the adsorption surface 335 of the picker 330, and a second distance measuring unit 440 for measuring a distance from a predetermined reference plane to the plurality of points (420 in FIG. 12 and FIG. 13) located at the adsorption surface 321 of the stage 320.

In an exemplary embodiment, the distance measuring unit 390 includes one or more ultrasonic sensors, and measures a distance by using a time for which an ultrasonic signal emitted from each ultrasonic sensor is reflected from a point on an arbitrary plane and returns. However, the inventive concepts are not limited thereto, and in some exemplary embodiments, the distance measuring unit 390 may include, for example, a confocal sensor, an interferometer sensor, a 2D/3D scanner, and a gap sensor.

A method of measuring the distance to a plurality of points by using the distance measuring unit 390 will be described below with reference to FIGS. 12 to 22.

The first inclination adjusting unit 350 adjusts an inclination of the adsorption surface 335 of the picker 330 from a (1-1)-th inclination to a (1-2)-th inclination based on a control signal output from the controller 310 to be described below. The second inclination adjusting unit 340 is disposed below the stage 320, and adjusts an inclination of the adsorption surface 321 of the stage 320 from a (2-1)-th inclination to a (2-2)-th inclination based on a control signal output from the controller 310 to be described below.

The controller 310 calculates a deviation between distances from the reference plane to the plurality of points, and generates the control signal for adjusting the inclination of the first inclination adjusting unit 350 and/or the second inclination adjusting unit 340 based on the calculated deviation.

An adhesive injector 370 applies an adhesive 145 over the rear surface 111 of the display panel 100 and/or the front surface 211 of the fingerprint sensing unit 210.

FIGS. 7 and 8 are views illustrating the second inclination adjusting unit 340 according to exemplary embodiments.

Referring to FIG. 7, the second inclination adjusting units 340_1 according to the illustrated exemplary embodiment may include a (2-1)-th inclination adjusting unit driven by a third motor 343, a (2-2)-th inclination adjusting unit driven by first and second motors 341 and 342, and an adjustment plate 344 supporting the stage 320.

The first and second motors 341 and 342 are located below one side of the adjustment plate 344, and the third motor 343 is located below another side of the adjustment plate 344. Each of the motors 341, 342, and 343 is connected to through-holes 341b, 342b, and 343b defined at edge portions of one side of the adjustment plate 344 and a central portion of another side of the adjustment plate 344 by screw shafts 341a, 342a, and 343a, respectively. Threads may be defined inside the through holes 341b, 342b, and 343b, and threads of the screw shafts 341a, 342a, and 343a and the threads of the through holes 341b, 342b, and 343b are engaged with each other to operate.

When the first motor 341 is driven, the adjustment plate 344 moves up or down (ascends or descends) in accordance with a rotation direction of the screw shaft 341a. For example, when the screw shaft 341a rotates in a clockwise direction, only an area of the adjustment plate 344 connected to the screw shaft 341a therethrough may ascend, and in this case, the screw shaft 342a connected to another side of the adjustment plate 344 therethrough supports the elevation of the adjustment plate 344. Accordingly, when the adjustment plate 344 rotates about the Y axis, for example, the inclination of the stage 320 disposed on the upper surface of the adjustment plate 344 may be adjusted.

On the other hand, when the second motor 342 is driven, only the adjustment plate 344 connected to the screw shaft 342a therethrough moves up or down, and in this case, the screw shaft 341a connected to another side of the adjustment plate 344 therethrough supports the rotation of the adjustment plate 344 about the Y axis.

In addition, when the third motor 343 is driven, the adjustment plate 344 moves up or down in accordance with a rotation direction of the screw shaft 343a. For example, when the screw shaft 343a rotates in a clockwise direction, only an area of the adjustment plate 344 connected to the screw shaft 343a therethrough may be elevated. In such case, when the adjustment plate 344 rotates about the X axis, for example, the inclination of the stage 320 disposed on the upper surface of the adjustment plate 344 may be adjusted.

Referring to FIG. 8, the second inclination adjusting unit 340_2 according to the illustrated exemplary embodiment includes a first plate 346-1 for supporting the stage 320, a second plate 346-2 for supporting the first plate 346-1, a third plate 347-1 for supporting the second plate 346-2, and a fourth plate 347-2 for supporting the third plate 347-1.

The first plate 346-1 and the second plate 346-2 are engaged with each other in a curved surface with respect to the X axis, and the third plate 347-1 and the fourth plate 347-2 are engaged with each other in a curved surface with respect to the Y axis.

The first motor 348 moves the first plate 346-1 in the Y-axis direction with respect to the second plate 346-2, so that an upper surface of the first plate 346-1 may rotate about the X-axis with respect to the second plate 346-2. The second motor 345 moves the third plate 346-1 in the X-axis direction with respect to the fourth plate 347-2, so that an upper surface of the third plate 347-1 may rotate about the Y-axis with respect to the fourth plate 347-2.

Although the structure of the second inclination adjusting unit 340 has been described with reference to FIGS. 7 and 8, the inventive concepts are not limited thereto. For example, the second inclination adjusting unit 340 may include inclination adjusting units of various configurations that may rotate the adsorption surface 321 of the stage 320 with respect to any directions, e.g., the X-axis direction and the Y-axis direction that are substantially parallel to the XY plane and intersect each other.

FIG. 9 is a perspective view of a picker 330 according to an exemplary embodiment, and FIGS. 10A and 10B are a plan view and a cross-sectional view illustrating the fingerprint sensor 200 and the picker 330 bonded to each other according to an exemplary embodiment.

Referring to FIG. 9, the picker 330 may include a securing portion 334, a drive shaft 333, an extension portion 332, and a head portion 331.

The securing portion 334 may be secured to the vertical driving unit 360 and the horizontal driving unit 365. The head portion 331 may be secured to the vertical driving unit 360 and the horizontal driving unit 365 by the securing portion 334.

The extension portion 332 is connected to the securing portion 334 through the drive shaft 333. The extension portion 332 is rotatably coupled to the drive shaft 333. The extension portion 332 may rotate about the Z axis. In addition, the extension portion 332 may rotate about the X-axis and the Y-axis under the control of the first inclination adjusting unit 350.

The head portion 331 is coupled to the extension portion 332. The head portion 331 is located at an end of the picker 330. A lower surface of the head portion 331 is an adsorption surface 335, which may be in direct contact with the fingerprint sensor 200.

Referring to FIGS. 10A and 10B, the head portion 331 includes a first surface 335 (an adsorption surface) that contacts the rear surface 212 of the fingerprint sensing unit 210, a second surface 336_1 that contacts the second flexible printed circuit board 220, and a third surface 339_1 that overlaps the fingerprint sensing unit 210 and the second flexible printed circuit board 220 in a plan view and defines a recessed groove 339 with respect to the first and second surfaces 335 and 336_1.

The head portion 331 includes a first surface 335 (e.g., an adsorption surface), which is a plane that directly contacts the fingerprint sensing unit 210. The adsorption surface 335 is adsorbed to the rear surface 212 of the fingerprint sensing unit 210, to which the second flexible printed circuit board 220 is attached. The adsorption surface 335 does not overlap the second flexible printed circuit board 220 in a plan view, but contacts only the rear surface 212 of the fingerprint sensing unit 210 exposed by the second flexible printed circuit board 220. An edge of the adsorption surface 335 may be substantially parallel to an edge of the fingerprint sensing unit 210 that is exposed. The edge of the adsorption surface 335 and the edge of the fingerprint sensing unit 210 may be spaced apart from each other by a distance within a predetermined distance D in a plan view. In addition, an edge of the adsorption surface 335 and an edge of the second flexible printed circuit board 220 may be spaced apart from each other by a predetermined distance D in a plan view. For example, the distance D may be about 1 mm, more preferably about 0.5 mm.

The head portion 331 includes a second surface 339_1 that defines a recessed groove 339, which is concave with respect to the adsorption surface 335 in an area overlapping the pad portion 221 of the second flexible printed circuit board 220 in a plan view. The recessed groove 339 and the second surface 339_1 overlap a part of or all of the overlapping area between the fingerprint sensing unit 210 and the second flexible printed circuit board 220 in a plan view. The second surface 339_1 does not contact the second flexible printed circuit board 220. A step difference between the second surface 339_1 and the adsorption surface 335 is greater than a thickness of the second flexible printed circuit board 220. The second surface 339_1 and the recessed groove 339 extends along an edge of the adsorption surface 335 according to the position of the pad portion 221. In addition, the recessed groove 339 may expose a part of the fingerprint sensing unit 210 adjacent to the second flexible printed circuit board 220.

The head portion 331 includes a protruding portion 336 that protrudes from the second surface 339_1 at an area that overlaps the second flexible printed circuit board 220 in a plan view but does not overlap the pad portion 221 in a plan view. The third surface 336-1 of the protruding portion 336 may not overlap the fingerprint sensing unit 210 in a plan view. In addition, the third surface 336-1 directly contacts the second flexible printed circuit board 220. The third surface 336-1 contacting the second flexible printed circuit board 220 may not protrude beyond the adsorption surface 335. A step difference between the third surface 336-1 and the adsorption surface 335 may be substantially equal to a thickness of the second flexible printed circuit board 220. Alternatively, the step difference between the third surface 336-1 and the adsorption surface 335 may be less than a thickness of the second flexible printed circuit board 220. The third surface 336-1 extends along one side of the recessed groove 339 (e.g., the opposite side of the adsorption surface 335).

In an exemplary embodiment, the protruding portion 336 may be unitarily formed with the head portion 331. The protruding portion 336 may include a material substantially the same as a material included in the head portion 331. Alternatively, the protruding portion 336 may include a material different from a material of the head portion 331. The protruding portion 336 may include metal, such as aluminum. Alternatively, the protruding portions 336 may include a cushioning material that has elasticity. The third surface 336-1 may include a metal material substantially the same as a material included in the adsorption surface 335. Alternatively, the third surface 336-1 may include a cushioning material having elasticity.

The head portion 331 may include at least one suction hole 337. The suction holes 337 may be connected to each other through connection holes 338 concave with respect to the adsorption surface 335. The connection hole 338 may be located at the adsorption surface of the head portion 331. The suction hole 337 may be connected to a vacuum pump. The vacuum pump sucks air into the head portion 331 through the suction hole 337. The fingerprint sensing unit 210 may be attached to the adsorption surface 335 of the head portion 331 by the suction force of the head portion 331.

According to an exemplary embodiment, as the recessed groove is defined at the head portion 331 at a position corresponding to the pad portion 221, the pad portion 221 may be substantially prevented from being damaged when the fingerprint sensor 200 is bonded. Meanwhile, when a pressure applied to the fingerprint sensing unit 210 in the area overlapping the pad portion 221 is reduced due to the recessed groove 339, and a deviation of the gaps between the fingerprint sensing unit 210 and the display panel 100 may be increased after bonding. According to an exemplary embodiment, since the protruding portion 336 for pressing the second flexible printed circuit board 220 is formed at an area that does not overlap the pad portion 221, a pressure loss in the fingerprint sensing unit 210 at an area that overlaps the pad portion 221 may be compensated. Accordingly, the fingerprint sensing unit 210 and the display panel 100 may be bonded at uniform intervals without damaging the pad portion 221.

Figure 12:
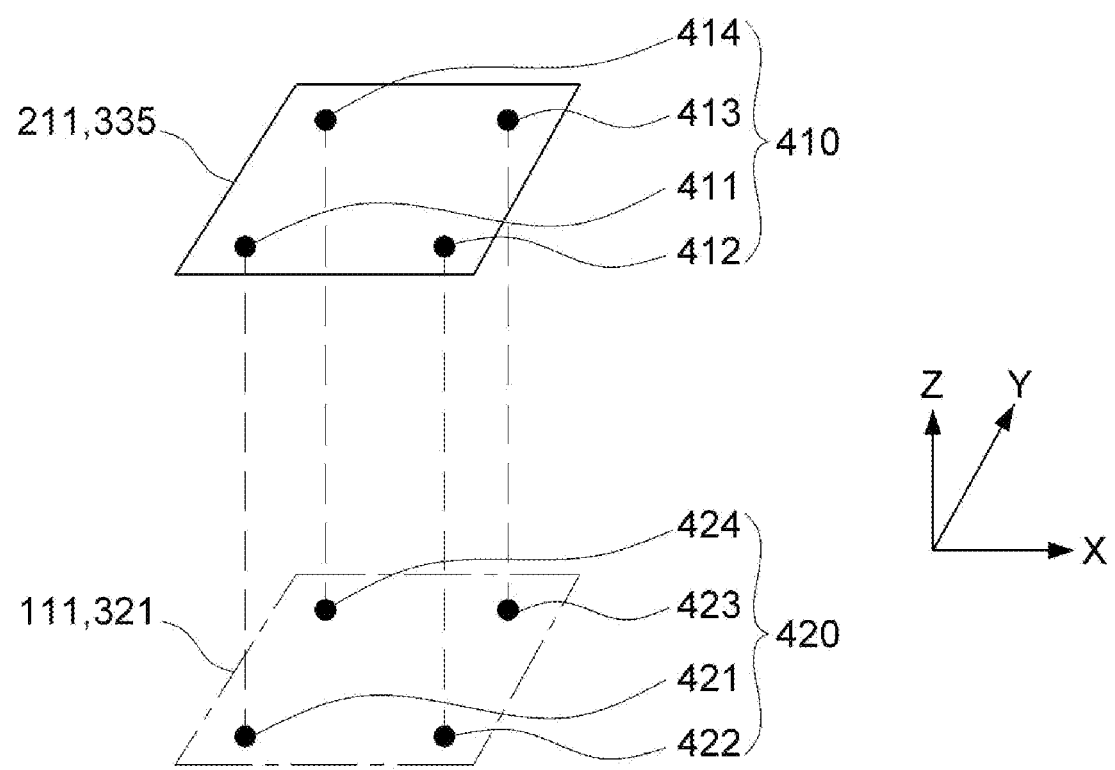
FIG. 12 is a view illustrating a plurality of distance measurement points according to an exemplary embodiment.
Figure 13:
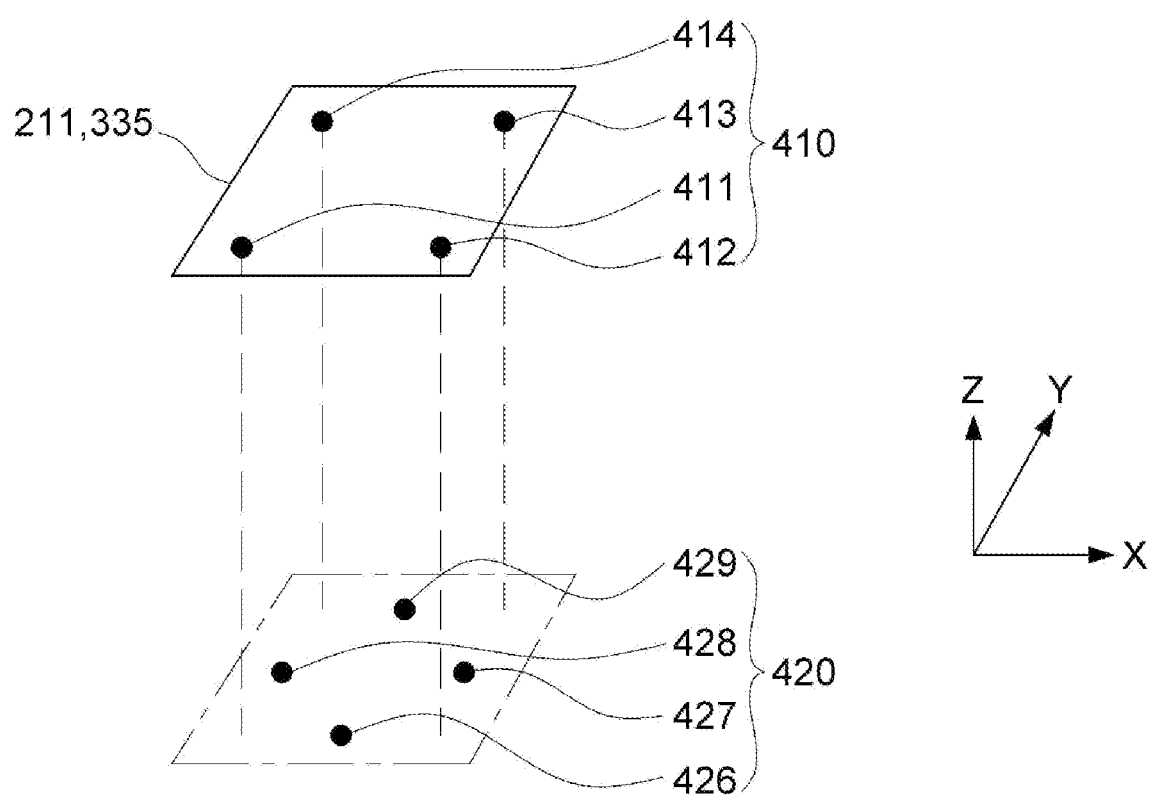
FIG. 13 is a view illustrating a plurality of distance measurement points according to another exemplary embodiment.

FIGS. 12 and 13 are views illustrating a plurality of distance measurement points according to exemplary embodiments.

According to an exemplary embodiment, the first distance measuring unit 430 measures a distance from a predetermined reference plane to a plurality of first points 410 located at the adsorption surface 335 of the picker 330 and/or the front surface 211 of the fingerprint sensing unit 210 adsorbed to the adsorption surface 335 of the picker 330. The plurality of first points 410 may include (1-1)-th, (1-2)-th, (1-3)-th, and (1-4)-th points 411, 412, 413, and 414 that correspond to vertices of a quadrangle, a rectangle, a rhombus, or a square on the XY plane.

According to an exemplary embodiment, the second distance measuring unit 440 measures a distance from a predetermined reference plane to a plurality of second points 420 located at the adsorption surface 321 of the stage 320 and/or the rear surface 111 of the display panel 100 adsorbed to the adsorption surface 321 of the stage 320. The plurality of second points 420 may include (2-1)-th, (2-2)-th, (2-3)-th, and (2-4)-th points 421, 422, 423, and 424 that correspond to vertices of a quadrangle, a rectangle, a rhombus or a square on the XY plane.

The (1-1)-th, (1-2)-th, (1-3)-th, and (1-4)-th points 411, 412, 413, and 414 may correspond to the (2-1)-th, (2-2)-th, (2-3)-th, and (2-4)-th points 421, 422, 423, and 424, respectively, in terms of their position on the XY plane. When the fingerprint sensing unit 210 and the display panel 100 are bonded to each other, the (1-1)-th, (1-2)-th, (1-3)-th, and (1-4)-th points 411, 412, 413, and 414 may overlap the (2-1)-th, (2-2)-th, (2-3)-th, and (2-4)-th points 421, 422, 423, and 424, respectively.

The (1-1)-th, (1-2)-th, (1-3)-th, and (1-4)-th points 411, 412, 413, and 414 may be points located at the adsorption surface 335 of the picker 330, or points located on the front surface 211 of the fingerprint sensing unit 210. In addition, the (1-1)-th, (1-2)-th, (1-3)-th, and (1-4)-th points 411, 412, 413, and 414 may be coordinates on the XY plane.

The (2-1)-th, (2-2)-th, (2-3)-th, and (2-4)-th points 421, 422, 423, and 424 may similarly be points located at the adsorption surface 321 of the stage 320, or points located on the rear surface 111 of the display panel 100. In addition, the 2-1)-th, (2-2)-th, (2-3)-th, and (2-4)-th points 421, 422, 423, and 424 may be coordinates on the XY plane.

Referring to FIG. 13, the (1-1)-th, (1-2)-th, (1-3)-th and (1-4)-th points 411, 412, 413, and 414 may correspond to positions different from positions of the (2-1)-th, (2-2)-th, (2-3)-th, and (2-4)-th points 421, 422, 423, and 424 on the XY plane. When the fingerprint sensing unit 210 and the display panel 100 are bonded to each other, each of the (1-1)-th, (1-2)-th, (1-3)-th, and (1-4)-th points 411, 412, 413, and 414 may not overlap any of the (2-1)-th, (2-2)-th, (2-3)-th, and (2-4)-th points 421, 422, 423, and 424.

Figure 14:
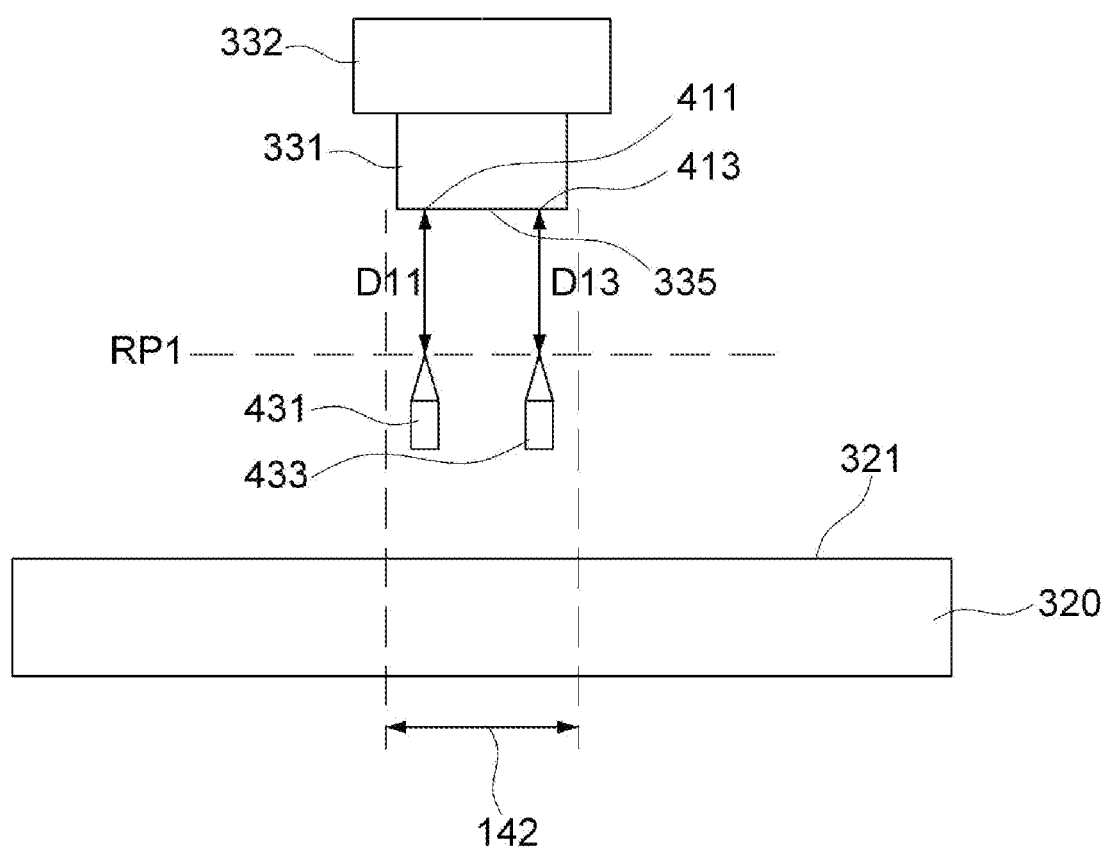
FIG. 14 is a view illustrating a method of measuring a distance to an adsorption surface of a picker according to an exemplary embodiment.

FIG. 14 is a view illustrating a method of measuring a distance to the adsorption surface 335 of the picker 330 according to an exemplary embodiment.

The first distance measuring unit 430 may include a plurality of first distance measuring unit 431, 432, 433, and 434 located at positions substantially the same as positions at which the (1-1)-th, (1-2)-th, (1-3)-th, and (1-4)-th points 411, 412, 413, and 414 are located, respectively, on the XY plane.

The plurality of first distance measuring units 431, 432, 433, and 434 measure distances D11, D12, D13, and D14 from a first reference plane RP1 to the (1-1)-th, (1-2)-th, (1-3)-th, and (1-4)-th points 411, 412, 413, and 414 located at the adsorption surface 335 of the picker 330 in the Z-axis direction. The first reference plane RP1 may be any plane parallel to the XY plane. The distances D11, D12, D13, and D14 from the first reference plane RP1 to the (1-1)-th, (1-2)-th, (1-3)-th, and (1-4)-th points 411, 412, 413, and 414 located at the adsorption surface 335 of the picker 330 may be used for calculating a thickness deviation of the fingerprint sensing unit 210 and for inclination alignment of the adsorption surface 335 of the picker 330.

Figure 15:
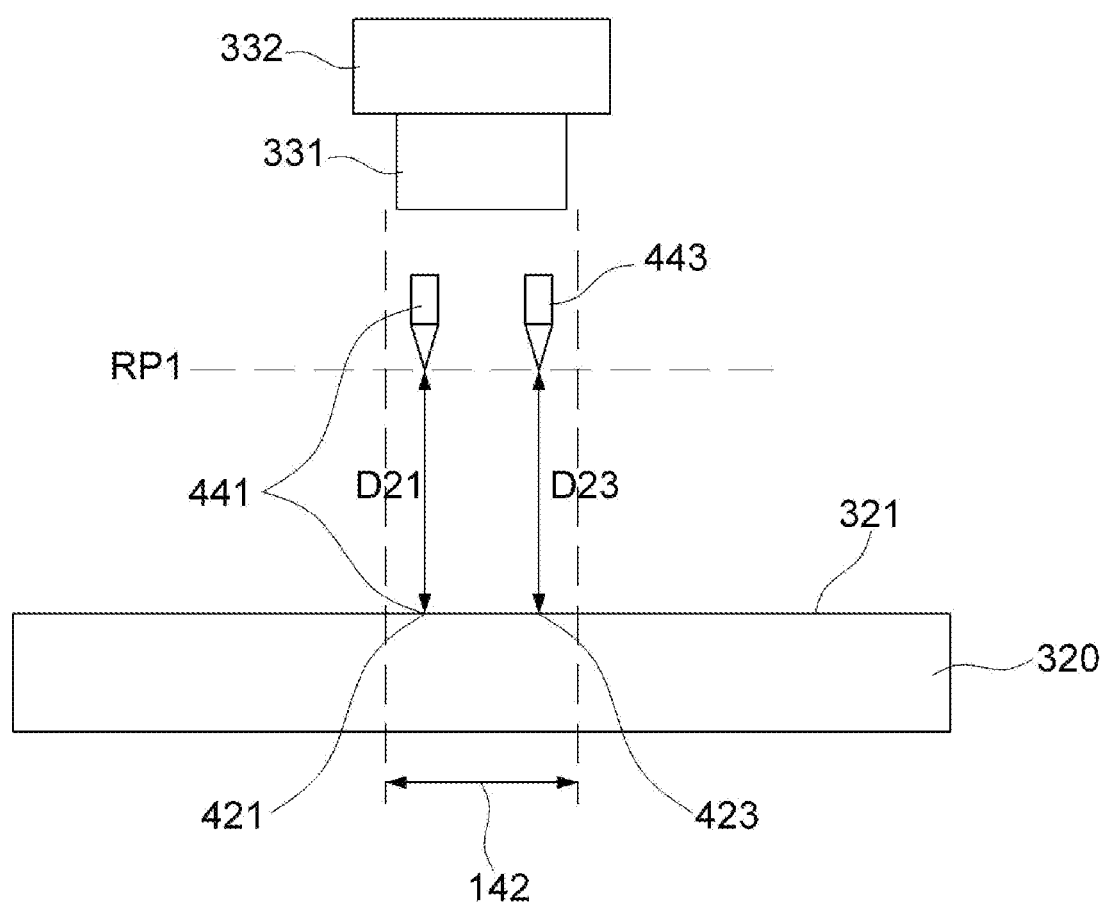
FIG. 15 is a view illustrating a method of measuring a distance to an adsorption surface of a stage according to another exemplary embodiment.

FIG. 15 is a view illustrating a method of measuring a distance to the adsorption surface 321 of the stage 320 according to an exemplary embodiment.

The second distance measuring unit 440 may include a plurality of second distance measuring unit 441, 442, 443, and 444 located at positions substantially the same as positions at which the (2-1)-th, (2-2)-th, (2-3)-th and (2-4)-th points 421, 422, 423, and 424 are located, respectively, on the XY plane.

The plurality of second distance measuring units 431, 432, 433, and 434 measure distances D21, D22, D23, and D24 from a second reference plane RP2 to the (2-1)-th, (2-2)-th, (2-3)-th, and (2-4)-th points 421, 422, 423, and 424 located at the adsorption surface 321 of the stage 320 in the Z-axis direction. The second reference plane RP2 may be any plane parallel to the XY plane. The second reference plane RP2 may be a substantially same plane as the first reference plane RP1. The distances D21, D22, D23, and D24 from the second reference plane RP2 to the (2-1)-th, (2-2)-th, (2-3)-th, and (2-4)-th points 421, 422, 423, and 424 located at the adsorption surface 321 of the stage 320 may be used for calculating a thickness deviation of the display panel 100 and for inclination alignment of the adsorption surface 321 of the stage 320.

Figure 16:
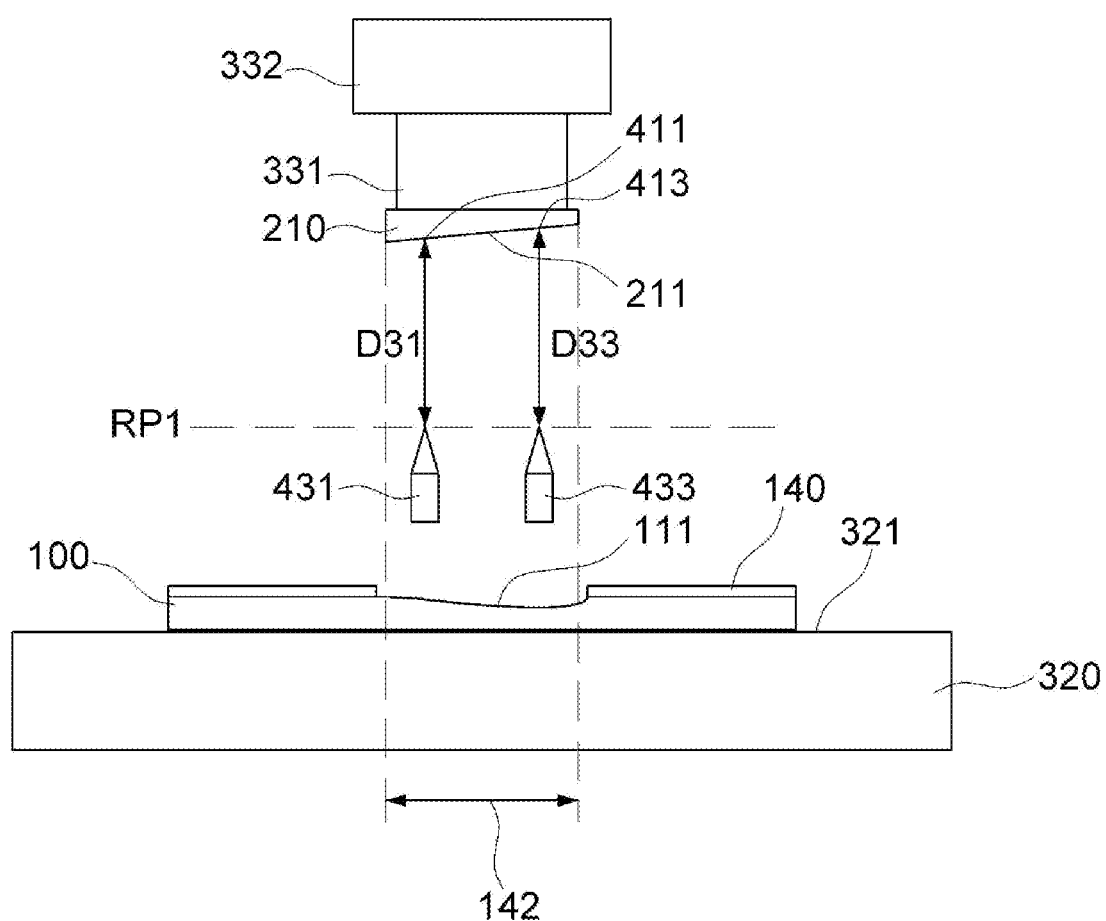
FIG. 16 is a view illustrating a method of measuring a distance to a front surface of a fingerprint sensing unit adsorbed to an adsorption surface of a picker according to an exemplary embodiment.

FIG. 16 is a view illustrating a method of measuring a distance to the front surface 211 of the fingerprint sensing unit 210 adsorbed to the adsorption surface 335 of the picker 330 according to an exemplary embodiment.

As described above, the plurality of first distance measuring unit 431, 432, 433, and 434 may be located at positions substantially the same as positions at which the (1-1)-th, (1-2)-th, (1-3)-th, and (1-4)-th points 411, 412, 413, and 414 are located, respectively, on the XY plane, respectively.

The plurality of first distance measuring units 431, 432, 433, and 434 measure distances D31, D32, D33, and D34 from the first reference plane RP1 to the (1-1)-th, (1-2)-th, (1-3)-th, and (1-4)-th points 411, 412, 413, and 414 located at the front surface 211 of the fingerprint sensing unit 210 adsorbed to the adsorption surface 335 of the picker 330 in the Z-axis direction. Thicknesses D11-D31, D12-D32, D13-D33, and D14-D34 of the fingerprint sensing unit 210 and a deviation thereof at the (1-1)-th, (1-2)-th, (1-3)-th, and (1-4)-th points 411, 412, 413, and 414 may be calculated based on the distances D31, D32, D33, and D34 from the first reference plane RP1 to the (1-1)-th, (1-2)-th, (1-3)-th, and (1-4)-th points 411, 412, 413, and 414 located at the fingerprint sensing unit 210 adsorbed to the adsorption surface 335 of the picker 330, and the distances D11, D12, D13, and D14 from the first reference plane RP1 to the (1-1)-th, (1-2)-th, (1-3)-th, and (1-4)-th points 411, 412, 413, and 414 located at the adsorption surface 335 of the picker 330.

Figure 17:
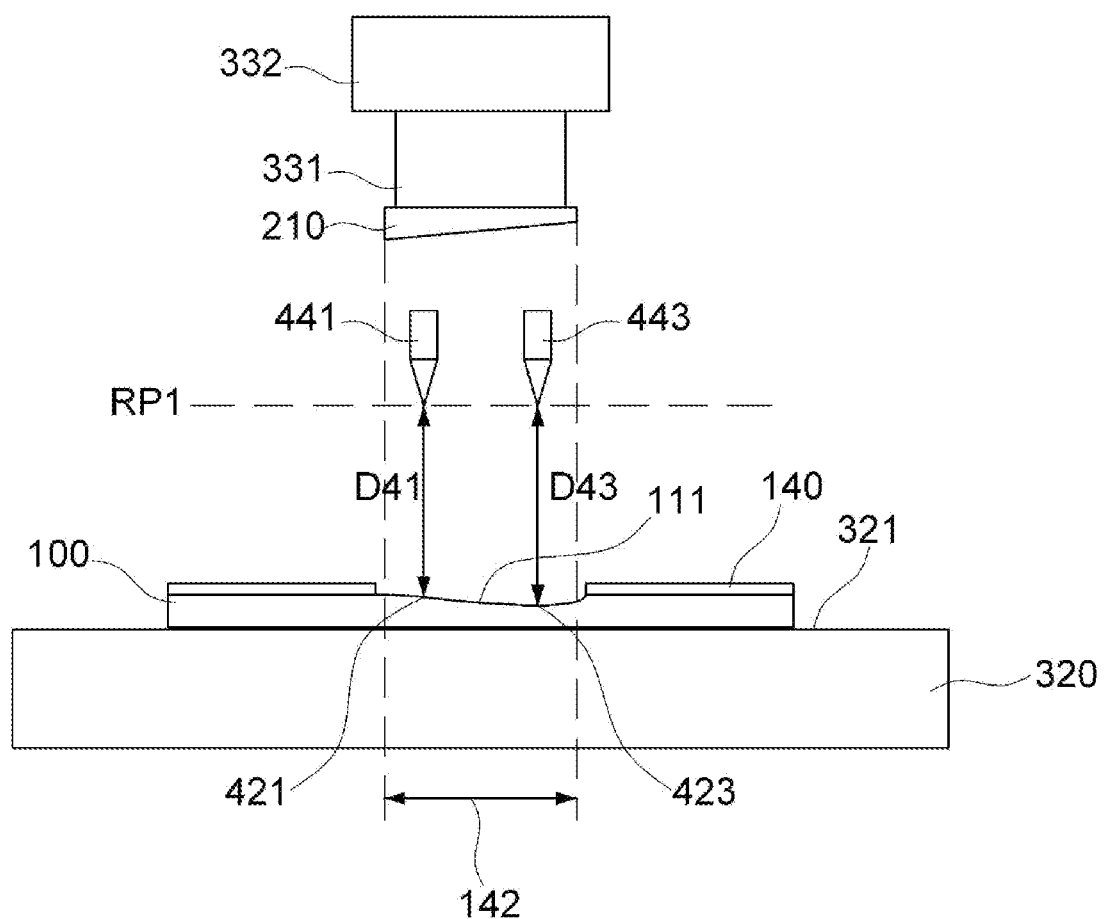
FIG. 17 is a view illustrating a method of measuring a distance to a rear surface of a display panel adsorbed to an adsorption surface of a stage according to an exemplary embodiment.

FIG. 17 is a view illustrating a method of measuring a distance to the rear surface 111 of the display panel 100 adsorbed to the adsorption surface 321 of the stage 320 according to an exemplary embodiment.

As described above, the plurality of second distance measuring unit 442, 442, 443, and 444 may be located at positions substantially the same as positions at which the (2-1)-th, (2-2)-th, (2-3)-th, and (2-4)-th points 421, 422, 423, and 424 are located on the XY plane, respectively.

The plurality of second distance measuring units 442, 442, 443, and 444 measure distances D41, D42, D43, and D44 from the second reference plane RP2 to the (2-1)-th, (2-2)-th, (2-3)-th, and (2-4)-th points 421, 422, 423, and 424 located at the rear surface 111 of the display panel 100 adsorbed to the adsorption surface 321 of the stage 320 in the Z-axis direction. Thicknesses D21-D41, D22-D42, D23-D43, and D24-D44 of the display panel 100 at the (2-1)-th, (2-2)-th, (2-3)-th, and (2-4)-th points 421, 422, 423, and 424 may be calculated based on the distances D41, D42, D43, and D44 from the second reference plane RP2 to the (2-1)-th, (2-2)-th, (2-3)-th, and (2-4)-th points 421, 422, 423, and 424 located at the rear surface 111 of the display panel 100 adsorbed to the adsorption surface 321 of the stage 320, and the distances D21, D22, D23, and D24 from the second reference plane RP2 to the (2-1)-th, (2-2)-th, (2-3)-th, and (2-4)-th points 421, 422, 423, and 424 located at the adsorption surface 321 of the stage 320.

In addition, when the (1-1)-th, (1-2)-th, (1-3)-th, and (1-4)-th points 411, 412, 413, and 414 are located at positions substantially the same as positions at which the (2-1)-th, (2-2)-th, (2-3)-th, and (2-4)-th points 421, 422, 423, and 424 are located, respectively, on the XY plane, and the first reference plane RP1 and the second reference plane RP2 coincide with each other, as illustrated in FIG. 12, a sum of distances D31 and D41, D32 and D42, D33 and D43, and D34 and D44 between the fingerprint sensing unit 210 and the display panel 100 and a deviation thereof may be calculated at the (1-1)-th, (1-2)-th, (1-3)-th, and (1-4)-th points 411, 412, 413, and 414, based on the distances D31, D32, D33, and D34 from the first reference plane RP1 to the (1-1)-th, (1-2)-th, (1-3)-th, and (1-4)-th points 411, 412, 413, and 414 located at the fingerprint sensing unit 210 adsorbed to the adsorption surface 335 of the picker 330, which are measured as in FIG. 16, and based on the distances D41, D42, D43, and D44 from the second reference plane RP2 to the (2-1)-th, (2-2)-th, (2-3)-th, and (2-4)-th points 421, 422, 423, and 424 located at the rear surface 111 of the display panel 100 adsorbed to the adsorption surface 321 of the stage 320, which are measured as in FIG. 17. When the first reference plane RP1 and the second reference plane RP2 are parallel to each other and spaced apart from each other by a predetermined distance, all gaps of the display panel 100 may be increased or decreased by the predetermined distance, and the deviation would not be affected.

Figure 18:
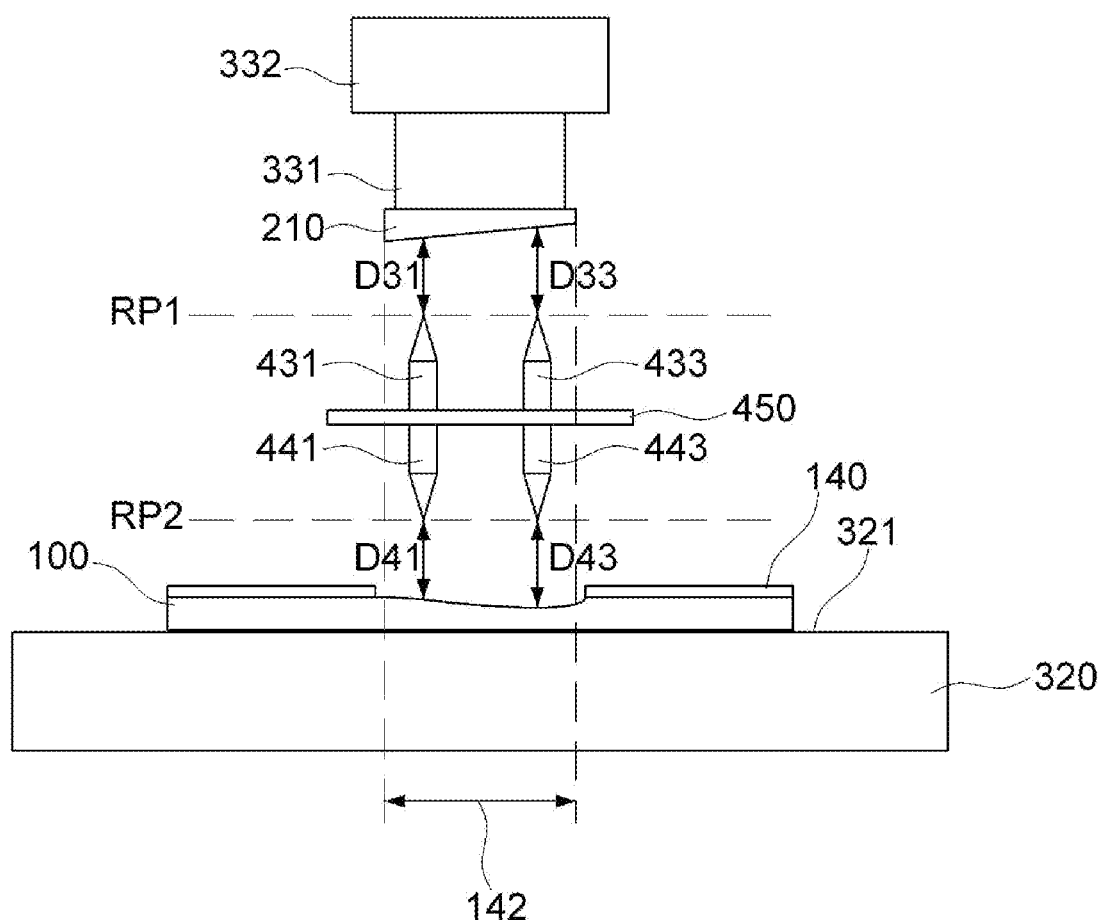
FIG. 18 is a view illustrating a method of measuring a distance to a front surface of a fingerprint sensing unit adsorbed to an adsorption surface of a picker and a distance to a rear surface of a display panel adsorbed to an adsorption surface of a stage according to an exemplary embodiment.
Figure 19:
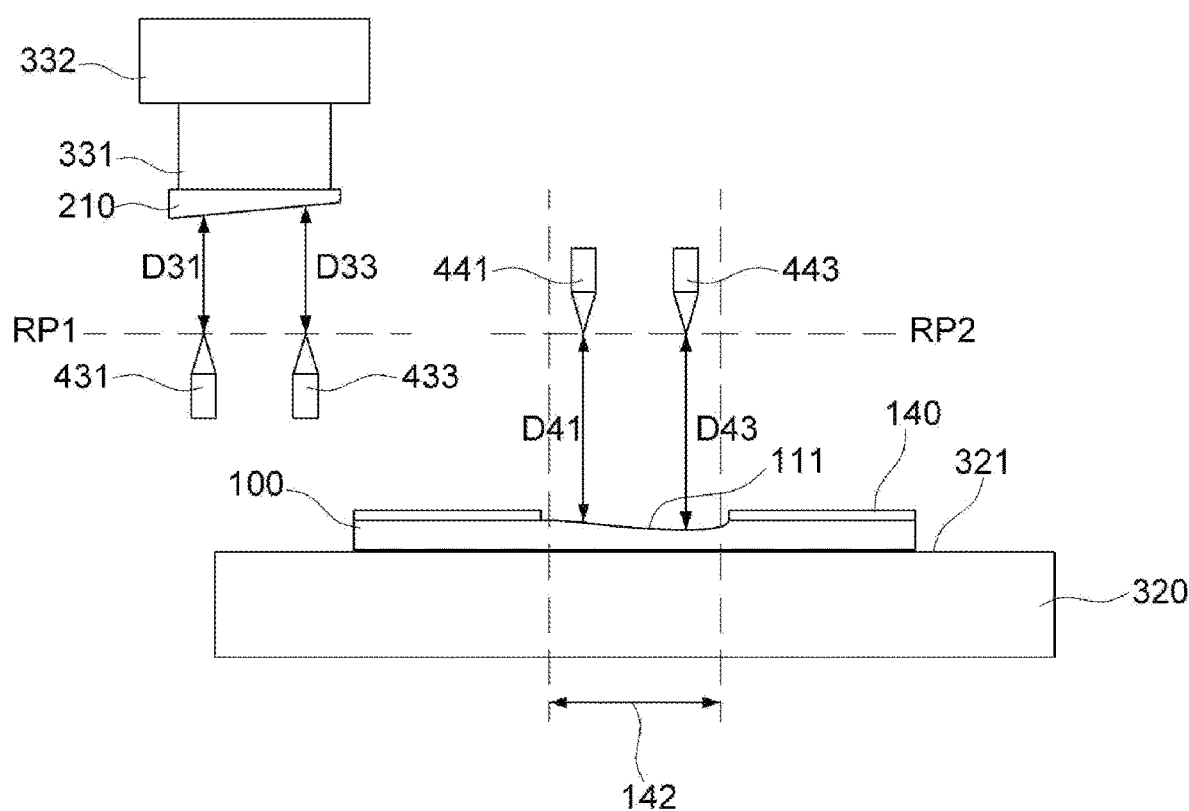
FIG. 19 is a view illustrating a method of measuring a distance to a front surface of a fingerprint sensing unit adsorbed to an adsorption surface of a picker and a distance to a rear surface of a display panel adsorbed to an adsorption surface of a stage according to another exemplary embodiment.

FIGS. 18 and 19 are views illustrating a method of measuring a distance to the first point 410 and the second point 420 according to exemplary embodiments.

Referring to FIG. 18, a distance to the first point 410 and a distance to the second point 420 may be measured at the same time.

The distance measuring unit 390 may include a plurality of first distance measuring unit 431, 432, 433, and 434 located at positions substantially the same as positions at which the (1-1)-th, (1-2)-th, (1-3)-th, and (1-4)-th points 411, 412, 413, and 414 are located, respectively, on the XY plane, and may further include a plurality of second distance measuring unit 441, 442, 443, and 444 located at positions substantially the same as positions at which the (2-1)-th, (2-2)-th, (2-3)-th, and (2-4)-th points 421, 422, 423, and 424 are located, respectively, on the XY plane. The first distance measuring units 431, 432, 433, and 434 and the second distance measuring units 441, 442, 443, and 444 may be secured to a plate 450 having opposite sides parallel to the XY plane. The plate 450 may move in the horizontal direction.

Referring to FIG. 19, a distance to the first point 410 and a distance to the second point 420 may be measured separately. The distance to the first point 410 and the distance to the second point 420 may be measured before the picker 330 and the stage 320 are horizontally aligned (see S400 in FIG. 39).

Referring back to FIGS. 14 and 15, the plurality of first distance measuring units 431, 432, 433, and 434 measure the distances D11, D12, D13, and D14 from the first reference plane RP1 to the (1-1)-th, (1-2)-th, (1-3)-th, and (1-4)-th points 411, 412, 413, and 414 located at the adsorption surface 335 of the picker 330 in the Z-axis direction. The plurality of second distance measuring units 441, 442, 443, and 444 measure the distances D21, D22, D23, and D24 from the second reference plane RP2 to the (2-1)-th, (2-2)-th, (2-3)-th, and (2-4)-th points 421, 422, 423, and 424 located at the adsorption surface 321 of the stage 320 in the Z-axis direction. The picker 330 may then horizontally move onto the stage 320. In addition, when the plurality of first distance measuring units 431, 432, 433, and 434 are measuring distances, the first reference plane RP1 may be parallel to the adsorption surface 335 of the picker 330, and may not be parallel to the second reference plane RP2. Thereafter, along with the horizontal movement, the adsorption surface 335 of the picker 330 or the first reference surface RP1 may be rotated so as to be parallel to the second reference surface RP2.

Figure 20:
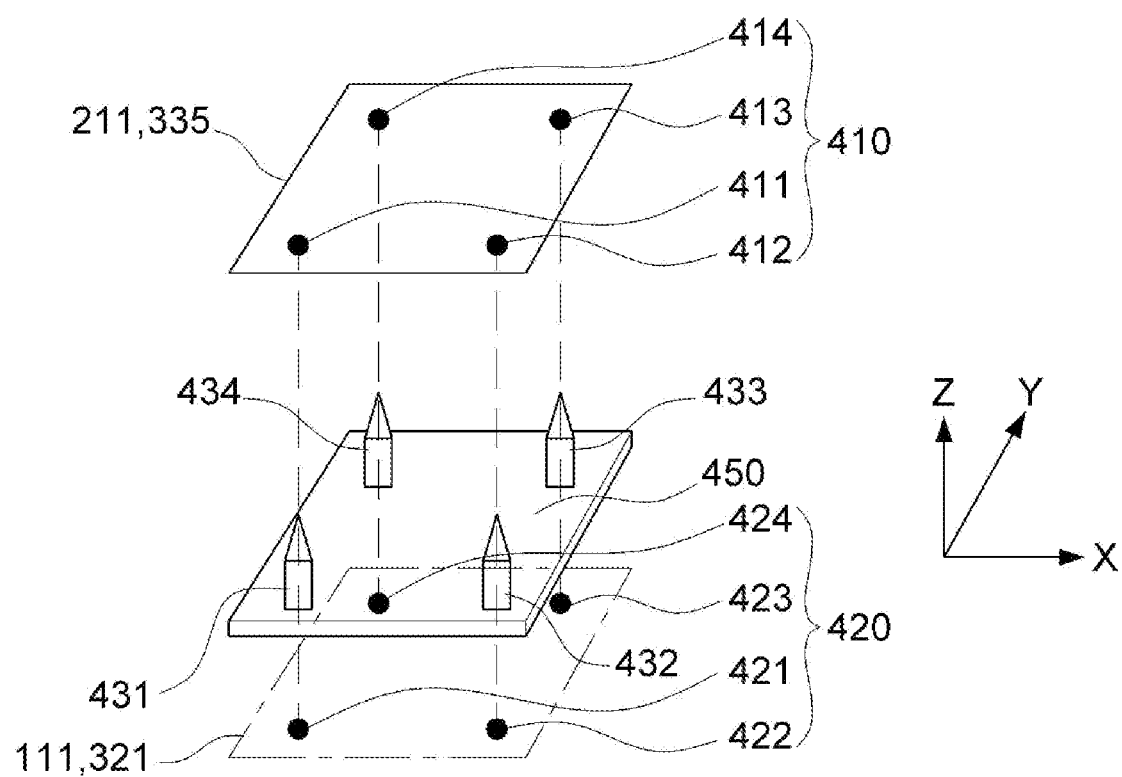
FIGS. 20, 21, and 22 are views illustrating a method of measuring a distance to a front surface of a fingerprint sensing unit adsorbed to an adsorption surface of a picker according to an exemplary embodiment.
Figure 21:
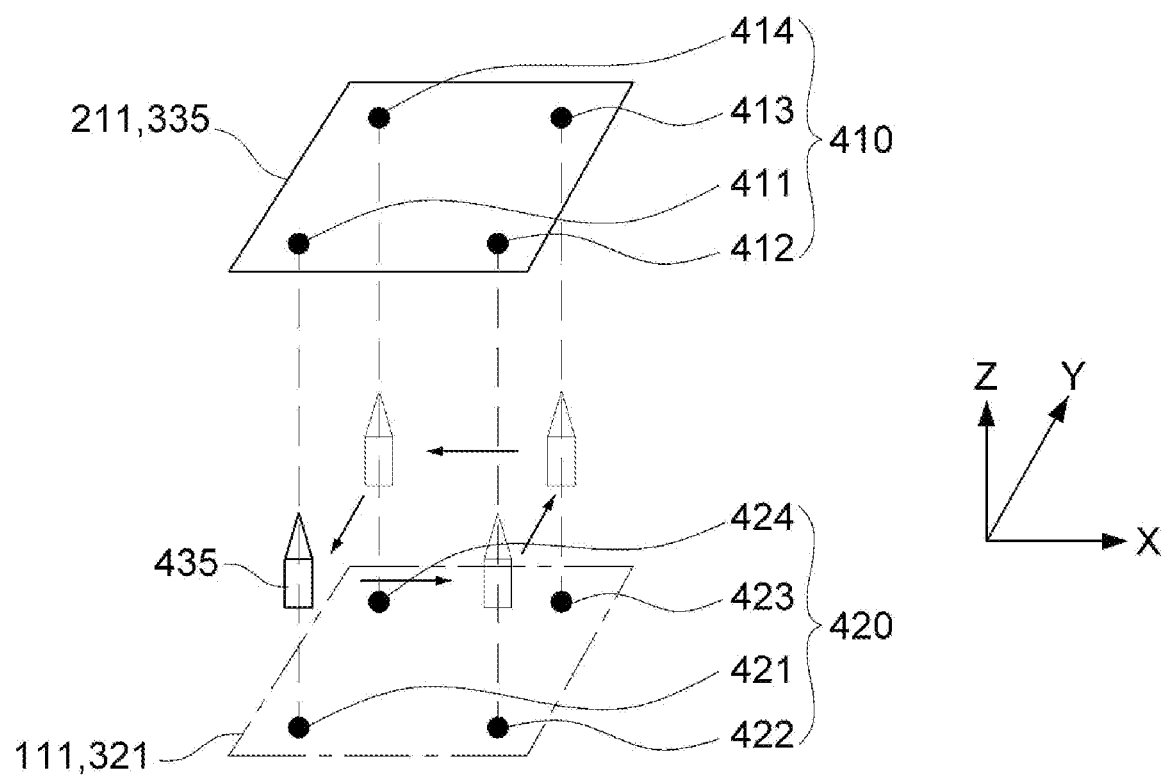
Figure 22:
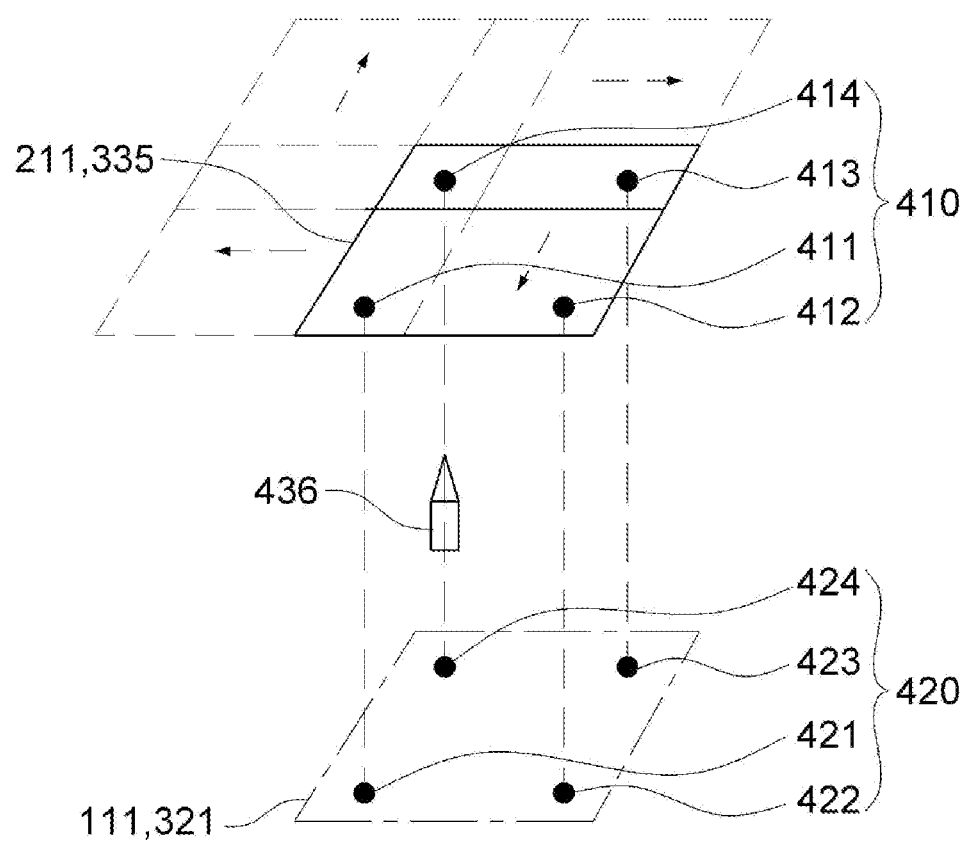

FIGS. 20, 21, and 22 illustrate a method of measuring a distance to the front surface 211 of the fingerprint sensing unit 210 adsorbed to the adsorption surface 335 of the picker 330 according to exemplary embodiments.

Referring to FIG. 20, according to an exemplary embodiment, the distance measuring unit 390 may include a plurality of first distance measuring unit 431, 432, 433, and 434 secured to the plate 430 to be disposed at positions substantially the same as positions at which the (1-1)-th, (1-2)-th, (1-3)-th, and (1-4)-th points 411, 412, 413, and 414 are located, respectively, on the XY plane. In addition, as illustrated in FIG. 18, the plurality of second distance measuring units 441, 442, 443, and 444 may be secured to the plate 450.

Referring to FIG. 21, according to another exemplary embodiment, the first distance measuring unit 435 may be provided singularly. The first distance measuring unit 435 moves in parallel along the first reference plane RP1 along the coordinates of the (1-1)-th, (1-2)-th, (1-3)-th, and (1-4)-th points 411, 412, 413, and 414 on the XY plane. According to the illustrated exemplary embodiment, a driving unit that horizontally moves the first distance measuring unit 435 may be disposed under the control of the controller 310.

Referring to FIG. 22, according to still another exemplary embodiment, the first distance measuring unit 435 may be provided singularly, while the first distance measuring unit 435 may not move. Instead, the horizontal driving unit 365 for controlling horizontal movement of the picker 330 may move the adsorption surface 335 of the picker 330, so that the (1-1)-th, (1-2)-th, (1-3)-th, and (1-4)-th points 411, 412, 413, 414 of the adsorption surface 335 of the picker 330 or the fingerprint sensing unit 210 may overlap the coordinates of the first distance measuring unit 435 on the XY plane.

Although FIGS. 20, 21, and 22 exemplarily illustrate the first distance measuring unit 430, the configurations shown in FIGS. 20 to 22 may also be applied to the second distance measuring unit 440.

Figure 23:
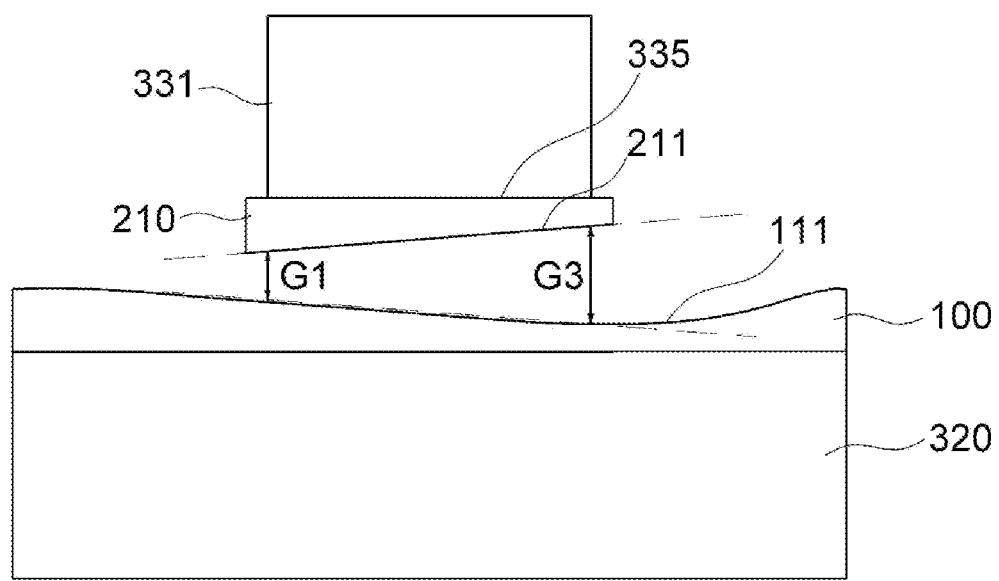
FIGS. 23 and 24 are views illustrating a distance deviation between a front surface of a fingerprint sensing unit and a rear surface of a display panel measured according to an exemplary embodiment.
Figure 24:
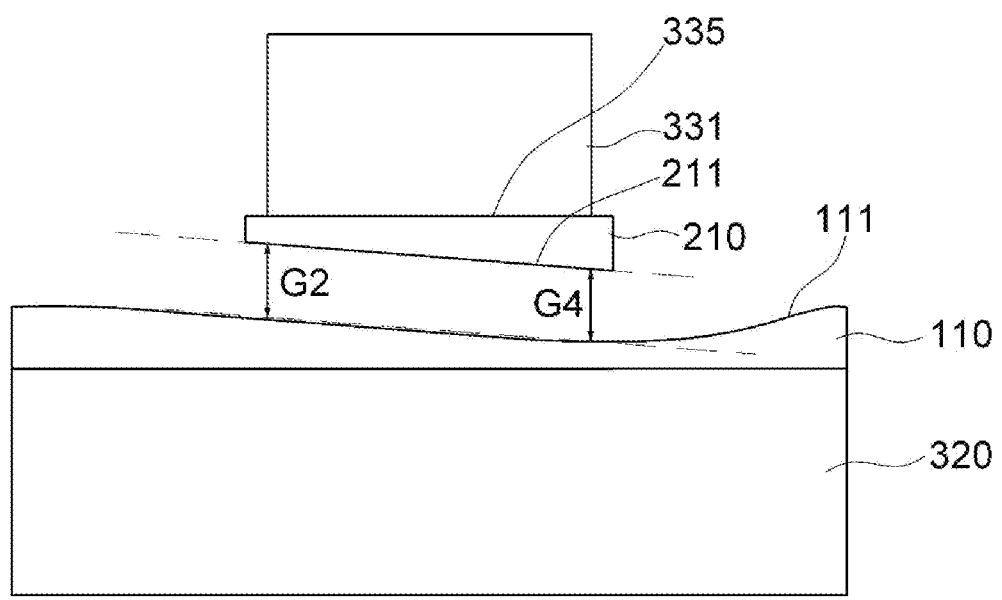

FIGS. 23 and 24 are views illustrating a gap deviation between the front surface 211 of the fingerprint sensing unit 210 and the rear surface 111 of the display panel 100 measured according to an exemplary embodiment.

FIG. 23 is a cross-sectional view taken along a plane passing through the (1-1)-th point 411, the (1-3)-th point 413, the (2-1)-th point 421, and the (2-3)-th point 423 in FIG. 12. FIG. 24 is a cross-sectional view taken along a plane passing through the (1-2)-th point 412, the (1-4)-th point 414, the (2-2)-th point 422, and the (2-4)-th point 424 in FIG. 12. A gap G1 is a distance between the (1-1)-th point 411 of the fingerprint sensing unit 210 and the (2-1)-th point of the rear surface 111 of the display panel 100. The gap D1 may correspond to a sum of distances D31 and D41 described above with reference to FIGS. 16 and 17. The gaps G2, G3, and G4 may correspond to a sum of distances D32 and D42, D33 and D43 and D34 and D44, respectively.

As illustrated in FIGS. 23 and 24, the front surface 211 of the fingerprint sensing unit 210 and the rear surface 111 of the display panel 100, which are measured at four first points 410 and four second points 420, may each be a curved surface which may not defined with one flat surface, and the flatness thereof may not be zero. Accordingly, a deviation of the gaps in the Z-axis direction between the rear surface 111 of the display panel 100 and the front surface 211 of the fingerprint sensing unit 210 measured at four or more points on the XY plane may not be completely removed through the inclination adjustment of the adsorption surface of the display panel 100 or the adsorption surface 335 of the picker 330.

According to an exemplary embodiment, a deviation in the Z-axis direction between the gaps G1, G2, G3, and G4 between the rear surface 111 of the display panel 100 and the front surface 211 of the fingerprint sensing unit 210 measured at four points 410 and 420 may be substantially minimized. In an exemplary embodiment, inclinations of the adsorption surface of the display panel 100 or the adsorption surface 335 of the picker 330 may be adjusted, so that the gaps G1 and G3 measured at points in a diagonal direction become substantially equal to each other, and that the gaps G2 and G4 measured at points in a diagonal direction become substantially equal to each other. For example, a height of the (2-1)-th point 421 of the rear surface 111 of the display panel 100 is fixed, and the inclination of the adsorption surface 321 of the stage 320 may be adjusted so that the (2-3)-th point 423 may ascend by the deviation G3-G1. In addition, a height of the (2-2)-th point 422 of the rear surface 111 of the display panel 100 is fixed, and the inclination of the adsorption surface 321 of the stage 320 may be adjusted so that the (2-4)-th point 424 may ascend by the deviation between G4 and G2.

According to an exemplary embodiment, a deviation between gaps G1, G2, G3, and G4, which may be caused due to a thickness deviation of the fingerprint sensing unit 210, a thickness deviation of the display panel 100, and an inclination alignment error between the adsorption surface 321 of the stage 320 and the adsorption surface 335 of the picker 330, may be substantially minimized.

Figure 25:
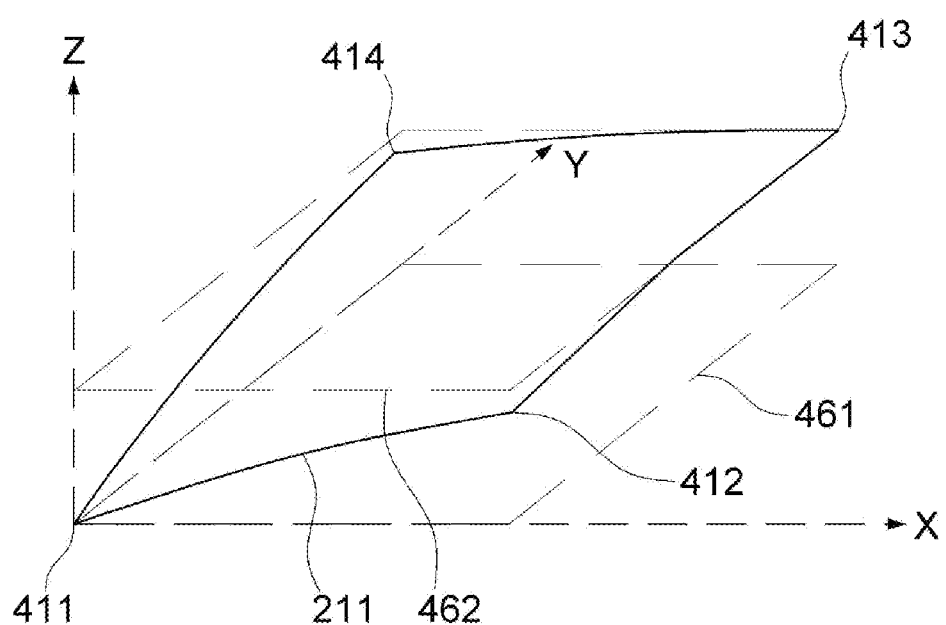
FIG. 25 is a view illustrating parallelism according to an exemplary embodiment.
Figure 26:
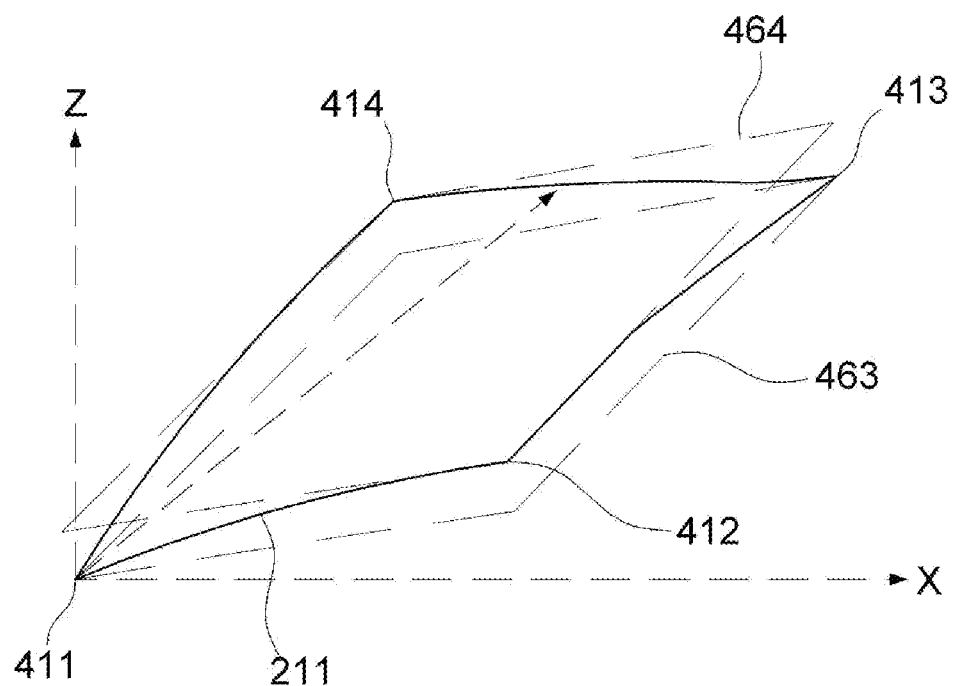
FIGS. 26 and 27 are views illustrating flatness or parallelism according to an exemplary embodiment.
Figure 27:
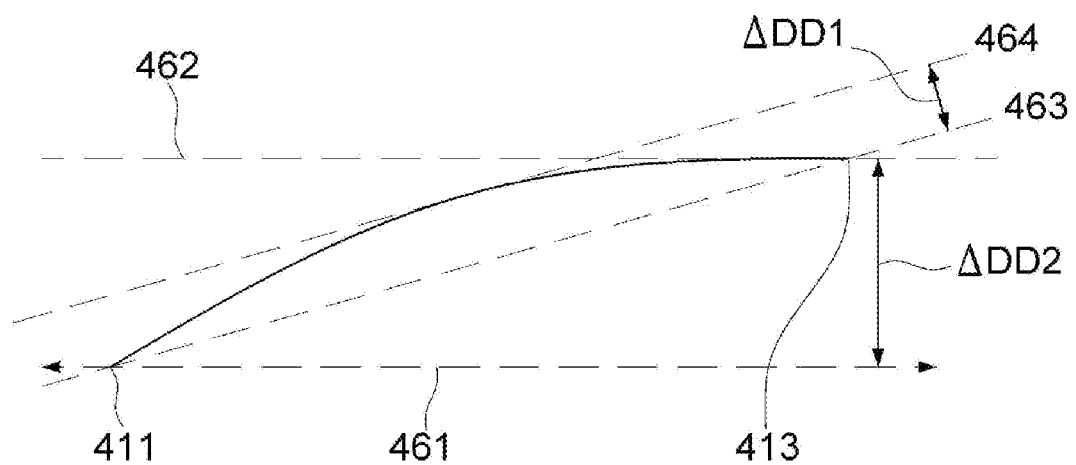

FIG. 25 is a view illustrating parallelism according to an exemplary embodiment. FIGS. 26 and 27 are views illustrating flatness or parallelism according to exemplary an embodiment.

Hereinafter, distances will be described as being measured from four first points 411, 412, 413, and 414 located on the front surface 211 of the fingerprint sensing unit 210. However, the inventive concepts are not limited thereto, and the flatness and the parallelism may be applied to distances measured at any four or more arbitrary points located on an arbitrary plane.

As used herein, parallelism defines the degree of two objects being parallel to each other. Since the parallelism defines the relative postures between the two objects, the parallelism is determined based on how the posture of one object is with respect to the posture of the other object. In this case, the reference object is called a datum.

Referring to FIGS. 25 and 27, assuming that a plane parallel to the XY plane is a datum, a distance $\Delta DD2$ between two planes 461 and 462 that pass through two points 411 and 413 having the greatest distance difference from each other, and are parallel to the XY plane, becomes a parallelism of the front surface 211 of the fingerprint sensing unit 210

In addition, the flatness as used herein defines the degree of the shape of a curved surface being flat. The flatness may be based defined as the minimum distance between two parallel planes in between.

Referring to FIGS. 26 and 27, the four points arranged at the vertices of a quadrangular shape are taken as a reference, and a distance $\Delta DD1$ between a (1-1)-th plane 463 and a (1-2)-th plane 464 may be a flatness of the front surface 211 of the fingerprint sensing unit 210, in which the (1-1)-th plane 463 passes through the (1-1)-th point 411 and the (1-3)-th point 413 in the diagonal direction, and parallel to a straight line that passes through the (1-2)-th point 412 and the (1-4)-th point 414 in the diagonal direction, and the (1-2)-th plane 464 passes through the (1-2)-th point 412 and the (1-4)-th point 414 in the diagonal direction, and parallel to a straight line that passes through the (1-1)-th point 411 and the (1-3)-th point 413 in the diagonal direction.

If a plane parallel to the (1-1)-th and (1-2)-th planes 463 and 464 defining the flatness of the front surface 211 of the fingerprint sensing unit 210 is a datum, the parallelism of the front surface 211 of the fingerprint sensing unit 210 becomes minimum at $\Delta DD1$.

Figure 28:
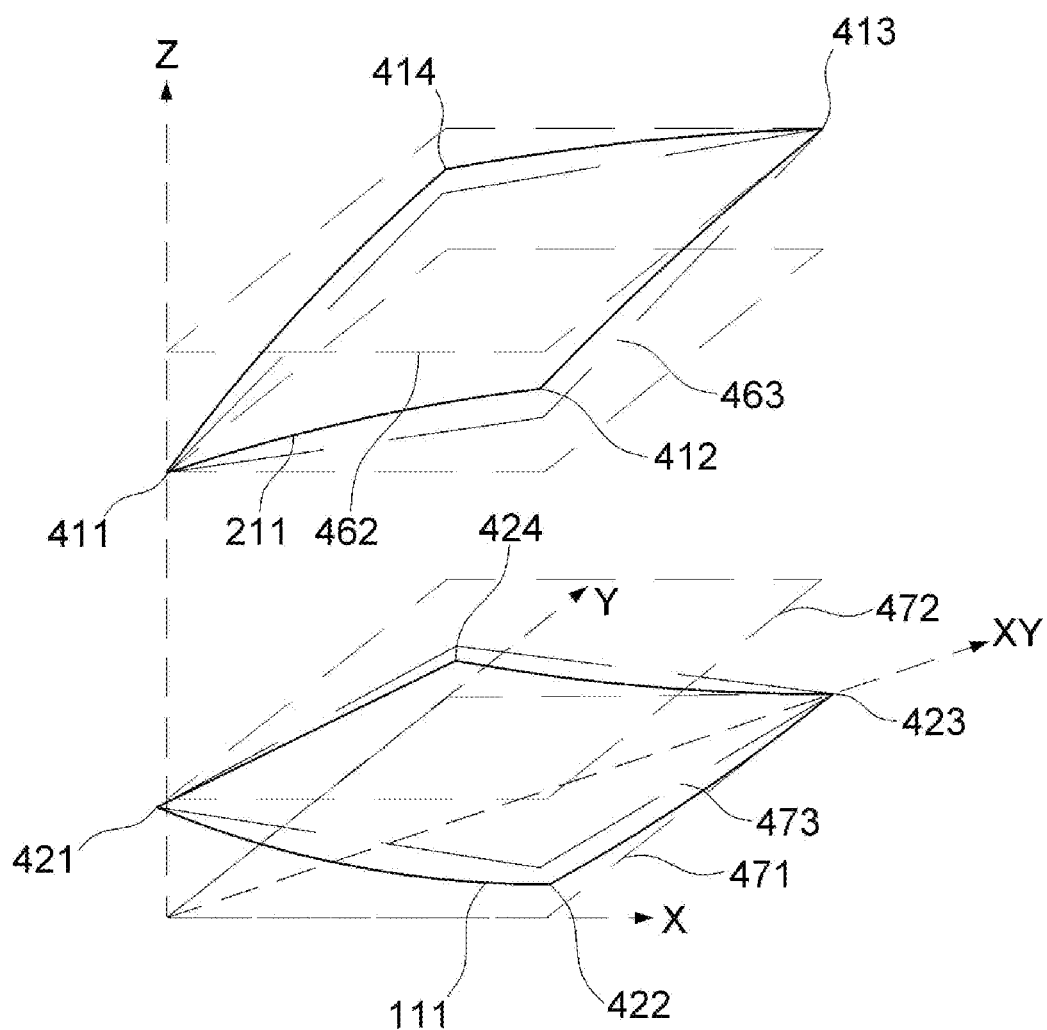
FIGS. 28 and 29 are views illustrating a front surface of a fingerprint sensing unit and a rear surface of a display panel measured according to an exemplary embodiment.
Figure 29:
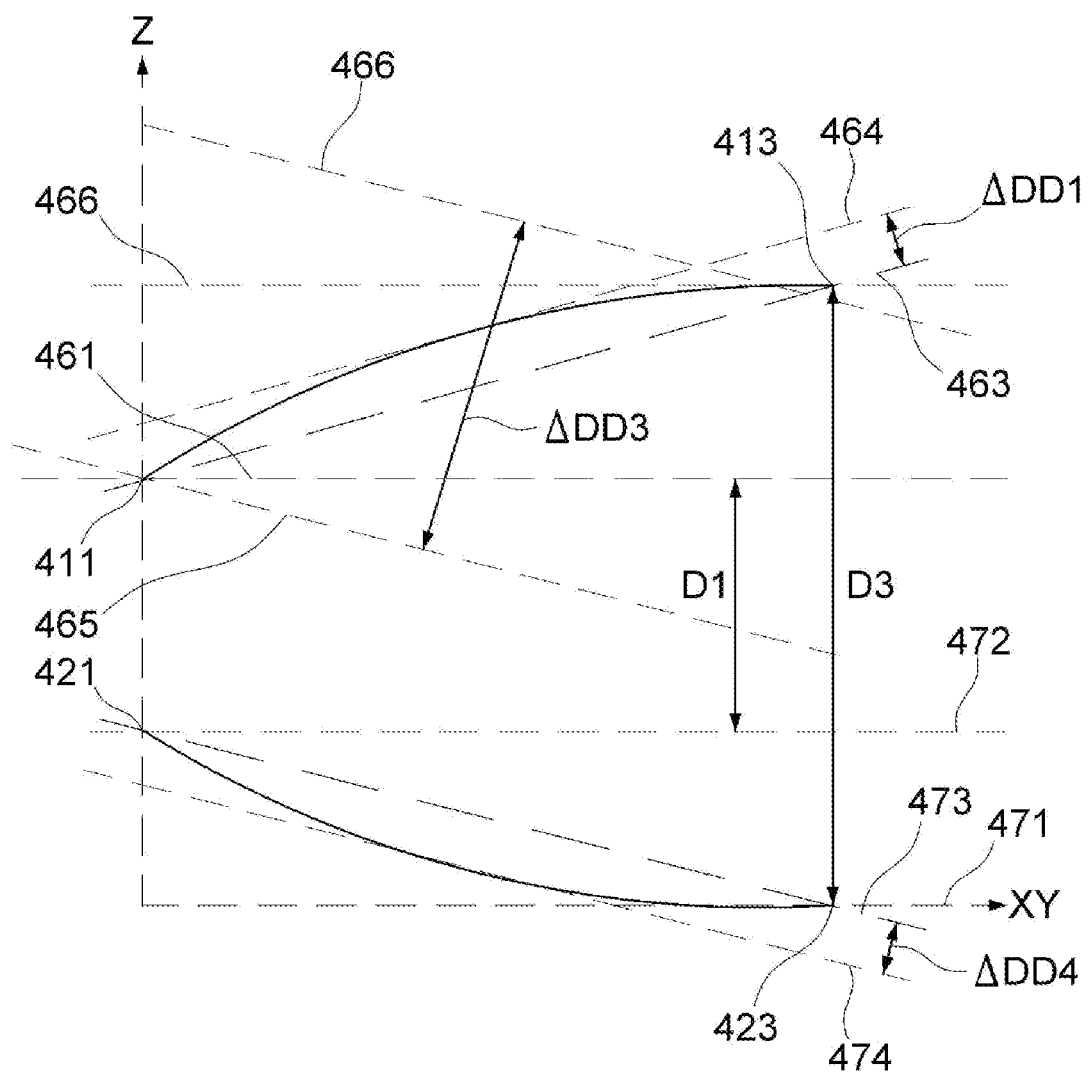

FIGS. 28 and 29 are views illustrating the front surface 211 of the fingerprint sensing unit 210 and the rear surface 111 of the display panel 100 measured according to an exemplary embodiment.

As described above, the flatness of the front surface 211 of the fingerprint sensing unit 210 is defined by the first planes 463 and 464. The first planes 463 and 464 includes the (1-1)-th plane 463 that passes through the (1-1)-th point 411 and the (1-3)-th point 413 in the diagonal direction and parallel to a straight line that passes through the (1-2)-th point 412 and the (1-4)-th point 414 in the diagonal direction, and a (1-2)-th plane 464 that passes through the (1-2)-th point 412 and the (1-4)-th point 414 in the diagonal direction and parallel to a straight line that passes through the (1-1)-th point 411 and the (1-3)-th point 413 in the diagonal direction. The flatness of the front surface 211 of the fingerprint sensing unit 210 is the distance $\Delta DD1$ between the (1-1)-th plane 463 and the (1-2)-th plane 464.

In addition, the flatness of the rear surface 111 of the display panel 100 is defined by the second planes 473 and 474. The second planes 473 and 474 includes a (2-1)-th plane 473 that passes through the (2-1)-th point 421 and the (2-3)-th point 423 in the diagonal direction and parallel to a straight line that passes through the (2-2)-th point 422 and the (2-4)-th point 424 in the diagonal direction, and a (2-2)-th plane 474 that passes through the (2-2)-th point 422 and the (2-4)-th point 424 in the diagonal direction and parallel to a straight line that passes through the (2-1)-th point 421 and the (2-3)-th point 423 in the diagonal direction. The flatness of the rear surface 111 of the display panel 100 is a distance $\Delta DD4$ between the (2-1)-th plane 473 and the (2-2)-th plane 474.

If a plane parallel to the second planes 473 and 474 defining the flatness of the rear surface 111 of the display panel 100 is a datum, the parallelism of the rear surface 111 of the display panel 100 is $\Delta DD3$.

Figure 30:
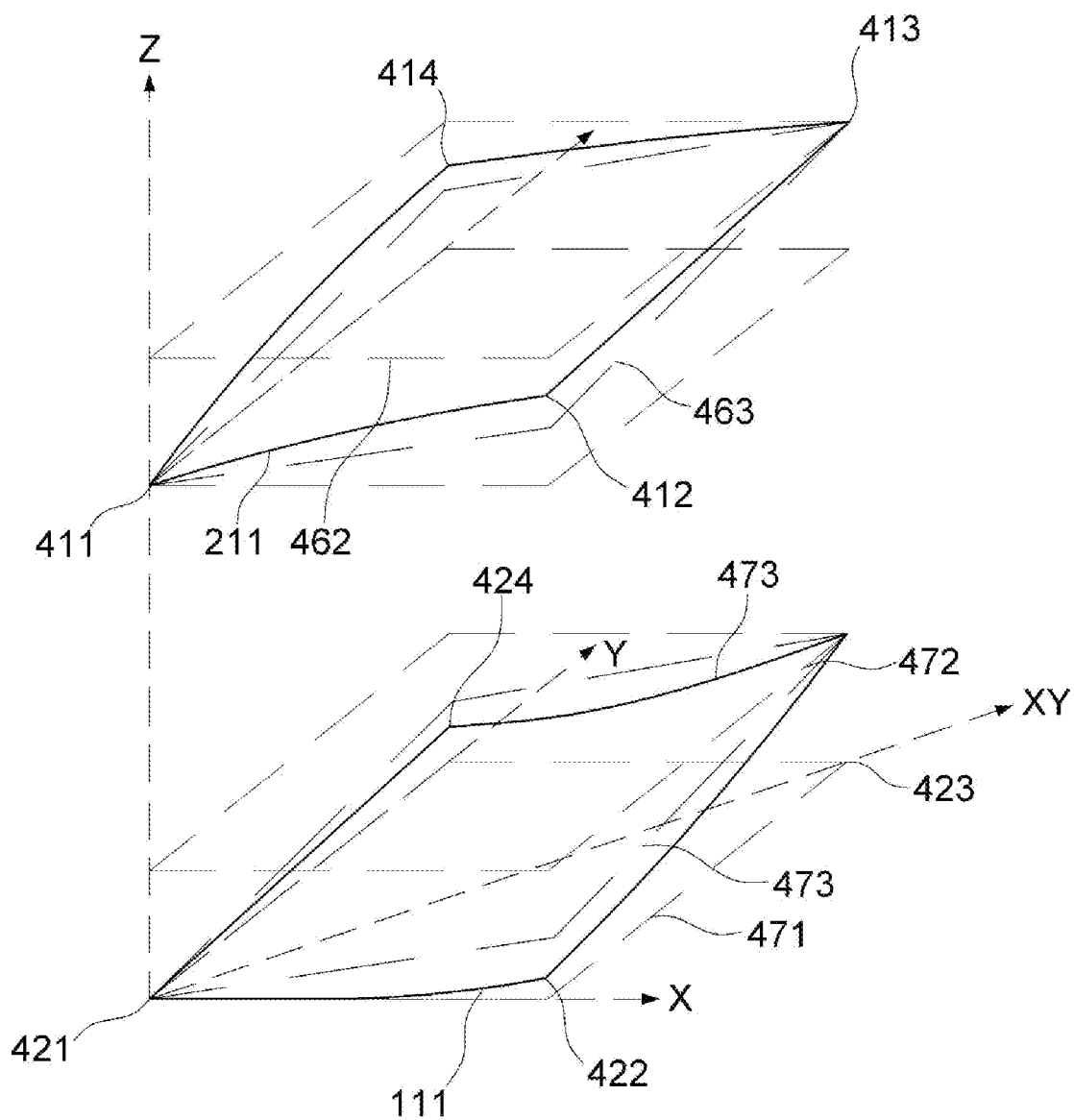
FIGS. 30 and 31 are views illustrating a front surface of a fingerprint sensing unit and a rear surface of a display panel after inclination adjustment according to an exemplary embodiment.
Figure 31:
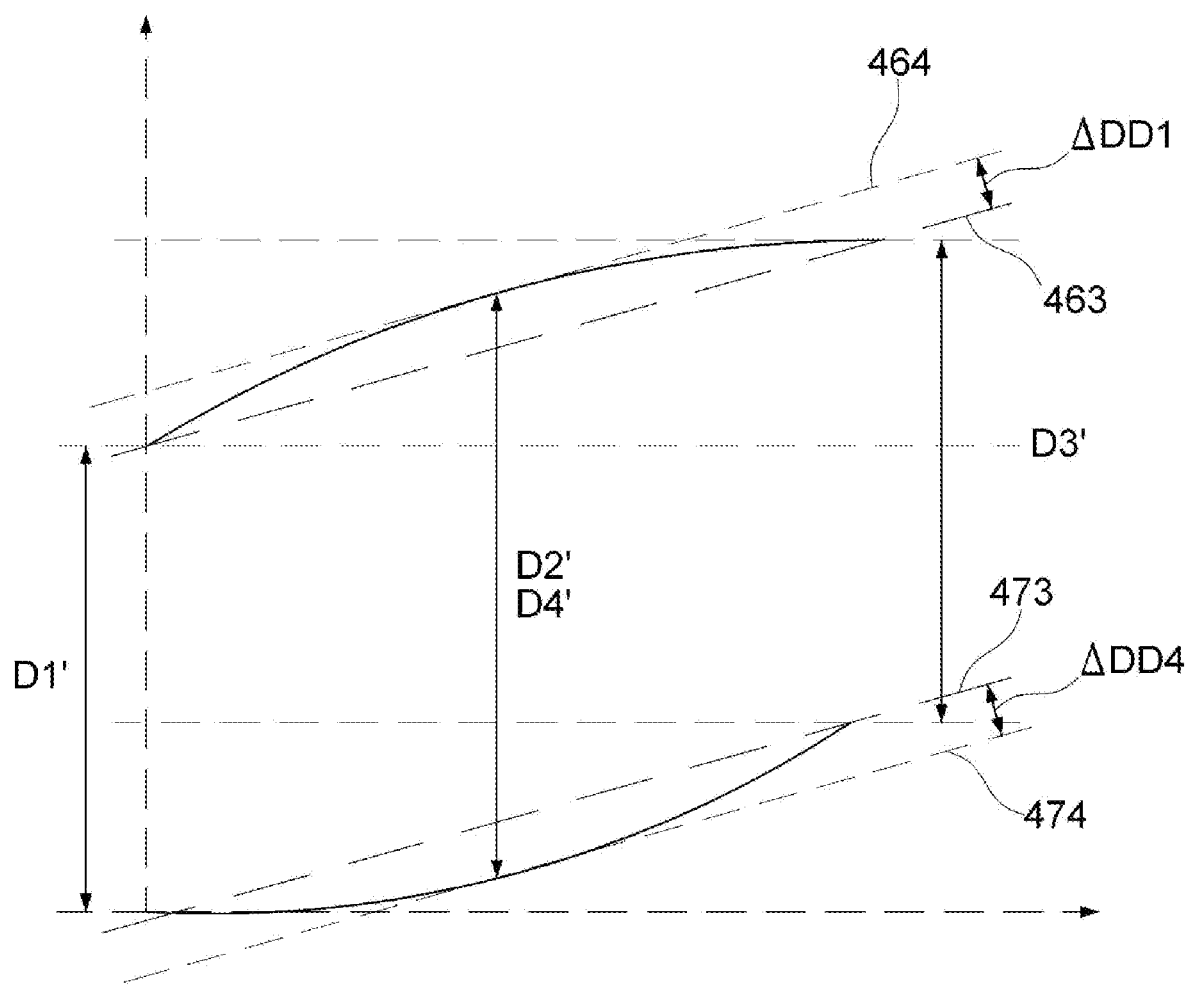

FIGS. 30 and 31 are views illustrating the front surface 211 of the fingerprint sensing unit 210 and the rear surface 111 of the display panel 100 after the inclination adjustment according to an exemplary embodiment.

As similarly described above, the flatness of the front surface 211 of the fingerprint sensing unit 210 is $\Delta DD1$, and the flatness of the rear surface 111 of the display panel 100 is $\Delta DD4$.

As illustrated in FIGS. 30 and 31, the inclination of the rear surface 111 of the display panel 100 was adjusted. More particularly, the inclination of the adsorption surface 321 of the stage 320 is adjusted so that the first planes 463 and 464 defining the flatness of the front surface 211 of the fingerprint sensing unit 210, and the second planes 473 and 474 defining the flatness of the rear surface 111 of the display panel 100 are parallel to each other.

Accordingly, the parallelism of the front surface 211 of the fingerprint sensing unit 210 with respect to the rear surface 111 of the display panel 100, more particularly, the second planes 473 and 474 defining the flatness of the rear surface 111 of the display panel 100, becomes the minimum at $\Delta DD1$, which is equal to the flatness. In addition, the parallelism of the rear surface 111 of the display panel 100 with respect to the front surface 211 of the fingerprint sensing unit 210, more particularly, the first planes 463 and 464 defining the front surface 211 of the fingerprint sensing unit 210, becomes the minimum at $\Delta DD4$, which is equal to the flatness.

FIGS. 32, 33, 34, and 35 are views illustrating a method of adjusting an inclination of the adsorption surface 321 of the stage 320 or the adsorption surface 335 of the picker 330 according to exemplary embodiments.

Figure 32:
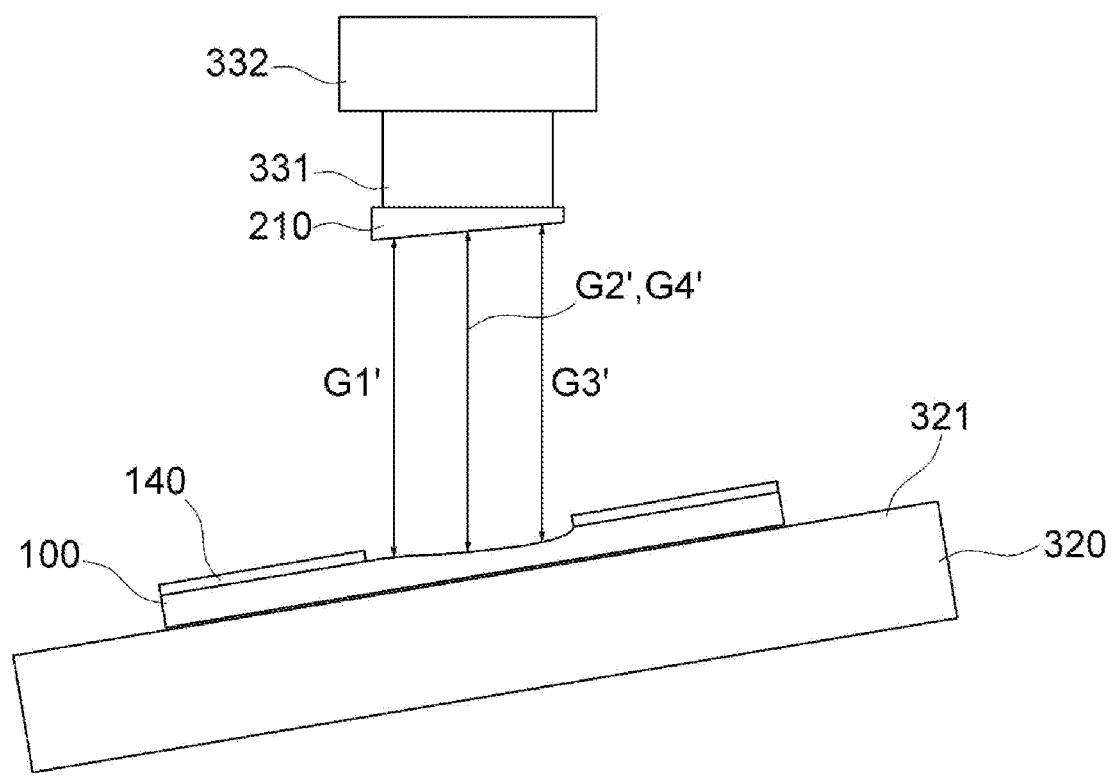
FIGS. 32, 33, 34, and 35 are views illustrating a method of adjusting a inclination of an adsorption surface of a stage or a picker according to an exemplary embodiment.

As illustrated in FIG. 32, according to an exemplary embodiment, an inclination of the adsorption surface 321 of the stage 320 or the adsorption surface 335 of the picker 330 may be adjusted so that the gaps G1 and G3 measured at points in a diagonal direction become substantially equal to each other to G1' and G3', and the gaps G2 and G4 measured at points in a diagonal direction become substantially equal to each other to G2' and G4'. Alternatively, as described above, an inclination of the adsorption surface 321 of the stage 320 or an inclination of the adsorption surface 335 of the picker 330 may be adjusted so that the first planes 463 and 464 defining the flatness of the front surface 211 of the fingerprint sensing unit 210, and the second planes 473 and 474 defining the flatness of the rear surface 111 of the display panel 100 may be parallel to each other.

Figure 33:
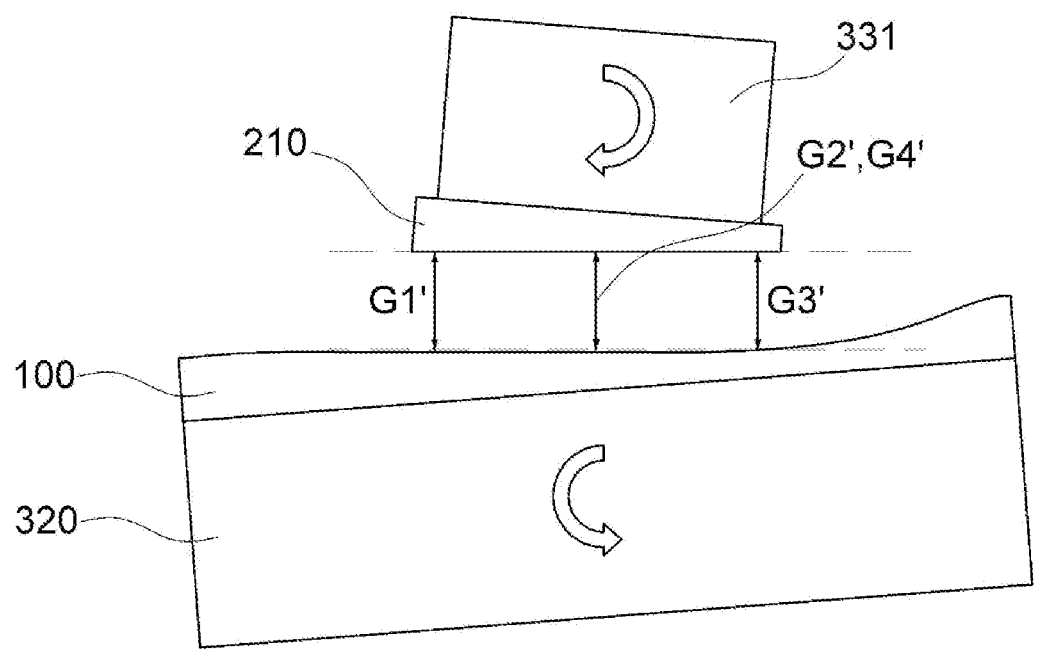

Referring to FIG. 33, according to another exemplary embodiment, the inclination of the adsorption surface 321 of the stage 320 and the inclination of the adsorption surface 335 of the picker 330 may be adjusted so that the inclination of the rear surface 111 of the display panel 100 and the inclination of the front surface 211 of the fingerprint sensing unit 210 are substantially parallel to the XY plane or that the parallelism of the rear surface 111 of the display panel 100 and the front surface 211 of the fingerprint sensing unit 210 with respect to the XY plane becomes substantially minimum.

Figure 34:
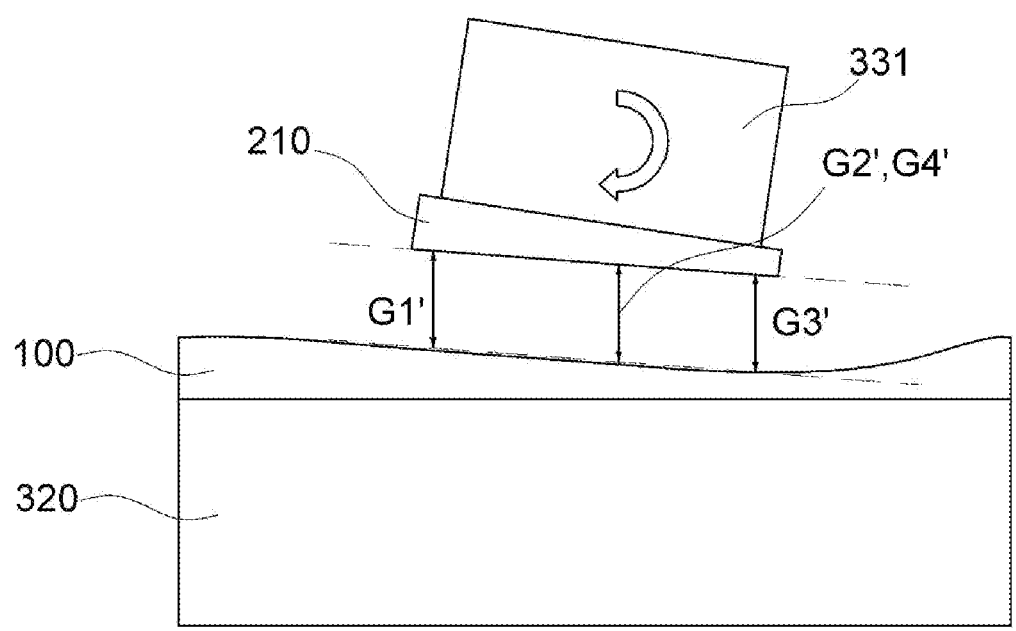

Referring to FIG. 34, according to still another exemplary embodiment, while the inclination of the adsorption surface of the display panel 100 is not adjusted, the inclination of the adsorption surface of the fingerprint sensing unit 210 may be adjusted so that the inclination of the rear surface 111 of the display panel 100 and the inclination of the front surface 211 of the fingerprint sensing unit 210 are substantially parallel to each other.

Figure 35:
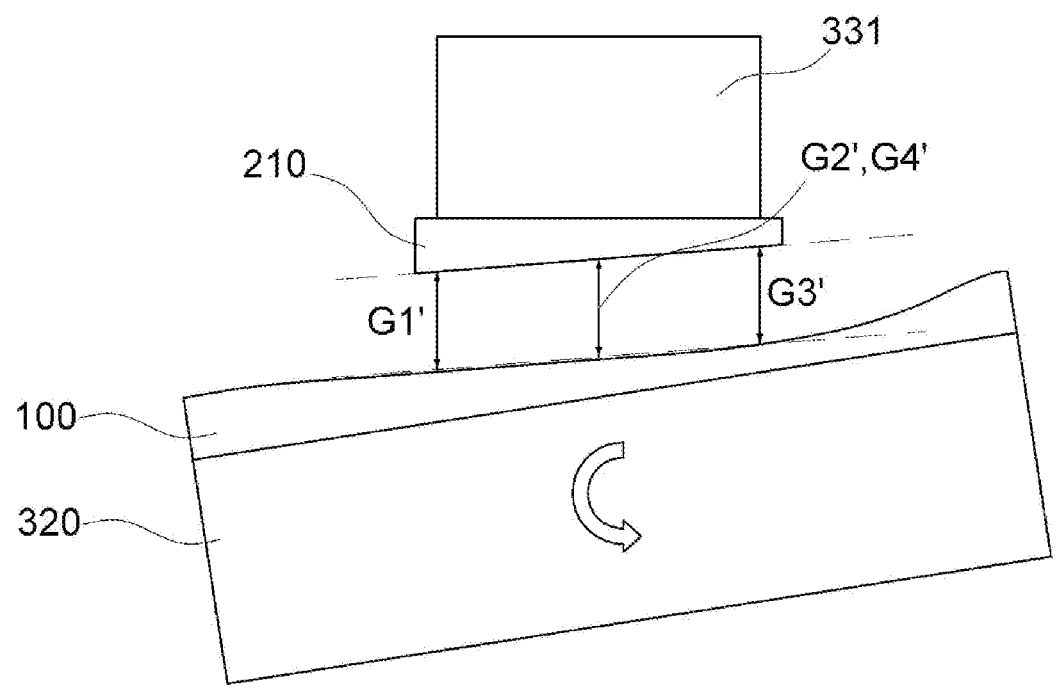

Referring to FIG. 35, according to yet another exemplary embodiment, while the inclination of the adsorption surface of the fingerprint sensing unit 210 is not adjusted, the inclination of the adsorption surface 321 of the stage 320 may be adjusted so that the inclination of the rear surface 111 of the display panel 100 and the inclination of the front surface 211 of the fingerprint sensing unit 210 are substantially parallel to each other.

Figure 36:
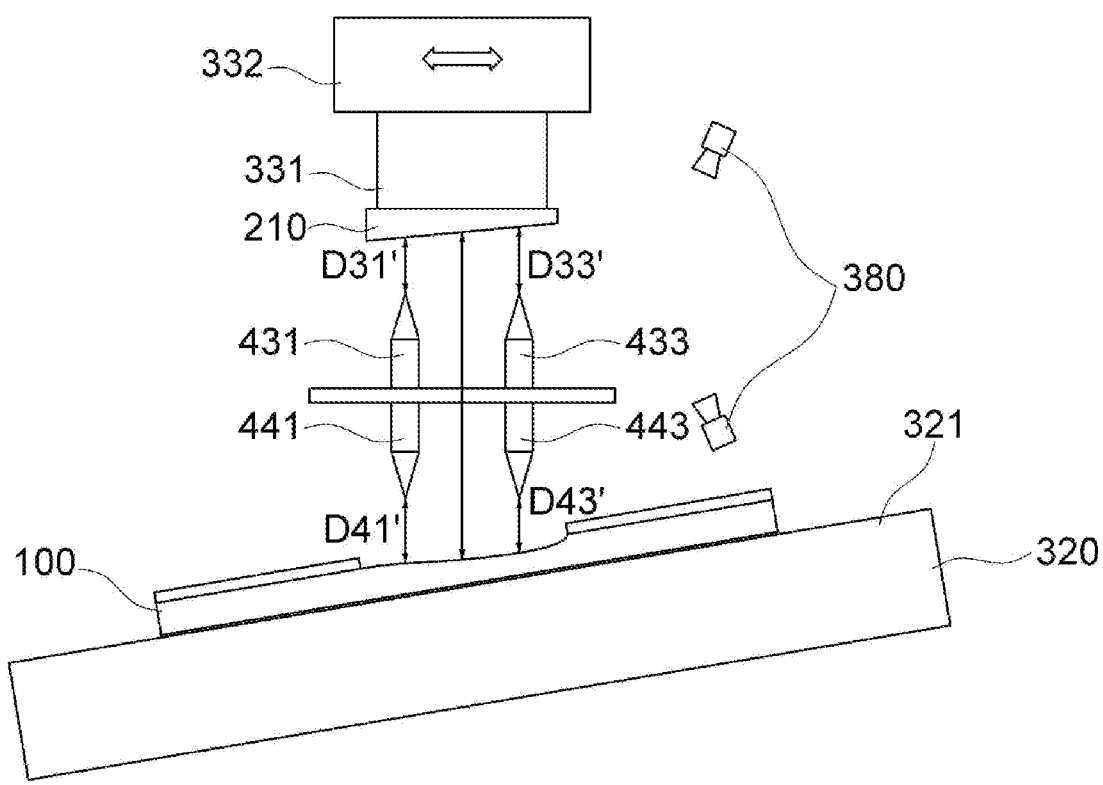
FIG. 36 is a view illustrating a method of aligning a stage and a picker in a horizontal direction after inclination adjustment, and a method of checking a distance between a front surface of a fingerprint sensing unit and a rear surface of a display panel according to an exemplary embodiment.

FIG. 36 is a view illustrating a method of aligning the stage 320 and the picker 330 in the horizontal direction, and a method of identifying a distance deviation between the front surface 211 of the fingerprint sensing unit 210 and the rear surface 111 of the display panel 100, after the inclination adjustment according to an exemplary embodiment.

Referring to FIG. 36, after the inclination of the adsorption surface 321 of the stage 320 and the inclination of the adsorption surface 335 of the picker 330 are adjusted, the camera unit 380 may capture an image of the adsorption surface 321 of the stage 320 and the adsorption surface 335 of the picker 330. The controller 310 analyzes the image captured by the camera unit 380, and calculates a position error of the sensing area 142 of the display panel 100 adsorbed to the adsorption surface 321 of the stage 320, and the front surface 211 of the fingerprint sensing unit 210. The controller 310 controls the horizontal driving unit 365 in accordance with the position error calculated from the captured image to horizontally move or rotate the adsorption surface 335 of the picker 330 so that the fingerprint sensing unit 210 precisely coincides with the sensing area 142 in the vertical direction (the Z-axis direction).

In addition, referring to FIG. 36, after adjusting the inclination of the adsorption surface 321 of the stage 320 and the inclination of the adsorption surface 335 of the picker 330, distances to the rear surface 111 of the display panel 100 and the front surface 211 of the fingerprint sensing unit 210 are measured again at a plurality of points 410 and 420, as in the manner described above with reference to FIGS. 16 to 24. The re-measured distances D31', D32', D33', D34', D41', D42', D43', and D44' may be used to confirm the adjusted inclination. In addition, the re-measured distances D31', D32', D33', D34', D41', D42', D43', and D44' may be used to determine a descend distance MD of the adsorption surface 335 of the picker 330 (or an ascend distance of the adsorption surface 321 of the stage 320).

Figure 37:
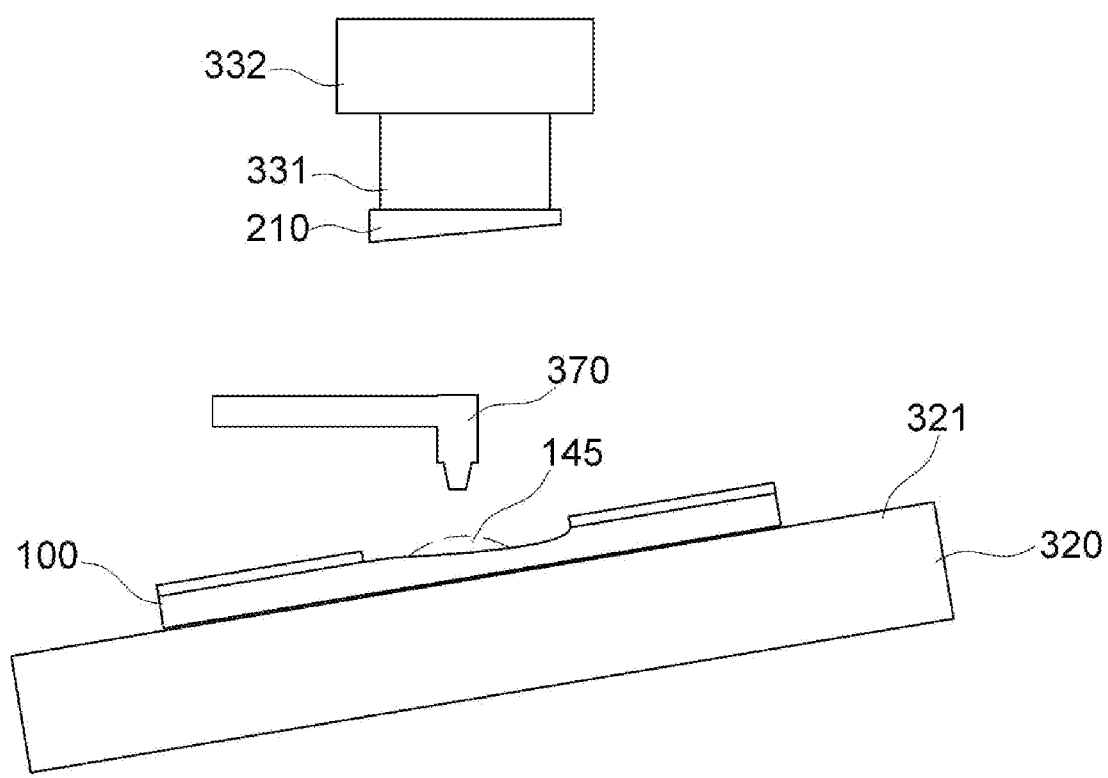
FIG. 37 is a view illustrating a method of applying an adhesive over a rear surface of a display panel according to an exemplary embodiment.

FIG. 37 is a view illustrating a method of applying the adhesive 145 to the rear surface 111 of the display panel 100 according to an exemplary embodiment.

Referring to FIG. 37, after the gaps between the rear surface 111 of the display panel 100 and the front surface 211 of the fingerprint sensing unit 210 are measured at a plurality of points, the adhesive injector 370 applies the adhesive over the rear surface 111 of the display panel 100. However, the inventive concepts are not limited thereto, and in some exemplary embodiments, the adhesive injector 370 may apply the adhesive over the front surface 211 of the fingerprint sensing unit 210.

Figure 38:
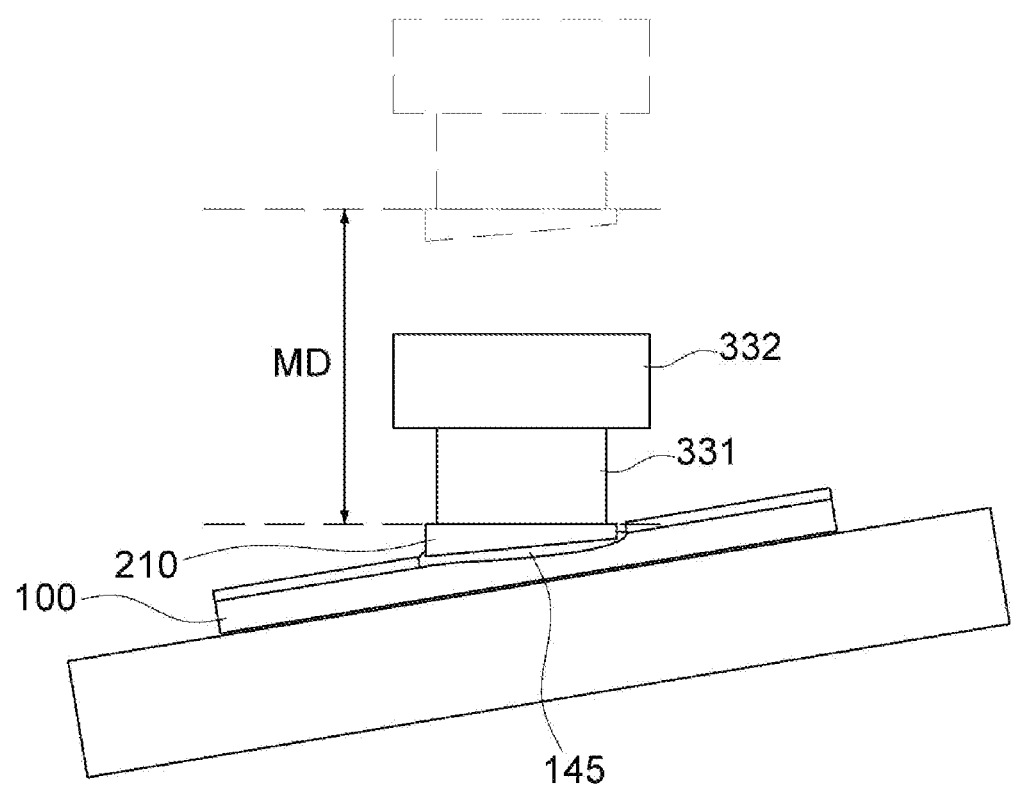
FIG. 38 is a view illustrating a method of bonding a front surface of a fingerprint sensing unit and a rear surface of a display panel according to an exemplary embodiment.

FIG. 38 is a view illustrating a method of bonding the front surface 211 of the fingerprint sensing unit 210 and the rear surface 111 of the display panel 100 according to an exemplary embodiment.

Referring to FIG. 38, the controller 310 determines a descend distance MD of the adsorption surface 335 of the picker 330 (or the ascend distance of the adsorption surface 321 of the stage 320) based on the distances D1', D2', D3', and D4' between the rear surface 111 of the display panel 100 and the front surface 211 of the fingerprint sensor 200 measured at a plurality of points. The gap between the rear surface 111 of the display panel 100 and the front surface 211 of the fingerprint sensor 200 may be determined based on the distances D1', D2', D3', and D4' re-measured at a plurality of points between the rear surface 111 of the display panel 100 and the front surface 211 of the fingerprint sensor 200, as described above with reference to FIG. 36. Alternatively, the controller 310 may determine the distances D1', D2', D3', and D4' between the rear surface 111 of the display panel 100 and the front surface 211 of the fingerprint sensor 200 after inclination adjustment, based on the distances D1, D2, D3, and D4 between the rear surface 111 of the display panel 100 and the front surface 211 of the fingerprint sensor 200 measured at a plurality of points as described above with reference to FIGS. 16 to 24, along with a predicted change amount of the gap between the rear surface 111 of the display panel 100 and the front surface 211 of the fingerprint sensor 200 after inclination adjustment.

The gap G" between the rear surface 111 of the display panel 100 and the front surface 211 of the fingerprint sensor 200 may be the smallest value, an average value, or a greatest value of gaps G1', G2', G3', and G4' between the rear surface 111 of the display panel 100 and the front surface 211 of the fingerprint sensor 200 after inclination adjustment. The descend distance MD may be determined as a value obtained by subtracting, from G", a predetermined thickness of the adhesive 145 after bonding or a predetermined gap between the rear surface 111 of the display panel 100 and the front surface 211 of the fingerprint sensor 200 after bonding. The controller 310 controls the vertical driving unit 360 so that the adsorption surface 335 of the picker 330 descends in the vertical direction by the determined descend distance MD.

Figure 39:
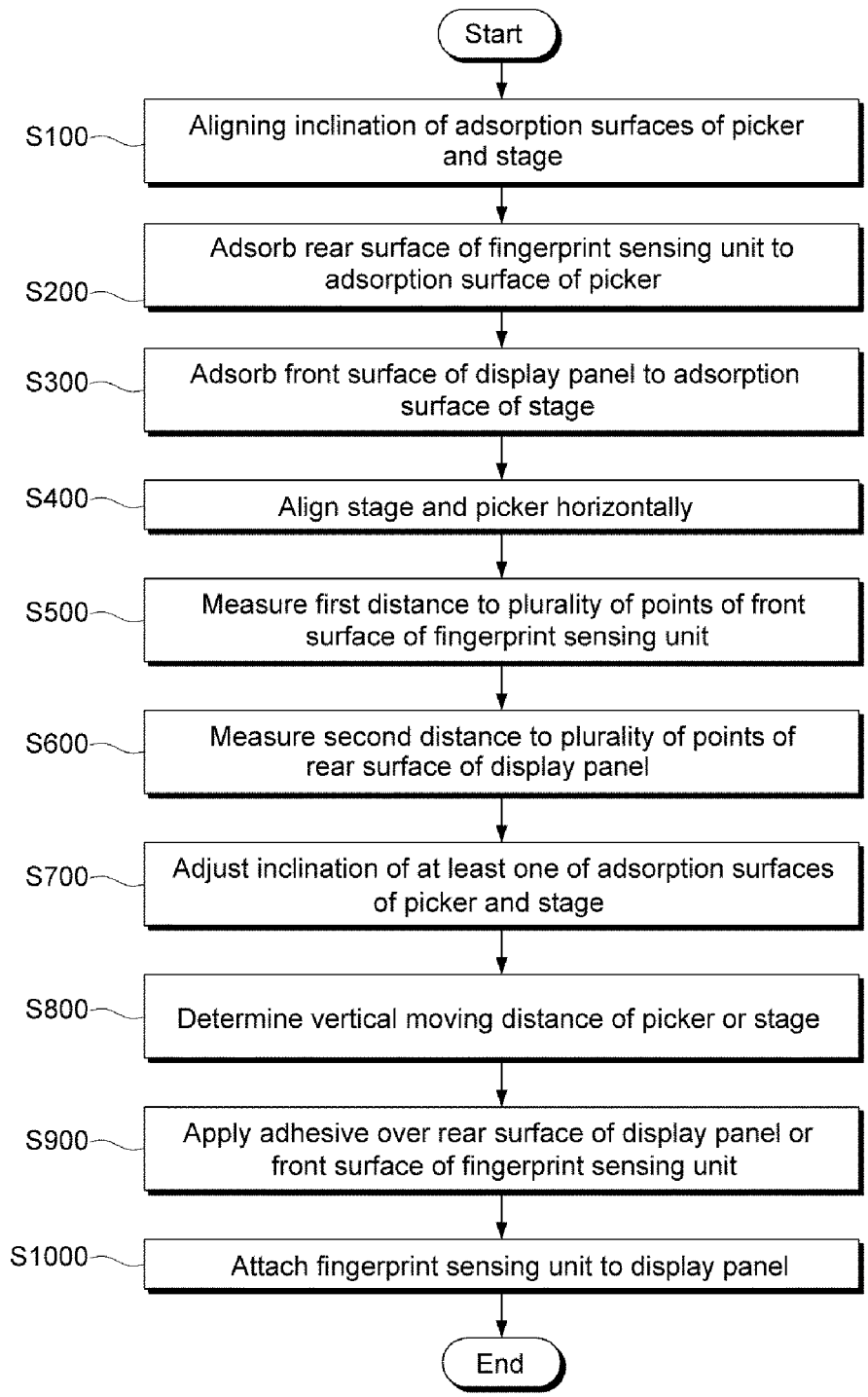
FIG. 39 is a flowchart showing a method of bonding a front surface of a fingerprint sensing unit and a rear surface of a display panel according to an exemplary embodiment.

FIG. 39 is a flowchart showing a method of bonding the front surface 211 of the fingerprint sensing unit 210 and the rear surface 111 of the display panel 100 according to an exemplary embodiment.

The bonding method according to an exemplary embodiment may include aligning the inclination of the adsorption surface 335 of the picker 330 and the inclination of the adsorption surface 321 of the stage 320 (S100). The adsorption surface 335 of the picker 330 may be a first planar surface and the adsorption surface 321 of the stage 320 may be a second planar surface. The adsorption surface 335 of the picker 330 may be aligned to have a (1-1)-th inclination, and the adsorption surface 321 of the stage 320 may be aligned to have a (2-1)-th inclination. The (1-1)-th inclination and the (2-1)-th inclination may be defined as normal vectors of the adsorption surface 335 of the picker 330 and the adsorption surface 321 of the stage 320, respectively. The (1-1)-th inclination of the adsorption surface 335 of the picker 330 and the (2-1)-th inclination of the adsorption surface 321 of the stage 320 may be aligned to be substantially the same. The adsorption surface 335 of the picker 330 and the adsorption surface 321 of the stage 320 may be aligned so as to be parallel to a horizontal plane perpendicular to the gravity direction or the vertical direction, for example. Detailed descriptions thereof will be described below with reference to FIG. 40.

As illustrated in FIG. 11, the rear surface 212 of the fingerprint sensing unit 210 is adsorbed and secured to the adsorption surface 335 of the picker 330 (S200), and the front surface of the display panel 100 is adsorbed and secured to the adsorption surface 321 of the stage 320 (S300). The front surface of the display panel 100 may refer to the front surface of the display unit 120 or the front surface of the window 130.

In the above description, the fingerprint sensing unit 210 and the display panel 100 are described as being adsorbed and secured to the picker 330 and the stage 320, but the inventive concepts are not limited thereto. For example, in some exemplary embodiments, the fingerprint sensing unit 210 and the display panel 100 may be attached to the picker 330 and the stage 320 by various methods, such as adsorption by a vacuum pump and attachment by static electricity.

Next, the picker 330 to which the fingerprint sensing unit 210 is adsorbed and the stage 320 to which the display panel 100 is adsorbed may be aligned in the horizontal direction (S400), which will be described in more detail below with reference to FIG. 41.

Next, as illustrated in FIGS. 12, 13, and 16 to 22, the first distances D31, D32, D33, and D34 to the plurality of first points 410 located at the front surface 211 of the fingerprint sensing unit 210 are measured by the first distance measuring unit (S500), and the second distances D41, D42, D43, and D44 to the plurality of second points 420 located at the rear surface 111 of the display panel 100 are measured by the second distance measuring unit (S600). The rear surface 111 of the display panel 100 may refer to the rear surface 111 of the substrate 110 of the predetermined sensing area 142 exposed by the composite sheet 140.

Next, the inclination of at least one of the adsorption surface 321 (e.g., second planar surface) of the stage 320 and the adsorption surface 335 (e.g., first planar surface) of the picker 330 is adjusted (S700).

More specifically, as illustrated in FIG. 34, the controller 310 may output the first control signal for adjusting an inclination of the first planar surface 335 of the picker 330 from the (1-1)-th inclination to a (1-2)-th inclination, based on the first distances D31, D32, D33, and D34 and the second distances D41, D42, D43, and D44, and the first inclination adjusting unit 350 may adjust the inclination of the first planar surface 335 according to the first control signal.

Alternatively, as illustrated in FIG. 35, the controller 310 may output the second control signal for adjusting an inclination of the second planar surface 321 of the stage 320 from the (2-1)-th inclination to a (2-2)-th inclination, and the second inclination adjusting unit 340 may adjust the inclination of the second planar surface 321 according to the second control signal.

Still alternatively, as illustrated in FIG. 33, the controller 310 may output the first control signal for adjusting an inclination of the first planar surface 335 of the picker 330 from the (1-1)-th inclination to the (1-2)-th inclination, based on the first distances D31, D32, D33, and D34 and the second distances D41, D42, D43, and D44, the first inclination adjusting unit 350 may adjust the inclination of the first planar surface 335 according to the first control signal, the controller 310 may output the second control signal for adjusting an inclination of the second planar surface 321 of the stage 320 from the (2-1)-th inclination to the (2-2)-th inclination, and the second inclination adjusting unit 340 may adjust the inclination of the second planar surface 321 according to the second control signal.

The method of determining the (1-2)-th inclination and the (2-2)-th inclination is as illustrated in FIGS. 23 to 32. The method of determining the (1-2)-th inclination and the (2-2)-th inclination will be described below in detail with reference to FIGS. 42 through 45.

Next, the controller 310 may determine a moving distance of at least one of the picker 330 and the stage 320 in the vertical direction (S800). As described above, at least one of the inclination of the adsorption surface 321 of the stage 320 and the inclination of the adsorption surface 335 of the picker 330 is adjusted to the (1-2)-th inclination and the (2-2)-th inclination, respectively. Accordingly, the controller 310 may determine a moving distance MD of at least one of the picker 330 and the stage 320 in the vertical direction, based on the first distances D31', D32', D33', and D34' to the plurality of first points 410 and the distance D41', D42', D43', and D44' to the plurality of second points 420 after inclination adjustment.

As illustrated in FIG. 36, when the adsorption surface 335 of the picker 330 is adjusted to the (1-2)-th inclination, the first distance measuring unit may re-measure the first distances D31', D32', D33', and D34' to the plurality of first points 410 located at the front surface 211 of the fingerprint sensing unit 210. When the inclination of the adsorption surface 335 of the picker 330 is not adjusted, that is, it has the (1-1)-th inclination, the first distances D31, D32, D33, and D34 to the plurality of first points 410 may not be changed. When the adsorption surface 321 of the stage 320 is adjusted to the (2-2)-th inclination, the second distance measuring unit may re-measure the second distances D42', D42', D43', and D44' to the plurality of second points 420 located at the rear surface 111 of the display panel 100. When the inclination of the adsorption surface 321 of the stage 320 is not adjusted, that is, it has the (2-1)-th inclination, the second distances D42, D42, D43, and D44 to the plurality of second points 420 may not be changed.

Alternatively, the controller 310 may calculate the first distances D31', D32', D33', and D34' to the plurality of first points 410 after adjustment to the (1-2)-th inclination and the second distances D42', D42', D43', and D44' to the plurality of second points 420 after adjustment to the (2-2)-th inclination, without the re-measuring step, based on a difference between the (1-1)-th inclination and the (1-2)-th inclination and a difference between the (2-1)-th inclination and the (2-2)-th inclination.

The controller 310 determines the moving distance MD (=G'−PG) as a value obtained by subtracting a predetermined set value PG from distances G1', G2', G3', G4', and G" between the rear surface 111 of the display panel 100 and the front surface 211 of the fingerprint sensing unit 210, determined based on the first distances D31', D32', D33', and D34' to the plurality of first points 410 after adjustment to the (1-2)-th inclination and the second distances D42', D42', D43', and D44' to the plurality of second points 420 after inclination adjustment. The predetermined set value PG may correspond to a thickness of the adhesive 145 after bonding, or a gap between the rear surface 111 of the display panel 100 and the front surface of the fingerprint sensor 200. The predetermined set value may be about 5 μm or more, or about 10 μm or more. Further, the predetermined set value may be about 20 μm or less, or about 15 μm or less.

Next, the adhesive injector 370 applies an adhesive over the rear surface 111 of the display panel 100, and more particularly, over the sensing area 142 or the front surface 211 of the fingerprint sensing unit 210 (S900). The adhesive may be applied with a thickness greater than the predetermined set value PG over a part of at least one of the rear surface 111 of the display panel 100 or the front surface 211 of the fingerprint sensing unit 210, and the adhesive may then be spread over the front surface 211 of the fingerprint sensing unit 210 by the pressure applied during the bonding process between the display panel 100 and the fingerprint sensing unit 210.

Next, the vertical driving unit 360 moves at least one of the adsorption surface 335 of the picker 330 and the adsorption surface 321 of the stage 320 along the vertical direction, so that the front surface 211 of the fingerprint sensing unit 210 and the rear surface 111 of the display panel 100 are bonded to each other (S1000). The vertical driving unit 360 may move the adsorption surface 335 of the picker 330 by the determined moving distance MD in the vertical direction under the control of the controller 310. Alternatively, the vertical driving unit 360 may move the adsorption surface 321 of the stage 320 by the determined moving distance MD in the vertical direction. Still alternatively, the vertical driving unit 360 may move the adsorption surface 335 of the picker 330 and the adsorption surface 321 of the stage 320 toward each other so that they are spaced apart from each other by the predetermined set value PG.

Figure 40:
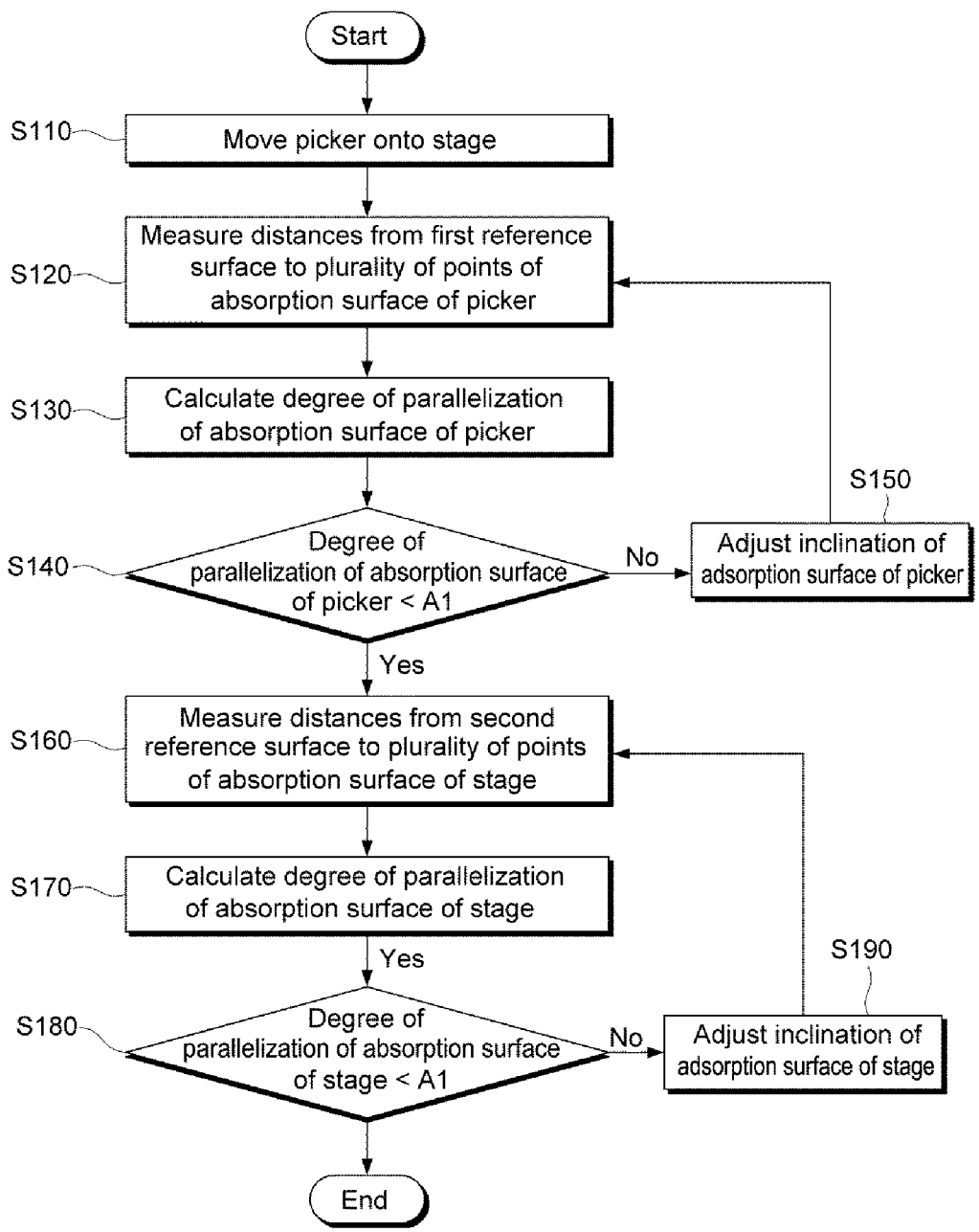
FIG. 40 is a flowchart showing a method of aligning inclinations of an adsorption surface of a stage and an adsorption surface of a picker according to an exemplary embodiment.

FIG. 40 is a flowchart showing a method of aligning the inclination of the adsorption surface 321 of the stage 320 and the adsorption surface 335 of the picker 330 according to an exemplary embodiment. The flowchart illustrated in FIG. 40 may correspond to the step S100 shown in FIG. 39 according to an exemplary embodiment.

First, the picker 330 moves onto the stage 320 (S110).

Next, as illustrated in FIG. 14, the first distance measuring units 431, 432, 433, and 434 measure distances D11, D12, D13, and D14 from the first reference plane RP1 to the (1-1)-th, (1-2)-th, (1-3)-th, and (1-4)-th points 411, 412, 413, and 414 located at the adsorption surface 335 of the picker 330 (S120). The first reference plane RP1 may be any plane parallel to the XY plane.

The controller 310 calculates a parallelism of the adsorption surface 335 of the picker 330 with respect to the first reference plane RP1 using a deviation between the distances D11, D12, D13, and D14 (S130). The parallelism of the adsorption surface 335 of the picker 330 with respect to the first reference plane RP1 may be defined as the greatest deviation between the distances D11, D12, D13, and D14.

The controller 310 compares the parallelism of the adsorption surface 335 of the picker 330 with a predetermined parallelism tolerance A1 (S130). When the parallelism of the adsorption surface 335 of the picker 330 is greater than the predetermined parallelism tolerance A1, the controller 310 aligns the inclination of the adsorption surface 335 of the picker 330 so that the parallelism of the adsorption surface 335 of the picker 330 becomes substantially minimum, that is, the adsorption surface 335 of the picker 330 is substantially parallel to the first reference plane RP1.

The predetermined parallelism tolerance A1 may be about 5 μm, about 10 μm, or about 20 μm.

After the inclination alignment, the parallelism of the adsorption surface 335 of the picker 330 may be checked again (S120, S130, and S140). When the parallelism of the adsorption surface 335 of the picker 330 is less than the predetermined parallelism tolerance A1, the inclination of the adsorption surface 335 of the aligned picker 330 may be set to the (1-1)-th inclination.

As illustrated in FIG. 15, the second distance measuring units 441, 442, 443, and 444 measure distances D21, D22, D23, and D24 from the second reference plane RP2 to the (2-1)-th, (2-2)-th, (2-3)-th, and (2-4)-th points 421, 422, 423, and 424 located at the adsorption surface 321 of the stage 320. The second reference plane RP2 may be any plane parallel to the XY plane. The second reference plane RP2 may be a substantially same plane as the first reference plane RP1.

The controller 310 calculates a parallelism of the adsorption surface 321 of the stage 320 with respect to the second reference plane RP2 using a deviation between the distances D21, D22, D23, and D24 (S170). The parallelism of the adsorption surface 321 of the stage 320 with respect to the second reference plane RP2 may be defined as the greatest deviation between the distances D21, D22, D23, and D24.

The controller 310 compares the parallelism of the adsorption surface 321 of the stage 320 with a predetermined parallelism tolerance A1 (S180). When the parallelism of the adsorption surface 321 of the stage 320 is greater than the predetermined parallelism tolerance A1, the controller 310 aligns the inclination of the adsorption surface 321 of the stage 320, so that the parallelism of the adsorption surface 321 of the stage 320 becomes substantially minimum, that is, the adsorption surface 321 of the stage 320 is substantially parallel to the second reference plane RP2.

After the inclination alignment, the parallelism of the adsorption surface 321 of the stage 320 may be checked again (S120, S130, and S140). When the parallelism of the adsorption surface 321 of the stage 320 is less than the predetermined parallelism tolerance A1, the inclination of the adsorption surface 335 of the aligned picker 330 may be set to the (2-1)-th inclination.

Figure 41:
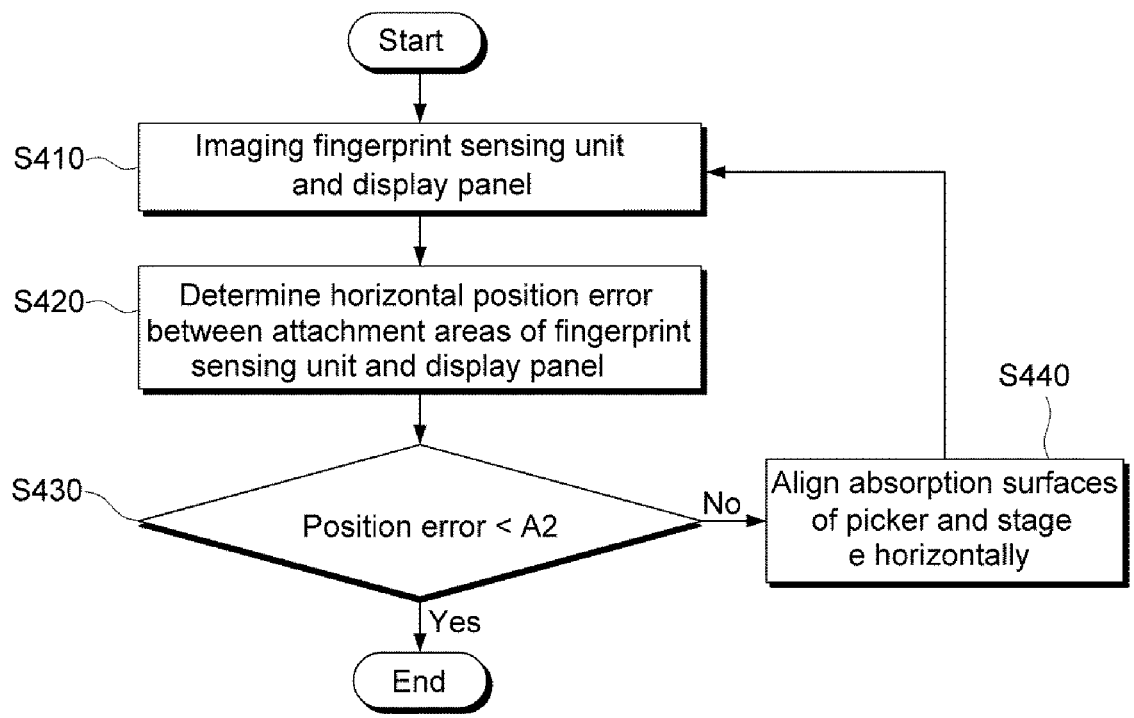
FIG. 41 is a flowchart showing a method of aligning an adsorption surface of a stage and an adsorption surface of a picker in a horizontal direction according to an exemplary embodiment.

FIG. 41 is a flowchart showing a method of aligning the inclination of the adsorption surface 321 of the stage 320 and the adsorption surface 335 of the picker 330 according to an exemplary embodiment. The flowchart illustrated in FIG. 41 may correspond to the step S400 shown in FIG. 39 according to an exemplary embodiment.

As described above, the rear surface of the fingerprint sensing unit 210 is adsorbed and secured to the adsorption surface 335 of the picker 330 (S200), the front surface of the display panel 100 is adsorbed and secured to the adsorption surface 321 of the stage 320 (S300), and then the picker 330 moves to a predetermined position on the stage 320.

The camera unit 380 images the rear surface 111 of the display panel 100 secured to the adsorption surface 321 of the stage 320, and images the front surface 211 of the fingerprint sensing unit 210 secured to the adsorption surface 335 of the picker 330 (S410).

The controller 310 analyzes the image captured by the camera unit 380 to calculate a position error between the sensing area 142 of the display panel 100 adsorbed to the adsorption surface 321 of the stage 320, and the front surface 211 of fingerprint sensing unit 210 (S420). The position error may refer to an error in the horizontal direction when the sensing area of the rear surface 111 of the display panel 100 and the front surface 211 of the fingerprint sensing unit 210 are bonded in the vertical direction by the vertical driving unit. The positional error may include a distance error in two directions (the X-axis direction and the Y-axis direction) perpendicular to the vertical direction (the Z-axis direction) and a rotation error about a vertical direction (the Z-axis direction).

The controller 310 compares the position error with a predetermined tolerance A2 (S430)

When the position error is greater than the predetermined tolerance A2, the horizontal driving unit 365 horizontally moves or rotates the adsorption surface 335 of the picker 330 so that the fingerprint sensing unit 210 and the sensing area are precisely superimposed in the vertical direction (the Z-axis direction) under the control of the controller 310 (S440).

The horizontal alignment (S400, S410, S420, S430, and S440) of the stage 320 and the picker 330 may be performed again after the inclination adjustment (S700) of the adsorption surface of the stage 320 and the adsorption surface 335 of the picker 330.

Figure 42:
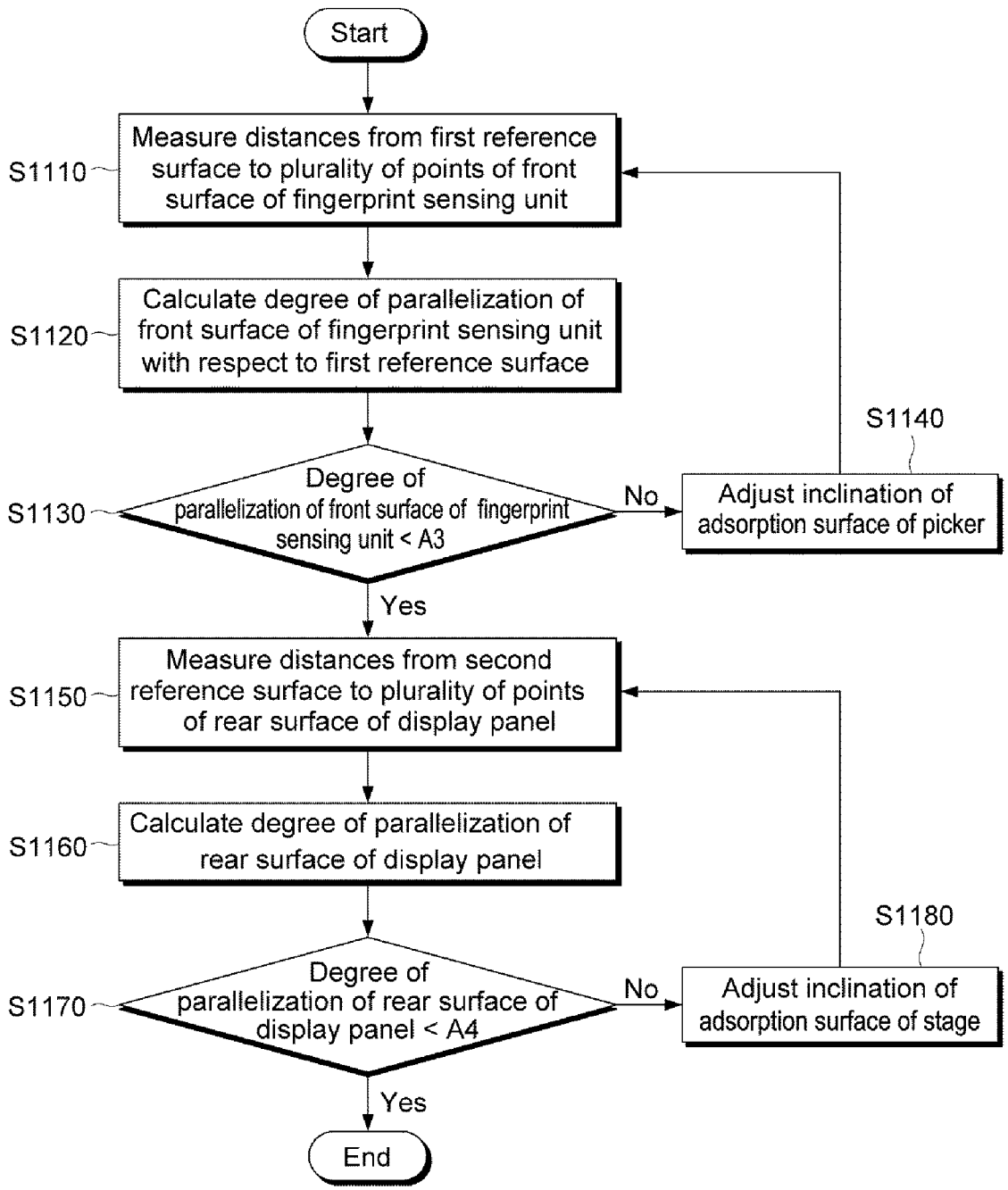
FIG. 42 is a flowchart showing a method of adjusting inclinations of an adsorption surface of a stage and an adsorption surface of a picker according to an exemplary embodiment.

FIG. 42 is a flowchart showing a method of adjusting an inclination of the adsorption surface 321 of the stage 320 and an inclination of the adsorption surface 335 of the picker 330 according to an exemplary embodiment. The flowchart illustrated in FIG. 42 may correspond to the steps S600 and S700 illustrated in FIG. 39 according to an exemplary embodiment.

The first distance measuring units 431, 432, 433, and 434 measure first distances D31, D32, D33, and D34 from the first reference plane RP1 to the (1-1)-th, (1-2)-th, (1-3)-th, and (1-4)-th points 411, 412, 413, and 414 located at the front surface 211 of the fingerprint sensing unit 210 adsorbed to the adsorption surface 335 of the picker 330 (S1110). The first reference plane RP1 may be any plane parallel to the XY plane.

The controller 310 calculates the parallelism of the front surface 211 of the fingerprint sensing unit 210 with respect to the first reference plane RP1 using the deviation between the first distances D31, D32, D33, and D34 (S1120). The parallelism of the front surface 211 of the fingerprint sensing unit 210 with respect to the first reference plane RP1 may be defined as the greatest deviation between the first distances D31, D32, D33, and D34. The parallelism of the front surface 211 of the fingerprint sensing unit 210 with respect to the first reference plane RP1 may correspond to ΔDD2 described above with reference to FIGS. 26 to 31.

The controller 310 compares the parallelism of the front surface 211 of the fingerprint sensing unit 210 with respect to the first reference plane RP1 with a predetermined parallelism tolerance A3 (S1130). The predetermined parallelism tolerance A3 may be about 5 μm, about 10 μm, or about 20 μm.

When the parallelism of the front surface 211 of the fingerprint sensing unit 210 is greater than the predetermined tolerance A3, the controller 310 controls the inclination of the adsorption surface 335 of the aligned picker 330 from the (1-1)-th inclination to the (1-2)-th inclination, so that the parallelism of the front surface 211 of the fingerprint sensing unit 210 with respect to the first reference plane RP1 is reduced, and more preferably, substantially minimized (S1140).

The first reference plane RP1 may be any plane parallel to the XY plane. Alternatively, the first reference plane RP1 may be any plane parallel to the adsorption surface 321 of the stage 320 having the (2-1)-th inclination before the inclination adjustment. The adsorption surface 321 of the stage 320 having the (2-1)-th inclination may be any plane parallel to the XY plane.

After the inclination adjustment, the parallelism of the front surface 211 of the fingerprint sensing unit 210 may be checked again (S1110, S1120, and S1130).

The second distance measuring units 441, 442, 443 and 444 measure second distances D41, D42, D43, and D44 from the second reference plane RP2 to the (2-1)-th, (2-2)-th, (2-3)-th, and (2-4)-th points 421, 422, 423, and 424 located at the rear surface 111 of the display panel 100 adsorbed to the adsorption surface 321 of the stage 320 (S1150). The second reference plane RP2 may be any plane parallel to the first reference plane RP1.

The controller 310 calculates the parallelism of the rear surface 111 of the display panel 100 with respect to the second reference plane RP2 using the deviation between the second distances D41, D42, D43, and D44 (S1160). The parallelism of the rear surface 111 of the display panel 100 with respect to the second reference plane RP2 may be defined as the greatest deviation between the second distances D41, D42, D43, and D44. The parallelism of the rear surface 111 of the display panel 100 with respect to the second reference plane RP2 may correspond to ΔDD2 described above with reference to FIGS. 26 to 31.

The controller 310 compares the parallelism of the rear surface 111 of the display panel 100 with respect to the second reference plane RP2 with a predetermined parallelism tolerance A4 (S1170). The predetermined parallelism tolerance A3 may be about 5 μm, about 10 μm, or about 20 μm.

When the parallelism of the rear surface 111 of the display panel 100 is greater than the predetermined tolerance A4, the controller 310 controls the inclination of the adsorption surface 321 of the stage 320 from the (2-1)-th inclination to the (2-2)-th inclination, so that the parallelism of the rear surface 111 of the display panel 100 with respect to the second reference plane RP2 is reduced, and more preferably, substantially minimized (S1180).

The second reference plane RP2 may be any plane parallel to the XY plane. Alternatively, the second reference plane RP2 may be any plane parallel to the adsorption surface 335 of the picker 330 having the (1-1)-th inclination before the inclination adjustment. The adsorption surface 335 of the picker 330 having the (1-1)-th inclination may be any plane parallel to the XY plane.

After the inclination adjustment, the parallelism of the rear surface 111 of the display panel 100 may be checked again (S1150, S1160, and S1170).

In some exemplary embodiments, the steps S1150, S1160, S1170, and S1180 for checking the parallelism of the rear surface 111 of the display panel 100 may be omitted. In this case, the first reference plane RP1 is an arbitrary plane parallel to the adsorption surface 321 of the stage 320.

The controller 310 calculates a parallelism of the front surface 211 of the fingerprint sensing unit 210 with respect to the adsorption surface 321 of the stage 320 based on a deviation between the first distances D31, D32, D33, and D34 measured in step S1110 (S1120). The controller 310 controls the inclination of the adsorption surface 335 of the picker 330 from the (1-1)-th inclination to the (1-2)-th inclination so that the parallelism of the front surface 211 of the fingerprint sensing unit 210 with respect to the adsorption surface 321 of the stage 320 is reduced, and more preferably, substantially minimized (S1140). However, the inventive concepts are not limited thereto, and in some exemplary embodiments, the controller 310 may control the inclination of the adsorption surface 321 of the stage 320 from the (2-1)-th inclination to the (2-2)-th inclination so that the parallelism of the front surface 211 of the fingerprint sensing unit 210 with respect to the adsorption surface 321 of the stage 320 is reduced, and more preferably, substantially minimized.

Accordingly, regardless of the thickness deviation of the display panel 100, and the inclination of at least one of the adsorption surface 321 of the stage 320 and the adsorption surface 335 of the picker 330 may be adjusted, so that parallelism of the front surface 211 of the fingerprint sensing unit 210 with respect to the adsorption surface 321 of the stage 320 or the front surface of the display panel 100 to which the user's fingerprint is received, may become substantially minimum.

As similarly described above, in an exemplary embodiment, the steps (S1110, S1120, S1130, and S1140) of checking the parallelism of the front surface 211 of the fingerprint sensing unit 210 may be omitted. In this case, the second reference plane RP2 is an arbitrary plane parallel to the adsorption surface 335 of the picker 330.

Figure 43:
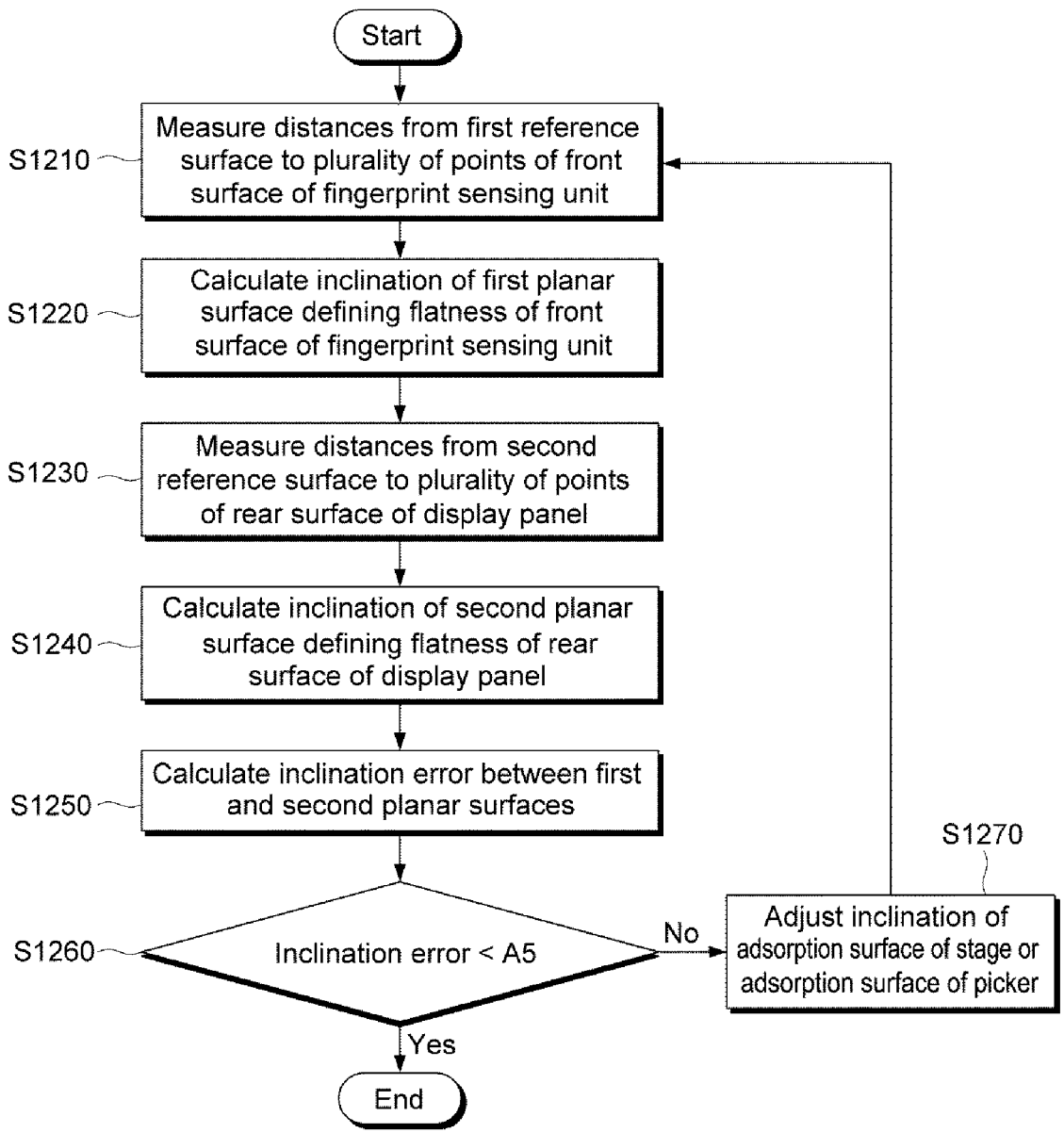
FIG. 43 is a flowchart showing a method of adjusting inclinations of an adsorption surface of a stage and an adsorption surface of a picker according to an exemplary embodiment.

FIG. 43 is a flowchart showing a method of adjusting a inclination of the adsorption surface 321 of the stage 320 or the adsorption surface 335 of the picker 330 according to an exemplary embodiment. The flowchart illustrated in FIG. 43 may correspond to the steps S600 and S700 illustrated in FIG. 39, according to an exemplary embodiment.

As described above in step S1110, the first distances D31, D32, D33, and D34 to the (1-1)-th, (1-2)-th, (1-3)-th, and (1-4)-th points 411, 412, 413, and 414 located at the front surface 211 of the fingerprint sensing unit 210 adsorbed to the adsorption surface 335 of the picker 330 are measured (S1210).

As illustrated in FIGS. 28 and 29, the controller 310 determines the inclination of the first planes 463 and 464 defining flatness ΔDD1 of the front surface 211 of the fingerprint sensing unit 210 using the deviation between the first distances D31, D32, D33, and D34 (S1220).

In addition, as in the above-described step S1150, the second distances D41, D42, D43, and D44 to the (2-1)-th, (2-2)-th, (2-3)-th, and (2-4)-th points 421, 422, 423, and 424 located at the rear surface 111 of the display panel 100 adsorbed to the adsorption surface 321 of the stage 320 are measured (S1230).

The controller 310 determines the inclination of the second planes 473 and 474 defining the flatness ΔDD4 of the rear surface 111 of the display panel 100 using the deviation between the second distances D41, D42, D43, and D44 (S1240).

The controller 310 calculates an error between the inclination of the first planes 463 and 464 and the inclination of the second planes 473 and 474 (S1250). The inclination of the first planes 463 and 464 and the inclination of the second planes 473 and 474 may be defined as normal vectors perpendicular to the respective planes. An error between the inclination of the first planar surface 463, 464 and the inclination of the second planes 473, 474 may be defined as an angle between each normal vector.

The controller 310 compares the error between the inclination of the first planes 463 and 464 and the inclination of the second planes 473 and 474 with a predetermined tolerance A5 (S1260). The predetermined tolerance A5 may be about 1, 2, 3, or 5 degrees.

When the error between the inclination of the first planes 463 and 464 and the inclination of the second planes 473 and 474 is greater than the predetermined tolerance A5, the controller 310 adjusts the inclination of at least one of the surface 335 of the picker 330 and the adsorption surface 321 of the stage 320, so that the error between the inclination of the first planes 463 and 464 and the inclination of the second planes 473 and 474 is reduced, and more preferably, that the inclination of the first planes 463 and 464 becomes substantially equal to the inclination of the second planes 473 and 474 (S1270).

The error between the inclination of the first planes 463 and 464 and the inclination of the second planes 473 and 474 may be checked again after the inclination adjustment (S1210-S1270).

Figure 44:
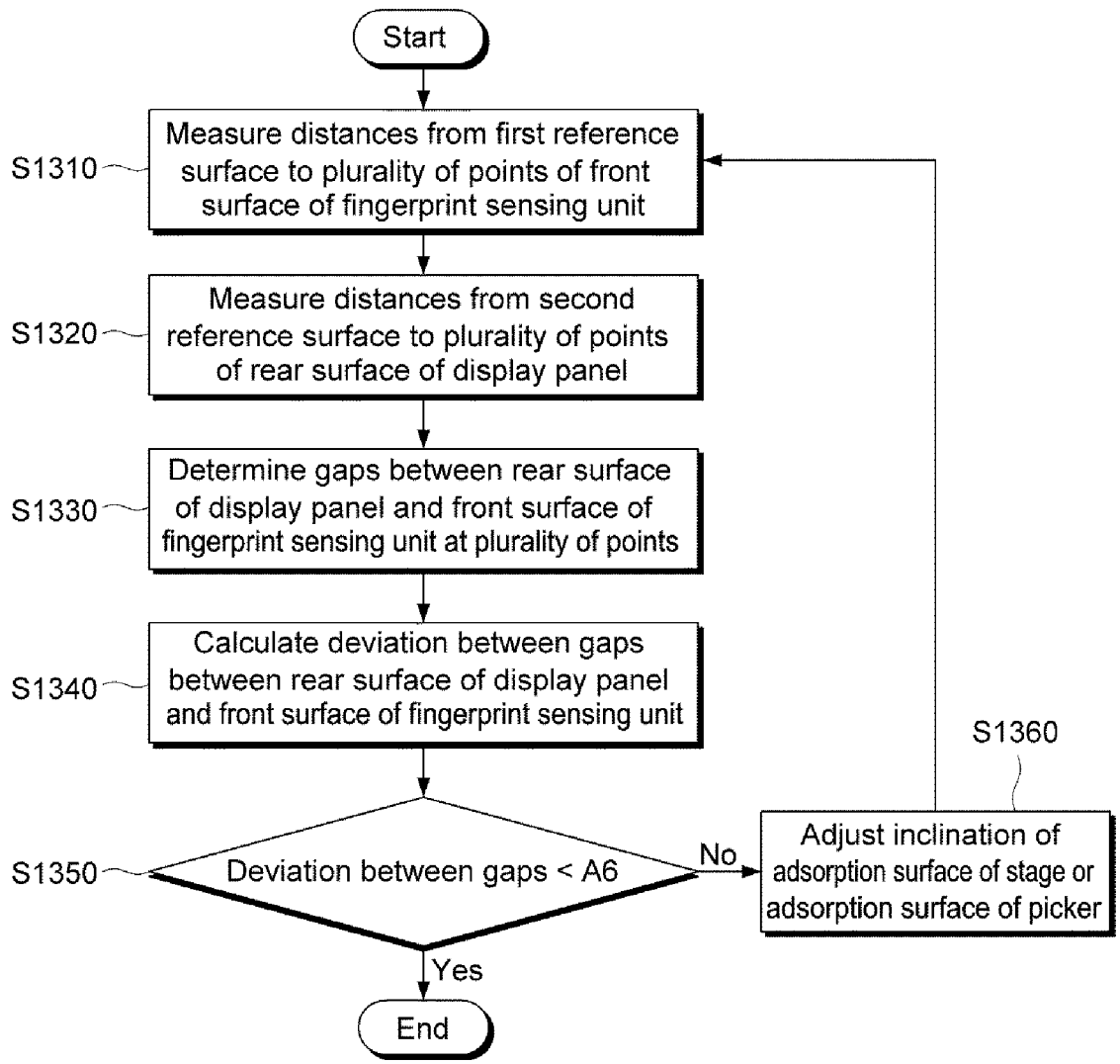
FIG. 44 is a flowchart showing a method of adjusting inclinations of an adsorption surface of a stage and an adsorption surface of a picker according to an exemplary embodiment.

FIG. 44 is a flowchart showing a method of adjusting a inclination of the adsorption surface 321 of the stage 320 or the adsorption surface 335 of the picker 330 according to another exemplary embodiment. The flowchart illustrated in FIG. 44 may correspond to the steps S600 and S700 illustrated in FIG. 39 according to another exemplary embodiment.

As described above in step S1110, the first distances D31, D32, D33, and D34 to the (1-1)-th, (1-2)-th, (1-3)-th, and (1-4)-th points 411, 412, 413, and 414 located at the front surface 211 of the fingerprint sensing unit 210 adsorbed to the adsorption surface 335 of the picker 330 are measured (S1310).

In addition, as in the above-described step S1150, the second distances D41, D42, D43, and D44 to the (2-1)-th, (2-2)-th, (2-3)-th, and (2-4)-th points 421, 422, 423, and 424 located at the rear surface 111 of the display panel 100 adsorbed to the adsorption surface 321 of the stage 320 are measured (S1320).

As illustrated in FIG. 12, the (1-1)-th, (1-2)-th, (1-3)-th, and (1-4)-th points 411, 412, 413, and 414 may correspond to positions substantially the same as positions of the (2-1)-th, (2-2)-th, (2-3)-th, and (2-4)-th points 421, 422, 423, and 424, respectively, on an XY plane.

The controller 310 may determine gaps G1 (=D31+D41), G2 (=D32+D42), G3 (=D33+D43), and G4 (=D34+D44) between the (1-1)-th, (1-2)-th, (1-3)-th, and (1-4)-th points 411, 412, 413, and 414 and corresponding ones of the (2-1)-th, (2-2)-th, (2-3)-th, and (2-4)-th points 421, 422, 423, and 424, respectively, based on the first distances D31, D32, D33, and D34 from the first reference plane RP1 to the (1-1)-th, (1-2)-th, (1-3)-th, and (1-4)-th points 411, 412, 413, and 414, respectively, located at the fingerprint sensing unit 210 adsorbed to the adsorption surface 335 of the picker 330, which are measured as in FIG. 16, and based on the second distances D41, D42, D43, and D44 from the second reference plane RP2 to the (2-1)-th, (2-2)-th, (2-3)-th, and (2-4)-th points 421, 422, 423 and 424, respectively, located at the rear surface 111 of the display panel 100 adsorbed to the adsorption surface 321 of the stage 320, which are measured as in FIG. 17 (S1330).

The controller 310 calculates a deviation between the gaps G1, G2, G3, and G4 (S1340). The controller 310 may calculate the deviation between the gaps G1 and G3 and the deviation between the gaps G1 and G3, respectively (S1340).

The controller 310 compares each of the deviation between the gaps G1 and G3 and the deviation between the gaps G2 and G4 with a predetermined tolerance A6, respectively (S1350). The predetermined tolerance A6 may be about 5 um, about 10 um, or about 20 um.

When the deviation between the gaps G1 and G3 is greater than the predetermined tolerance A6, the controller 310 adjusts the inclination of at least one of the surface 335 of the picker 330 and the adsorption surface 321 of the stage 320 so that the deviation between the gaps G1 and G3 is reduced, and more particularly, that they become substantial the same (S1360). In addition, when the deviation between the gaps G2 and G4 is greater than the predetermined tolerance A6, the controller 310 adjusts the inclination of at least one of the surface 335 of the picker 330 and the adsorption surface 321 of the stage 320, so that the deviation between the gaps G2 and G4 is reduced, and more particularly, that they become substantial the same (S1360).

The deviation between the gaps D1, D2, D3, and D4 may be checked again after inclination adjustment (S1310-S1360).

Figure 45:
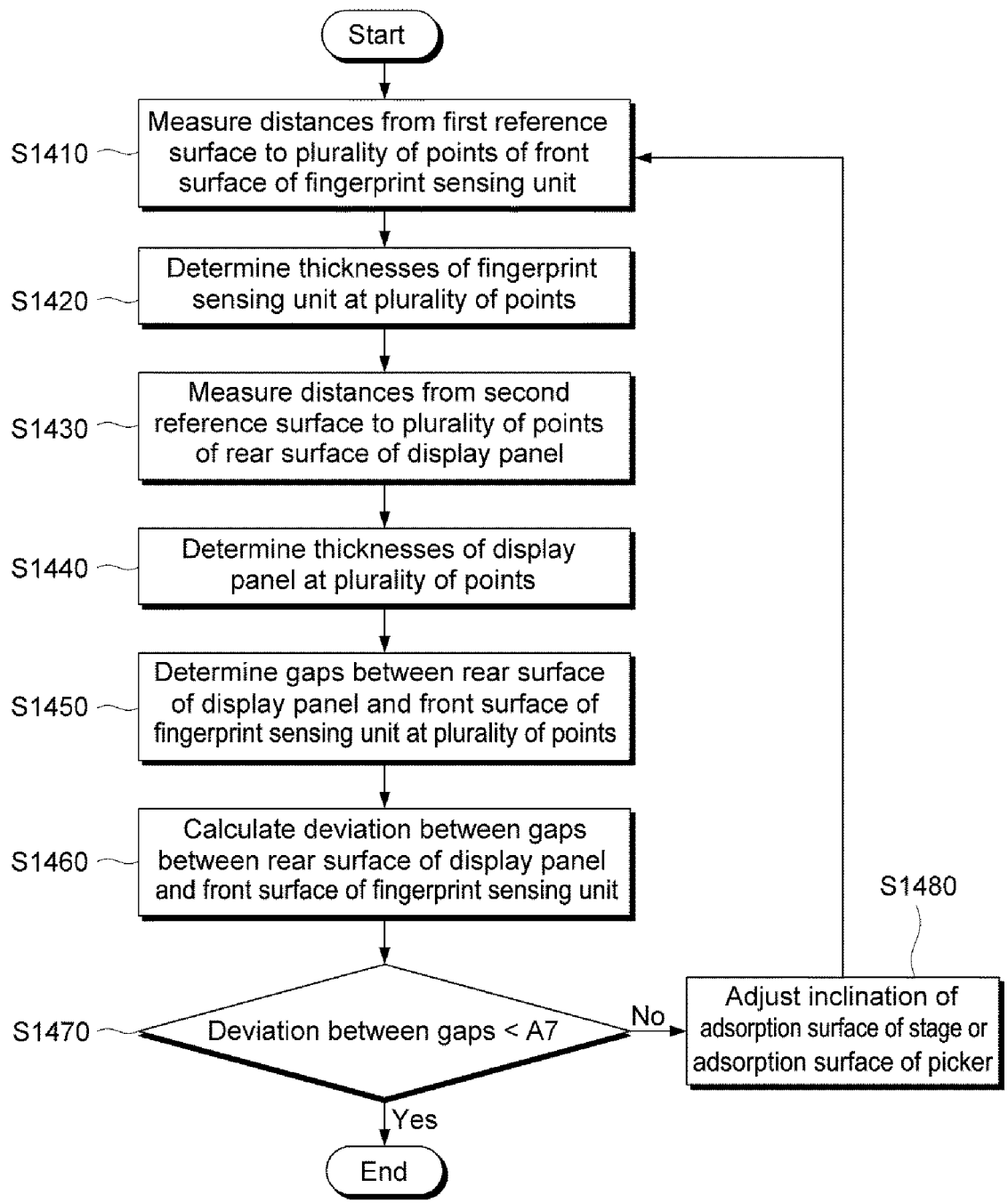
FIG. 45 is a flowchart showing a method of adjusting inclinations of an adsorption surface of a stage and an adsorption surface of a picker according to an exemplary embodiment.

FIG. 45 is a flowchart showing a method of adjusting a inclination of the adsorption surface 321 of the stage 320 or the adsorption surface 335 of the picker 330 according to another exemplary embodiment. The flowchart illustrated in FIG. 45 may correspond to the steps S600 and S700 illustrated in FIG. 39 according to another exemplary embodiment.

As described above in step S1110, the first distances D31, D32, D33, and D34 to the (1-1)-th, (1-2)-th, (1-3)-th, and (1-4)-th points 411, 412, 413, and 414 located at the front surface 211 of the fingerprint sensing unit 210 adsorbed to the adsorption surface 335 of the picker 330 are measured (S1410).

In addition, as illustrated in FIG. 14, the third distances D11, D12, D13, and D14 to the (1-1)-th, (1-2)-th, (1-3)-th, and (1-4)-th points 411, 412, 413, and 414 located at the adsorption surface 335 of the picker 330 having a (1-1)-th inclination may be measured. Alternatively, the distance to the adsorption surface 335 of the picker 330 having the (1-1)-th inclination may be set in advance.

As described above with reference to FIGS. 14 and 16, thicknesses D11-D31, D12-D32, D13-D33, and D14-D34 of the fingerprint sensing unit 210 at the (1-1)-th, (1-2)-th, (1-3)-th, and (1-4)-th points 411, 412, 413, and 414 may be calculated based on the first distances D31, D32, D33, and D34 to the (1-1)-th, (1-2)-th, (1-3)-th, and (1-4)-th points 411, 412, 413, and 414 located at the fingerprint sensing unit 210, and the third distances D11, D12, D13, and D14 to the (1-1)-th, (1-2)-th, (1-3)-th, and (1-4)-th points 411, 412, 413, and 414 located at the adsorption surface 335 of the picker 330.

In addition, as in the above-described step S1150, the second distances D41, D42, D43, and D44 to the (2-1)-th, (2-2)-th, (2-3)-th, and (2-4)-th points 421, 422, 423, and 424 located at the rear surface 111 of the display panel 100 adsorbed to the adsorption surface 321 of the stage 320 are measured (S1230).

In addition, as illustrated in FIG. 15, the fourth distances D21, D22, D23, and D24 to the (2-1)-th, (2-2)-th, (2-3)-th, and (2-4)-th points 421, 422, 423, and 424 located at the adsorption surface 321 of the stage 320 having the (2-1)-th inclination may be measured. Alternatively, the fourth distance to the adsorption surface 321 of the stage 320 having the (2-1)-th inclination may be predetermined.

As described above with reference to FIGS. 15 and 17, the controller 310 may calculate thicknesses D21-D41, D22-D42, D23-D43, and D24-D44 of the display panel 100 at the (2-1)-th, (2-2)-th, (2-3)-th, and (2-4)-th points 421, 422, 423, and 424, based on the second distances D41, D42, D43, and D44 to the (2-1)-th, (2-2)-th, (2-3)-th, and (2-4)-th points 421, 422, 423, and 424 located at the rear surface 111 of the display panel 100, and based on the distances D21, D22, D23, and D24 to the (2-1)-th, (2-2)-th, (2-3)-th, and (2-4)-th points 421, 422, 423, and 424 located at the adsorption surface 321 of the stage 320 (S1440).

The controller 310 may determine gaps G1, G2, G3, and G4 between the (1-1)-th, (1-2)-th, (1-3)-th, and (1-4)-th points 411, 412, 413, and 414, and the (2-1)-th, (2-2)-th, (2-3)-th, and (2-4)-th points 421, 422, 423, and 424, respectively, based on the thicknesses D11-D31, D12-D32, D13-D33, and D14-D34 of the fingerprint sensing unit 210 and based on the thicknesses D21-D41, D22-D42, D23-D43, and D24-D44 of the display panel 100 (S1450).

A distance between the adsorption surface 335 of the picker 330 having the (1-1)-th inclination and the adsorption surface 321 of the stage 320 having the (2-1)-th inclination may have a predetermined value. The distance between the adsorption surface 335 of the picker 330 having the (1-1)-th inclination and the adsorption surface 321 of the stage 320 having the (2-1)-th inclination may be measured as illustrated in FIGS. 14 and 15. The gaps G1, G2, G3, and G4 may be obtained by subtracting the sum of the thicknesses D11-D31, D12-D32, D13-D33, and D14-D34 of the fingerprint sensing unit 210, and the thicknesses D21-D41, D22-D42, D23-D43, and D24-D44 of the display panel 100 from the distance between the adsorption surface 335 of the picker 330 having the (1-1)-th inclination and the adsorption surface 321 of the stage 320 having the (2-1)-th inclination.

As illustrated in the step S1340 shown in FIG. 44, the controller 310 calculates the deviation between the gaps D1, D2, D3, and D4 (S1460). As in step S1350, the controller 310 compares the deviation between the gaps G1, G2, G3, and G4 with a predetermined tolerance A7 (S1470). The predetermined tolerance A7 may be about 5 um, about 10 um, or about 20 um.

As in step S1360, the controller 310 adjusts the inclination of at least one of the surface 335 of the picker 330 and the adsorption surface 321 of the stage 320 so that the deviation between the gaps G1, G2, G3, and G4 may be reduced (S1480).

The deviation between the inclinations G1, G2, G3 and G4 may be checked again after inclination adjustment (S1410 to S1480).

In an exemplary embodiment, the parallelism of the front surface 211 of the fingerprint sensing unit 210 and the parallelism of the rear surface 111 of the display panel 100 illustrated in FIG. 42 may be calculated based on the thicknesses D11-D31, D12-D32, D13-D33, and D14-D34 of the fingerprint sensing unit 210 and the thicknesses D21-D41, D22-D42, D23-D43, and D24-D44 of the display panel 100.

In addition, the inclination of the first plane defining the flatness of the front surface 211 of the fingerprint sensing unit 210 and the inclination of the second plane defining the flatness of the rear surface 111 of the display panel 100 illustrated in FIG. 43 may be determined based on the thicknesses D11-D31, D12-D32, D13-D33, and D14-D34 of the fingerprint sensing unit 210 and the thicknesses D21-D41, D22-D42, D23-D43, and D24-D44 of the display panel 100.

As set forth hereinabove, according to one or more exemplary embodiments, the degree of parallelism between the rear surface of the display panel and the front surface of the fingerprint sensor may be improved.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A device for bonding a fingerprint sensor to a display panel, the device comprising:
   a picker for securing a rear surface of a fingerprint sensing unit of the fingerprint sensor, the picker comprising a first planar surface having a (1-1)-th inclination;
   a stage for securing a front surface of the display panel, the stage comprising a second planar surface having a (2-1)-th inclination;
   a first distance measuring unit for measuring a first distance to a plurality of first points located at a front surface of the fingerprint sensing unit;
   a second distance measuring unit for measuring a second distance to a plurality of second points located at a rear surface of the display panel;
   a controller for outputting a control signal that comprises at least one of:
      a first control signal for adjusting, based on the first distance and the second distance, an inclination of the first planar surface of the picker from the (1-1)-th inclination to a (1-2)-th inclination; and
      a second control signal for adjusting, based on the first distance and the second distance, an inclination of the second planar surface of the stage from the (2-1)-th inclination to a (2-2)-th inclination;
   an inclination adjusting unit comprising at least one of a first inclination adjusting unit for adjusting an inclination of the first planar surface according to the first control signal, and a second inclination adjusting unit for adjusting an inclination of the second planar surface based on the second control signal; and
   a vertical driving unit for moving at least one of the first planar surface and the second planar surface along a first direction to bond the front surface of the fingerprint sensing unit and the rear surface of the display panel to each other.

2. The device of claim 1, further comprising an adhesive injector for applying an adhesive that comprises a curable resin over at least one of the front surface of the fingerprint sensing unit and the rear surface of the display panel.

3. The device of claim 1, further comprising:
   a horizontal driving unit for moving the first planar surface of the picker in a direction perpendicular to the first direction; and
   a camera unit for imaging the front surface of the fingerprint sensing unit and the rear surface of the display panel,
   wherein:
   the controller analyzes the image captured by the camera unit to generate a third control signal; and
   the horizontal driving unit receives the third control signal and causes the front surface of the fingerprint sensing unit and a sensing area of the display panel to overlap each other in the first direction.

4. The device of claim 1, wherein the first planar surface having the (1-1)-th inclination and the second planar surface having the (2-1)-th inclination are parallel to each other.

5. The device of claim 1, wherein:
   the plurality of first points comprise a (1-1)-th point, a (1-2)-th point, a (1-3)-th point, and a (1-4)-th point;
   the (1-1)-th point, the (1-2)-th point, the (1-3)-th point, and the (1-4)-th point correspond to vertices of a first quadrangle;
   the (1-1)-th point and the (1-3)-th point are located on a (1-1)-th diagonal line of the first quadrangle;
   the (1-2)-th point and the (1-4)-th point are located on a (1-2)-th diagonal line of the first quadrangle;
   the plurality of second points comprise a (2-1)-th point, a (2-2)-th point, a (2-3)-th point, and a (2-4)-th point;
   the (2-1)-th point, the (2-2)-th point, the (2-3)-th point, and the (2-4)-th point correspond to vertices of a second quadrangle;
   the (2-1)-th point and the (2-3)-th point are located on a (2-1)-th diagonal line of the second quadrangle;
   the (2-2)-th point and the (2-4)-th point are located on a (2-2)-th diagonal line of the second quadrangle;
   the controller determines at least one of the (1-2)-th inclination and the (2-2)-th inclination that allows the (1-1)-th diagonal line, the (1-2)-th diagonal line, the (2-1)-th diagonal line, and the (2-2)-th diagonal line to be parallel to one plane, based on a (1-1)-th distance, a (1-2)-th distance, a (1-3)-th distance, and a (1-4)-th distance to the (1-1)-th point, the (1-2)-th point, the (1-3)-th point, and the (1-4)-th point, respectively, and a (2-1)-th distance, a (2-2)-th distance, a (2-3)-th distance, and a (2-4)-th distance to the (2-1)-th point, the (2-2)-th point, the (2-3)-th point, and the (2-4)-th point, respectively.

6. The device of claim 5, wherein:
   the (1-1)-th point, the (1-2)-th point, the (1-3)-th point, and the (1-4)-th point overlap the (2-1)-th point, the (2-2)-th point, the (2-3)-th point, and the (2-4)-th point, respectively, in the first direction; and
   the controller determines:
      a first gap between the (1-1)-th point and the (2-1)-th point;
      a second gap between the (1-2)-th point and the (2-2)-th point;
      a third gap between the (1-3)-th point and the (2-3)-th point; and
      a fourth gap between the (1-4)-th point and the (2-4)-th point, based on the (1-1)-th distance, the (1-2)-th distance, the (1-3)-th distance, and the (1-4)-th distance to the (1-1)-th point, the (1-2)-th point, the (1-3)-th point, and the (1-4)-th point, respectively, and the (2-1)-th distance, the (2-2)-th distance, the (2-3)-th distance, and the (2-4)-th distance to the (2-1)-th point, the (2-2)-th point, the (2-3)-th point, and the (2-4)-th point, respectively.

7. The device of claim 6, wherein the controller determines at least one of the (1-2)-th inclination and the (2-2)-th inclination that allows the first gap and the third gap to be substantially equal to each other and the second gap and the fourth gap to be substantially equal to each other, based on a difference between the first gap, the second gap, the third gap, and the fourth gap.

8. The device of claim 6, wherein the controller:
   determines an inclination of a first planar surface that defines a flatness of the front surface of the fingerprint sensing unit, based on the first distance;
   determines an inclination of a second planar surface that defines a flatness of the rear surface of the display panel, based on the second distance; and
   determines at least one of the (1-2)-th inclination and the (2-2)-th inclination that allows the first planar surface and the second planar surface to be parallel to each other, based on the inclination of the first planar surface and the inclination of the second planar surface.

9. The device of claim 8, wherein:
   the first planar surface that defines the flatness of the front surface of the fingerprint sensing unit comprises a (1-1)-th plane and a (1-2)-th plane, the (1-1)-th plane and the (1-2)-th plane having a minimum separation distance therebetween among first sets of two parallel planes on which the plurality of first points of the front surface of the fingerprint sensing unit are located, and the second planar surface that defines the flatness of the rear surface of the display panel comprises a (2-1)-th plane and a (2-2)-th plane, the (2-1)-th plane and the (2-2)-th plane having a minimum separation distance therebetween among second sets of two parallel planes on which the plurality of second points of the front surface of the fingerprint sensing unit are located.

10. The device of claim 1, wherein:

the controller determines a moving distance in the first direction of the at least one of the first planar surface and the second planar surface, based on the first distance, the second distance, and a predetermined distance between the rear surface of the display panel and the front surface of the fingerprint sensing unit after bonding; and the vertical driving unit moves the at least one of the first planar surface and the second planar surface by the moving distance.

11. A device for bonding a fingerprint sensor to a display panel, the device comprising:

a picker for securing a rear surface of a fingerprint sensing unit of the fingerprint sensor, the picker comprising a first planar surface having a (1-1)-th inclination;

a stage for securing a front surface of the display panel, the stage comprising a second planar surface having a (2-1)-th inclination;

a first distance measuring unit for measuring a first distance to a plurality of first points located at a front surface of the fingerprint sensing unit;

a controller for outputting a control signal that comprises at least one of:

a first control signal for adjusting, based on the first distance, an inclination of the first planar surface of the picker from the (1-1)-th inclination to a (1-2)-th inclination; and a second control signal for adjusting, based on the first distance, an inclination of the second planar surface of the stage from the (2-1)-th inclination to a (2-2)-th inclination;

an inclination adjusting unit comprising at least one of a first inclination adjusting unit for adjusting an inclination of the first planar surface according to the first control signal, and a second inclination adjusting unit for adjusting an inclination of the second planar surface according to the second control signal; and a vertical driving unit for moving at least one of the first planar surface and the second planar surface along a first direction to bond the front surface of the fingerprint sensing unit and the rear surface of the display panel to each other.

12. The device of claim 11, wherein the controller determines at least one of the (1-2)-th inclination and the (2-2)-th inclination that allows parallelism of the front surface of the fingerprint sensing unit to be substantially minimum with respect to the second planar surface.

13. The device of claim 11, wherein the controller:

determines an inclination of the first planar surface that defines a flatness of the front surface of the fingerprint sensing unit, based on the first distance; and determines at least one of the (1-2)-th inclination and the (2-2)-th inclination that allows the first planar surface and the second planar surface to be parallel to each other, based on the inclination of the first planar surface and the (2-1)-th inclination of the second planar surface.

14. A device for bonding a first component to a second component, the device comprising:

a picker for securing a rear surface of the first component, the picker comprising a first planar surface having a (1-1)-th inclination;

a stage for securing a front surface of the second component, the stage comprising a second planar surface having a (2-1)-th inclination;

a first distance measuring unit for measuring a first distance to a plurality of first points located at a front surface of the first component;

a second distance measuring unit for measuring a second distance to a plurality of second points located at a rear surface of the second component;

a controller for outputting a control signal that comprises at least one of:

a first control signal for adjusting, based on the first distance and the second distance, an inclination of the first planar surface of the picker from the (1-1)-th inclination to a (1-2)-th inclination; and a second control signal for adjusting, based on the first distance and the second distance, in inclination of the second planar surface of the stage from the (2-1)-th inclination to a (2-2)-th inclination;

an inclination adjusting unit comprising at least one of a first inclination adjusting unit adjusting an inclination of the first planar surface based on the first control signal, and a second inclination adjusting unit adjusting an inclination of the second planar surface based on the second control signal; and a vertical driving unit for moving at least one of the first planar surface and the second planar surface along a first direction to bond the front surface of the first component and the rear surface of the second component to each other.

15. A picker for bonding a fingerprint sensor to a display panel, the fingerprint sensor comprising a fingerprint sensing unit having a front surface to be bonded to the display panel and a rear surface opposite to the front surface, and a flexible printed circuit board bonded to the rear surface of the fingerprint sensing unit, the picker comprises:

a head portion for supporting the fingerprint sensor, the head portion comprising:

a first surface contacting the rear surface of the fingerprint sensing unit;

a second surface contacting the flexible printed circuit board; and a third surface overlapping the fingerprint sensing unit and the flexible printed circuit board in a plan view, and defining a recessed groove with respect to the first and second surfaces.

16. The picker of claim 15, wherein:

the second surface does not overlap the fingerprint sensing unit in a plan view;

the third surface is spaced apart from the fingerprint sensing unit and the flexible printed circuit board; and the third surface is disposed between the first surface and the second surface.

17. The picker of claim 15, wherein a step difference between the first surface and the second surface is substantially equal to or less than a thickness of the flexible printed circuit board.

18. The picker of claim 15, wherein the second surface comprises a material substantially the same as that forming the first surface, or a material having elasticity.

19. A method for bonding a fingerprint sensor to a display panel, the method comprising the steps of:

securing a rear surface of a fingerprint sensing unit of the fingerprint sensor to a first planar surface of a picker, the first planar surface having a (1-1)-th inclination;

securing a front surface of the display panel to a second planar surface of a stage, the second planar surface having a (2-1)-th inclination;

measuring a first distance to a plurality of first points located at a front surface of the fingerprint sensing unit by a first distance measuring unit;

measuring a second distance to a plurality of second points located at a rear surface of the display panel by a second distance measuring unit;

outputting, by a controller, a control signal that comprises at least one of:

a first control signal for adjusting, based on the first distance and the second distance, an inclination of the first planar surface of the picker from the (1-1)-th inclination to a (1-2)-th inclination; and a second control signal for adjusting, based on the first distance and the second distance, an inclination of the second planar surface of the stage from the (2-1)-th inclination to a (2-2)-th inclination;

adjusting an inclination of the first planar surface by a first inclination adjusting unit according to the first control signal, and adjusting an inclination of the second planar surface by a second inclination adjusting unit based on the second control signal; and moving at least one of the first planar surface and the second planar surface along a first direction by a vertical driving unit to bond the front surface of the fingerprint sensing unit and the rear surface of the display panel to each other.

20. The method of claim 19, wherein:

outputting of the control signal comprises:

determining an inclination of the first planar surface that defines a flatness of the front surface of the fingerprint sensing unit, based on the first distance; and determining an inclination of the second planar surface that defines a flatness of the rear surface of the display panel, based on the second distance, and the steps further comprise determining at least one of the (1-2)-th inclination and the (2-2)-th inclination that allows the first planar surface and the second planar surface to be parallel to each other, based on the inclination of the first planar surface and the inclination of the second planar surface.

* * * * *